(12) United States Patent
Sakai

(10) Patent No.: US 7,948,591 B2
(45) Date of Patent: May 24, 2011

(54) RETARDATION FILM, POLARIZING FILM, LIQUID CRYSTAL DISPLAY, AND METHOD OF DESIGNING RETARDATION FILM

(75) Inventor: Akira Sakai, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 1171 days.

(21) Appl. No.: 11/630,686

(22) PCT Filed: Jun. 28, 2005

(86) PCT No.: PCT/JP2005/011828
§ 371 (c)(1),
(2), (4) Date: Dec. 27, 2006

(87) PCT Pub. No.: WO2006/001448
PCT Pub. Date: Jan. 5, 2006

(65) Prior Publication Data
US 2007/0242188 A1    Oct. 18, 2007

(30) Foreign Application Priority Data
Jun. 29, 2004    (JP) .................................. 2004-192107

(51) Int. Cl.
*G02F 1/1335*    (2006.01)
(52) U.S. Cl. .................. 349/118; 349/117; 349/119
(58) Field of Classification Search .................. None
See application file for complete search history.

(56) References Cited

U.S. PATENT DOCUMENTS

| | | | |
|---|---|---|---|
| 5,374,493 A * | 12/1994 | Fukunaga et al. ............. 430/7 |
| 5,598,285 A | 1/1997 | Kondo et al. | |
| 5,737,051 A | 4/1998 | Kondo et al. | |
| 6,124,915 A | 9/2000 | Kondo et al. | |
| 6,141,075 A * | 10/2000 | Ohmuro et al. ............. 349/130 |
| 6,281,956 B1 | 8/2001 | Ohmuro et al. | |
| 6,285,430 B1 | 9/2001 | Saito | |
| 6,339,460 B1 | 1/2002 | Saitoh | |
| 6,341,004 B1 | 1/2002 | Kondo et al. | |
| 6,407,787 B1 * | 6/2002 | Sekime et al. ............. 349/119 |

(Continued)

FOREIGN PATENT DOCUMENTS
EP    679921 A1 * 11/1995

(Continued)

OTHER PUBLICATIONS

International Search Report for PCT/JP2005/011828 mailed Oct. 18, 2005 (English and Japanese).

(Continued)

*Primary Examiner* — Lucy P Chien
(74) *Attorney, Agent, or Firm* — Nixon & Vanderhye P.C.

(57) ABSTRACT

To provide a retardation film in which the retardation condition is adjusted to achieve a liquid crystal display without coloration over a wide viewing angle range and having a high contrast ratio, and a method of designing the same, as well as a polarizing film and a liquid crystal display using the same. A liquid crystal display comprising a liquid crystal cell and polarizing films in a Cross-Nicol relationship with each other on both sides of the liquid crystal cell; wherein at least one polarizing film includes a retardation film having reverse wavelength dispersion property; and the liquid crystal display further includes a retardation film having a wavelength dispersion property substantially the same as a liquid crystal layer configuring the liquid crystal cell.

20 Claims, 22 Drawing Sheets

U.S. PATENT DOCUMENTS

| | | | |
|---|---|---|---|
| 6,549,257 B2 * | 4/2003 | Liu | 349/129 |
| 6,565,974 B1 | 5/2003 | Uchiyama et al. | |
| 6,642,981 B1 | 11/2003 | Ohmuro et al. | |
| 6,661,488 B1 | 12/2003 | Takeda et al. | |
| 6,812,983 B2 | 11/2004 | Arakawa | |
| 7,012,663 B2 * | 3/2006 | Ono et al. | 349/118 |
| 2002/0063822 A1 | 5/2002 | Kondo et al. | |
| 2004/0189923 A1 | 9/2004 | Kondo et al. | |
| 2004/0202849 A1 * | 10/2004 | Nishikouji et al. | 428/212 |
| 2004/0239852 A1 | 12/2004 | Ono et al. | |
| 2005/0248704 A1 | 11/2005 | Ohmuro et al. | |
| 2006/0098145 A1 | 5/2006 | Kim et al. | |
| 2006/0203150 A1 | 9/2006 | Ohmuro et al. | |

FOREIGN PATENT DOCUMENTS

| | | |
|---|---|---|
| JP | 06-160878 | 6/1994 |
| JP | 10-153802 | 6/1998 |
| JP | 11-258605 | 9/1999 |
| JP | 11-305217 | 11/1999 |
| JP | 2000-039610 | 2/2000 |
| JP | 2000-131693 | 5/2000 |
| JP | 2000-137116 | 5/2000 |
| JP | 2001-350022 | 12/2001 |
| JP | 2001-350022 A | 12/2001 |
| KR | 1999-004389 A | 1/1999 |
| KR | 2001-0033765 A | 4/2001 |
| KR | 2001-0105255 A | 11/2001 |
| KR | 2003-0079513 A | 10/2003 |
| WO | 03/032060 A1 | 4/2003 |

OTHER PUBLICATIONS

Chen et al., *Optimum Film Compensation Modes for TN and VA LCDs*, SID 98 Digest, 1998, pp. 315-318.

Ono et al., *Wavelength Dispersion effects of Retardation Films on VA-LCDs*, IDW '02 Proceedings of the Ninth International Display Workshops, 2002, pp. 525-528.

Chen et al., *Optical Simulation of Electro-Optical Performance of Low-And Multi-Domain TN Displays*, SID 97 Digest, 1997, pp. 937-940.

Takasaki, *Crystal Optics*, 1975, pp. 146-163.

Uchiyama et al, "Novel Design Method Using Birefringence Dispersion Control of Retardation Films for a High Contrast LCD in Wide Viewing Angle Range", IDW04FMC8-2, 2004, pp. 647-560.

Takasaki, "Display and Handling of Polarization Based on Poincare Sphere", *Crystal Optics*, 1975, pp. 146-163 w/English translation.

* cited by examiner (a)

(b)

(a)

(b)

RETARDATION FILM, POLARIZING FILM, LIQUID CRYSTAL DISPLAY, AND METHOD OF DESIGNING RETARDATION FILM

This application is the US national phase of international application PCT/JP2005/011828 filed 28 Jun. 2005, which designated the U.S. and claims priority to JP 2004-192107 filed 29 Jun. 2004, the entire content of each of which is hereby incorporated by reference.

TECHNICAL FIELD

The present invention relates to a retardation film, a polarizing film, a liquid crystal display, and a method of designing the retardation film. More specifically, relates to a retardation film in which the retardation and the wavelength dispersion property are most suitably designed, and a method of designing the same, and furthermore, to a polarizing film and a liquid crystal display using the same, in particular, the liquid crystal display using a pair of polarizing elements in a Cross-Nicol relationship.

BACKGROUND ART

The liquid crystal display is widely used as a display of various information processing devices including computers and televisions. In particular, the liquid crystal display of TFT system (hereinafter also referred to as "TFT-LCD") is widely used with further expansion in the market, and thus further advancement in image quality is desired accompanied therewith. The following description is made using the TFT-LCD as an example, but the present invention is not limited to the TFT-LCD, and is also applicable to passive matrix type LCD, plasma address type LCD and the like, and is generally applicable to all LCD that performs display by sandwiching the liquid crystals between a pair of substrates respectively formed with electrodes, and applying voltage to the electrodes.

The mode that has been most widely used up to now for the TFT-LCD is a so-called TN mode in which the liquid crystal having positive dielectric constant anisotropy are aligned horizontally between the substrates facing each other. The liquid crystal display of TN mode has a feature in that the alignment direction of the liquid crystal molecules adjacent to one of the substrates is twisted by 90° with respect to the alignment direction of the liquid crystal molecules adjacent to the other substrate. In such liquid crystal display of TN mode, an inexpensive manufacturing technique is established. Therefore the liquid crystal display of TN mode is industrially mature, but there is room for improvement in the way that high contrast ratio is difficult to achieve.

On the other hand, a liquid crystal display of a so-called VA mode in which the liquid crystal having negative dielectric constant anisotropy are aligned vertically between the substrates facing each other is disclosed (see e.g., Japanese Laid-Open Patent Publication No. 2000-39610). As described in Japanese Laid-Open Patent Publication No. 2000-39610, in the liquid crystal display of VA mode, the liquid crystal cells hardly exhibit birefringence and optical rotation, and the light passes through the liquid crystal cell without hardly changing the polarized state since the liquid crystal molecules are aligned in a direction substantially vertical to the substrate surface when a voltage is not applied. Therefore, a substantially complete display of black can be realized when a voltage is not applied by arranging the pair of linear polarizing elements above and below the liquid crystal cell so that the adsorption axes thereof are substantially orthogonal to each other. When a voltage is applied, the liquid crystal molecules are inclined and become substantially parallel to the substrate, thereby exhibiting a large birefringence and achieving a display of white. Therefore, the liquid crystal display of VA mode can easily achieve a very high contrast ratio, which is not possible with the TN mode.

However, in the liquid crystal display of VA having the configuration described above, there is room for improvement in the way that the viewing angle is difficult to widen. A substantially complete display of black is achieved in the liquid crystal display of VA mode since the liquid crystal cells hardly exhibit birefringence at the front view and two polarizing elements are completely orthogonal to each other, as described above, but the liquid crystal cells exhibit birefringence and has an apparent retardation at an oblique viewing angle, and the apparent geometric relative relationship of the two polarizing elements are no longer orthogonal to each other, whereby light leakage occurs to lower the contrast ratio and as a result, narrowing the viewing angle. Therefore, a retardation film is often arranged in the liquid crystal display of VA mode in an aim of canceling the extra retardation at the oblique viewing angle of the liquid crystal cell and maintaining the orthogonality of the Cross-Nicol arranged polarizing element at the oblique viewing angle. For example, a technique is conventionally disclosed for widening the viewing angle by arranging the polarizing elements on both sides of the liquid crystal cell aligned vertically, and arranging at least one of a uniaxial retardation film (so-called positive A plate) having an in plane optical axis and where extraordinary ray refraction index>ordinary ray refraction index, a uniaxial retardation film (so-called negative C plate) having an out of plane (film normal line direction) optical axis and where extraordinary ray refraction index<ordinary ray refraction index, or a biaxial retardation film between the polarizing element and the liquid crystal cell (see e.g., Japanese Laid-Open Patent Publication No. 2000-39610, Japanese Laid-Open Patent Publication No. 11-258605, Japanese Laid-Open Patent Publication No. 10-153802, Japanese Laid-Open Patent Publication No. 2000-131693). The uniaxial retardation film having out of plane optical axis and where extraordinary ray refraction index>ordinary ray refraction index is also referred to as positive C plate in the present specification.

A so-called IPS mode is disclosed in which a lateral electric field is applied to the horizontally aligned liquid crystal cell in which liquid crystals are sandwiched between two upper and lower substrates performed with parallel alignment process on the surface and the liquid crystal molecules are rotation operated in a plane substantially parallel to the substrate to perform the display (see e.g., Japanese Laid-Open Patent Publication No. 6-160878). In the liquid crystal display of IPS mode, display is performed by changing the angle formed by the major axis direction of the liquid crystal molecules and the absorption axis of the polarizing element with the liquid crystal molecules constantly being substantially parallel to the substrate, and thus change in birefringence of the liquid crystal cell is small even at the oblique viewing angle, and the viewing angle becomes wide. However, although two polarizing elements are arranged orthogonal (Cross-Nicol) to each other to improve the contrast ratio in the liquid crystal display of IPS mode having the above described configuration, similar to the liquid crystal display of VA mode, the geometric relative relationship of the two polarizing elements are not apparently orthogonal at the oblique viewing angle, and thus there is room for improvement in the way that light leakage occurs in display of black and the contrast ratio lowers. Therefore, in order to improve the lowering of the contrast ratio, arranging the retardation film in the liquid crystal display of IPS mode is also being considered, and for example, the technique of arranging between the polarizing element and the liquid crystal cell an appropriate biaxial retardation film in which the in plane retardation and the retardation in the thickness direction are controlled is known (see e.g., Japanese Laid-Open Patent Publication No. 11-305217).

As described above, (1) maintaining orthogonality of the polarizing elements arranged in Cross-Nicol at the oblique viewing angle, similar to the front view (all modes), (2) canceling the extra retardation of the liquid crystal cell at the oblique viewing angle (VA mode etc.) are important in widening the viewing angle of the liquid crystal display using the pair of polarizing elements having the Cross-Nicol relationship and the liquid crystal cell, where (1) and (2) are conventionally achieved by arranging an appropriate retardation film. Such technique for widening the viewing angle using the retardation film is widely known, but in all conventional techniques, the retardation condition is most suitably designed only at a single wavelength (normally near 550 nm), and thus light leakage occurs in ti me of display of black at wavelengths other than the designed wavelength, whereby there is room for improvement in the way that coloration phenomenon occurs at the oblique viewing angle.

The conventional liquid crystal display has an essential problem in that the retardation film can be designed only at the single wavelength due to restrictions in types and stacking orders of the retardation film used, the fact that the supporting layer (presently, most general layer is a triacetyl cellulose film=TAC film) for protecting the polarizing element unintentionally has retardation and the like. More specifically explaining, although the wavelength property (wavelength dispersion property) most suitable for the retardation film for achieving (1) or (2) described above differs, the wavelength property cannot be essentially optimized in the prior art due to reasons that the plurality of retardation films of different material are needed to achieve (1) and (2), the retardation film is designed so that (1) and (2) are achieved by the entire assembly of the plurality of retardation films (including TAC film for protecting polarizing element and the like), or the retardation film is designed so as to achieve (1) by actively using the extra retardation at the oblique angle of the liquid crystal cell without achieving (2), and furthermore, the plurality of retardation films are not arranged adjacent to each other. This is because when a plurality of retardation films are used, the effects thereof generally differ depending on the stacked order, and furthermore, the additive property of the retardation of the retardation film is generally satisfied only in extremely limited cases. Moreover, optimizing the wavelength property including the supporting layer (protective film such as TAC film etc.) of the polarizing element is complicating.

In describing one example of a method of designing the retardation in the conventional liquid crystal display, for example, when configuring the liquid crystal display of (first polarizing element)/(TAC film)/(positive A plate a)/(VA mode liquid crystal cell)/(negative C plate b)/(negative C plate c)/(TAC film)/(second polarizing element) using a total of three retardation films of the positive A plate a, the negative C plates b and c, and two polarizing films (configured by polarizing element and TAC film) and the VA mode liquid crystal cell, some of the extra retardation at the oblique viewing angle of the VA mode liquid crystal cell is cancelled, that is, part of (2) is achieved with (negative C plate b)+(negative C plate c)+(protective TAC film of first polarizing element)+ (protective TAC film of second polarizing element), and maintenance of orthogonality at the oblique viewing angle of the polarizing elements arranged in Cross-Nicol, that is, rest of (1) and (2) are realized with (positive A plate a)+(rest of extra retardation at oblique viewing angle of VA mode liquid crystal cell).

Therefore, in the prior art described above, the design of the retardation is very difficult, and the most suitable design that takes even the wavelength property into consideration is substantially not possible.

DISCLOSURE OF THE INVENTION

Problem to be Solved by the Invention

The present invention aims to, in view of the present situation described above, provide a retardation film in which the retardation condition is adjusted to achieve a liquid crystal display without coloration over a wide viewing angle range and having a high contrast ratio, and a method of designing the same, as well as a polarizing film and a liquid crystal display using the same.

Means for Solving the Problem

The inventors performed various reviews on the designing conditions of the retardation film most suitably designed at the entire range of the visible wavelength, which can prevent coloration phenomenon at the oblique viewing angle. And first the inventors focused on the fact that cancellation of extra retardation at the oblique viewing angle of the liquid crystal cell and the maintenance of orthogonality at the oblique viewing angle of the polarizing elements arranged at Cross-Nicol are optimized at a single wavelength (normally near 550 nm) in a configuration of the liquid crystal display of vertical alignment mode and the like of the prior art. However, cancellation of extra retardation at the oblique viewing angle of the liquid crystal cell and the maintenance of orthogonality at the oblique viewing angle of the polarizing elements arranged at Cross-Nicol normally require different wavelength dispersion properties, in contrast, the method of designing the retardation film of the prior art performs composite designing of the retardation using the supporting layer (protective layer) exhibiting birefringence for protecting polarizing element of the polarizing film, the extra retardation at the oblique viewing angle of the liquid crystal cell etc., and thus are essentially optimized only at the single wavelength. Thus, in order to optimize the retardation condition at the entire region of the visible wavelength, the maintenance of orthogonality of the polarizing elements arranged in Cross-Nicol in the oblique viewing angle in time of display of black, similar to the front view, and cancellation of the extra retardation of the liquid crystal cell at the oblique viewing angle are completely separated in terms of wavelength dispersion property to contrive a configuration of compensating each with different retardation films in the liquid crystal display. In other words, the inventors have found that the retardation condition at the entire region of the visible wavelength can be optimized, and the coloration phenomenon at the oblique viewing angle can be prevented according to a configuration in which the cancellation of the extra retardation at the oblique viewing angle of the liquid crystal cell is performed by the retardation film having the wavelength dispersion property substantially the same as the liquid crystal layer configuring the liquid crystal cell, and the maintenance of orthogonality at the oblique viewing angle of the polarizing elements arranged in Cross-Nicol is performed by the retardation film having reverse wavelength dispersion property. Furthermore, the inventors have found the most suitable retardation condition and configuration of the retardation film used in the above configuration. Thereby, the above-mentioned problems have been solved, leading to completion of the present invention.

In other words, the present invention is a uniaxial retardation film having an optical axis in plane and where extraordinary ray refraction index>ordinary ray refraction index, wherein the retardation film satisfies the following equations (a) to (d)

$$118 \text{ nm} \leq Rxy(550) \leq 160 \text{ nm} \quad (a)$$

$$-10 \text{ nm} \leq Ryz(550) \leq 10 \text{ nm} \quad (b)$$

$$0.75 \leq Rxy(450)/Rxy(550) \leq 0.97 \quad (c)$$

$$1.03 \leq Rxy(650)/Rxy(550) \leq 1.25 \quad (d)$$

In equations (a) to (d), $Rxy(\lambda)$, $Ryz(\lambda)$ represent the retardation $Rxy$, $Ryz$ of the retardation film at wavelength $\lambda$ nm respectively, and are defined as $Rxy=(nx-ny) \times d$, $Ryz=(ny-nz) \times d$ where nx, ny (nx>ny) are the principal refraction indexes in the in plane direction, nz is the principal refraction index in the out of plane direction, and d is the thickness in the retardation film.

The present invention also relates to a uniaxial retardation film having an optical axis out of plane and where extraordinary ray refraction index>ordinary ray refraction index, wherein the retardation film satisfies the following equations (e) to (h).

$$0 \text{ nm} \leq Rxy(550) \leq 10 \text{ nm} \quad (e)$$

$$-107 \text{ nm} \leq Rxz(550) \leq -71 \text{ nm} \quad (f)$$

$$0.75 \leq Rxz(450)/Rxz(550) \leq 0.97 \quad (g)$$

$$1.03 \leq Rxz(650)/Rxz(550) \leq 1.25 \quad (h)$$

In equations (e) to (h), $Rxy(\lambda)$, $Rxz(\lambda)$ represent the retardation $Rxy$, $Rxz$ of the retardation film at wavelength $\lambda$ nm respectively, and are defined as $Rxy=(nx-ny) \times d$, $Rxz=(nx-nz) \times d$ where nx, ny (nx≧ny) are the principal refraction indexes in the in plane direction, nz is the principal refraction index in the out of plane direction, and d is the thickness in the retardation film.

The present invention also relates to a biaxial retardation film, wherein the retardation film satisfies the following equations (i) to (l).

$$220 \text{ nm} \leq Rxy(550) \leq 330 \text{ nm} \quad (i)$$

$$110 \text{ nm} \leq Rxz(550) \leq 165 \text{ nm} \quad (j)$$

$$0.75 \leq Rxy(450)/Rxy(550) \leq 0.97 \quad (k)$$

$$1.03 \leq Rxy(650)/Rxy(550) \leq 1.25 \quad (l)$$

In equations (i) to (l), $Rxy(\lambda)$, $Rxz(\lambda)$ represent the retardation $Rxy$, $Rxz$ of the retardation film at wavelength $\lambda$ nm respectively, and are defined as $Rxy=(nx-ny) \times d$, $Rxz=(nx-nz) \times d$ where nx, ny (nx>ny) are the principal refraction indexes in the in plane direction, nz is the principal refraction index in the out of plane direction, and d is the thickness in the retardation film.

The present invention also relates to a uniaxial retardation film having an optical axis out of plane and where extraordinary ray refraction index<ordinary ray refraction index, wherein the retardation film satisfies the following equations (m) to (p).

$$0 \text{ nm} \leq Rxy(550) \leq 10 \text{ nm} \quad (m)$$

$$215 \text{ nm} \leq Rxz(550) \leq 450 \text{ nm} \quad (n)$$

$$1.01 \leq Rxz(450)/Rxz(550) \leq 1.17 \quad (o)$$

$$0.89 \leq Rxz(650)/Rxz(550) \leq 1.00 \quad (p)$$

In equations (m) to (p), $Rxy(\lambda)$, $Rxz(\lambda)$ represent the retardation $Rxy$, $Rxz$ of the retardation film at wavelength $\lambda$ nm respectively, and are defined as $Rxy=(nx-ny) \times d$, $Rxz=(nx-nz) \times d$ where nx, ny (nx≧ny) are the principal refraction indexes in the in plane direction, nz is the principal refraction index in the out of plane direction, and d is the thickness in the retardation film.

The present invention also relates to a uniaxial retardation film having an optical axis out of plane and where extraordinary ray refraction index<ordinary ray refraction index, wherein the retardation film satisfies the following equations (q) to (t).

$$0 \text{ nm} \leq Rxy(550) \leq 10 \text{ nm} \quad (q)$$

$$108 \text{ nm} \leq Ryz(550) \leq 379 \text{ nm} \quad (r)$$

$$1.04 \leq Rxz(450)/Rxz(550) \quad (s)$$

$$Rxz(650)/Rxz(550) \leq 0.98 \quad (t)$$

In equations (q) to (t), $Rxy(\lambda)$, $Rxz(\lambda)$ represent the retardation $Rxy$, $Rxz$ of the retardation film at wavelength $\lambda$ nm respectively, and are defined as $Rxy=(nx-ny) \times d$, $Rxz=(nx-nz) \times d$ where nx, ny (nx≧ny) are the principal refraction indexes in the in plane direction, nz is the principal refraction index in the out of plane direction, and d is the thickness in the retardation film.

The present invention further relates to a liquid crystal display including a liquid crystal cell and polarizing films in a Cross-Nicol relationship with each other on both sides of the liquid crystal cell, wherein at least one polarizing film includes a retardation film having reverse wavelength dispersion property, and the liquid crystal display includes a retardation film having a wavelength dispersion property substantially the same as a liquid crystal layer configuring the liquid crystal cell.

The present invention further relates to a liquid crystal display including a liquid crystal cell and polarizing films in a Cross-Nicol relationship with each other on both sides of the liquid crystal cell, wherein one polarizing film includes a retardation film having reverse wavelength dispersion property, and one polarizing film does not include a supporting layer exhibiting birefringence on the liquid crystal cell side of the polarizing element.

The present invention further relates to a method of designing the retardation in an in plane direction and an out of plane direction of a retardation film, wherein the method of designing the retardation film references a sign and an absolute value of an effective retardation measured at the angle inclined by a predetermined angle greater than 0° from the normal line direction of the retardation film and the liquid crystal cell as the design parameter. The present invention will be described in detail below.

The retardation film of the present invention is one of a uniaxial retardation film (hereinafter also referred to as "positive A plate") having an optical axis in plane and where extraordinary ray refraction index>ordinary ray refraction index, a uniaxial retardation film (hereinafter also referred to as "positive C plate") having an optical axis out of plane and where extraordinary ray refraction index>ordinary ray refraction index, a biaxial retardation film, or a uniaxial retardation film (hereinafter also referred to as "negative C plate") having an optical axis out of plane and where extraordinary ray refraction index<ordinary ray refraction index. In plane refers to being in a substantially parallel direction with respect to the film surface, and out of plane refers to being in a substantially perpendicular direction with respect to the film surface.

The maintenance of orthogonality in the oblique viewing angle of the polarizing element arranged in Cross-Nicol can be performed by using the positive A plate and the positive C plate of the present invention in combination in the liquid crystal display or using the biaxial retardation film of the present invention alone. The extra retardation at the oblique viewing angle of the liquid crystal cell can be canceled by using the first negative C plate of the present invention in the liquid crystal display of vertical alignment mode.

The positive A plate of the present invention satisfies the following equations (1) to (4).

In equations (1) to (4), $Rxy(\lambda)$, $Rxz(\lambda)$ represent the retardation $Rxy$, $Rxz$ of the retardation film at wavelength $\lambda$ nm, respectively and are defined as $Rxy=(nx-ny)\times d$, $Ryz=(ny-nz)\times d$ where nx, ny (nx>ny) are the principal refraction indexes in the in plane direction, nz is the principal refraction index in the out of plane direction, and d is the thickness in the retardation film.

$$118 \text{ nm} \leq Rxy(550) \leq 160 \text{ nm} \quad (1)$$

$$-10 \text{ nm} \leq Ryz(550) \leq 10 \text{ nm} \quad (2)$$

$$0.75 \leq Rxy(450)/Rxy(550) \leq 0.97 \quad (3)$$

$$1.03 \leq Rxy(650)/Rxy(550) \leq 1.25 \quad (4)$$

If the positive A plate satisfies equation (1), the retardation Rxy(550) in the in plane direction is adjusted to a suitable range for maintaining orthogonality at the oblique viewing angle of the polarizing element arranged in Cross-Nicol. The preferred lower limit of the Rxy(550) is 130 nm, and the preferred upper limit is 150 nm. Therefore, the positive A plate preferably satisfies 130 nm≤Rxy(550)≤150 nm. The more preferred lower limit of the Rxy(550) is 135 nm and the more preferred upper limit is 145 nm.

If the positive A plate satisfies equation (2), the retardation Ryz(550) in the out of plane direction is sufficiently reduced, and in combination with the positive C plate (preferably, positive C plate of the present invention), can be suitably used in maintenance of orthogonality at the oblique viewing angle of the polarizing elements arranged at Cross-Nicol. The preferred lower limit of Ryz(550) is −5 nm, and the preferred upper limit is 5 nm.

If the positive A plate satisfies equations (3) and (4), the wavelength dispersion property of the retardation Rxy in the in plane direction satisfies the wavelength dispersion property (reverse wavelength dispersion property) necessary for maintenance of orthogonality at the oblique viewing angle of the polarizing elements arranged in Cross-Nicol, thereby effectively preventing the coloration phenomenon at the oblique viewing angle. The preferred lower limit of Rxy(450)/Rxy(550) is 0.78, and the preferred upper limit is 0.86. The preferred lower limit of Rxy(650)/Rxy(550) is 1.14, and the preferred upper limit thereof is 1.22.

The form of the positive A plate may be, for example, a form configured by a single layer, a form configured by a stacked body of two or more retardation elements which (nx−ny)/(ny−nz) is substantially equal to each other, and a form configured by a stacked body of two or more retardation elements which maximum principal refraction index direction in plane is substantially parallel to or substantially orthogonal to each other. If the positive A plate is configured by a single layer, it can be easily and conveniently manufactured, enhancing reliability (durability), and achieving thinning. If the positive A plate is configured by a stacked body, the degree of freedom can be enhanced in film design of selecting the film material and the like compared to when configured by a single layer. Furthermore, in a form in which two or more retardation elements configuring the stacked body are stacked with the optical axis direction substantially parallel to or substantially orthogonal to each other, the influence on the retardation of stacking is sufficiently reduced. Therefore, compared to when simply using the plurality of various retardation elements without considering the arrangement state (arrangement place, stacking direction), the wavelength dispersion property in the oblique viewing angle can be optimized in these forms configured by the stacked body.

In the present specification, substantially equal includes, in addition to being completely equal, an error span in which the desired effect can be substantially obtained. Similarly, substantially parallel includes, in addition to being completely parallel, an error span in which the desired effect can be substantially obtained, and substantially orthogonal includes, in addition to being completely orthogonal, an error span in which the desired effect can be substantially obtained.

The positive C plate of the present invention satisfies the following equations (5) to (8).

In equations (5) to (8), $Rxy(\lambda)$, $Ryz(\lambda)$ represent the retardation $Rxy$, $Ryz$ of the retardation film at wavelength $\lambda$ nm respectively, and are defined as $Rxy=(nx-ny)\times d$, $Rxz=(nx-nz)\times d$ where nx, ny (nx>ny) are the principal refraction indexes in the in plane direction, nz is the principal refraction index in the out of plane direction, and d is the thickness in the retardation film.

$$0 \text{ nm} \leq Rxy(550) \leq 10 \text{ nm} \quad (5)$$

$$-107 \text{ nm} \leq Rxz(550) \leq -71 \text{ nm} \quad (6)$$

$$0.75 \leq Rxz(450)/Rxz(550) \leq 0.97 \quad (7)$$

$$1.03 \leq Rxz(650)/Rxz(550) \leq 1.25 \quad (8)$$

If the positive C plate satisfies equation (5), the retardation Rxy(550) in the in plane direction is sufficiently reduced, and in combination with the positive A plate (preferably, the positive A plate of the present invention), can be suitably used in maintenance of orthogonality at the oblique viewing angle of the polarizing elements arranged in Cross-Nicol. The preferred upper limit of Rxy(550) is 5 nm.

If the positive C plate satisfies equation (6), the retardation Rxz(550) in the out of plane direction is adjusted to a range suitable for maintenance of orthogonality at the oblique viewing angle of the polarizing elements arranged in Cross-Nicol. The preferred lower limit of Rxz(550) is −100 nm, and the preferred upper limit is −80 nm. Therefore, the positive C plate preferably satisfies −100 nm≤Rxz(550)≤−80 nm. The more preferred lower limit of Rxz(550) is −95 nm, and the more preferred upper limit is −85 nm.

If the positive C plate satisfies equations (7) and (8), the wavelength dispersion property of the retardation Rxz in the out of plane direction satisfies the wavelength dispersion property (reverse wavelength dispersion property) necessary for maintenance of orthogonality at the oblique viewing angle of the polarizing elements arranged in Cross-Nicol, thereby effectively preventing the coloration phenomenon at the oblique viewing angle. The preferred lower limit of Rxz(450)/Rxz(550) is 0.78, and the preferred upper limit is 0.86. The preferred lower limit of Rxz(650)/Rxz(550) is 1.14, and the preferred upper limit thereof is 1.22.

The form of the positive C plate may be, for example, a form configured by a single layer, a form configured by a stacked body of two or more retardation elements which $(nx-ny)/(ny-nz)$ is substantially equal to each other, and a form configured by a stacked body of two or more retardation elements which maximum principal refraction index direction in plane is substantially parallel to or substantially orthogonal to each other. If the positive C plate is configured by a single layer, it can be easily and conveniently manufactured, enhancing reliability (durability), and achieving thinning. If the positive C plate is configured by a stacked body, the degree of freedom can be enhanced in film design of selecting the film material and the like compared to when configured by a single layer. Furthermore, in a form in which two or more retardation elements configuring the stacked body are stacked with the optical axis direction substantially parallel to or substantially orthogonal to each other, the influence on the retardation of stacking is sufficiently reduced. Therefore, compared to when simply using the plurality of various retardation elements without considering the arrangement state (arrangement place, stacking direction), the wavelength dispersion property in the oblique viewing angle can be optimized in these forms configured by the stacked body.

The biaxial retardation film of the present invention satisfies the following equations (9) to (12).

In equations (9) to (12), $Rxy(\lambda)$, $Rxz(\lambda)$ represent the retardation Rxy, Rxz of the retardation film at wavelength $\lambda$nm, respectively and are defined as $Rxy=(nx-ny)\times d$, $Rxz=(nx-nz)\times d$ where nx, ny (nx>ny) are the principal refraction indexes in the in plane direction, nz is the principal refraction index in the out of plane direction, and d is the thickness in the retardation film.

$$220\ \text{nm} \leq Rxy(550) \leq 330\ \text{nm} \quad (9)$$

$$110\ \text{nm} \leq Rxz(550) \leq 165\ \text{nm} \quad (10)$$

$$0.75 \leq Rxy(450)/Rxy(550) \leq 0.97 \quad (11)$$

$$1.03 \leq Rxy(650)/Rxy(550) \leq 1.25 \quad (12)$$

If the biaxial retardation film satisfies equations (9) and (10), the retardation Rxy(550) in the in plane direction and the retardation Rxz(550) in the out of plate direction are adjusted to a range suitable for maintaining the orthogonality at the oblique viewing angle of the polarizing elements arranged in Cross-Nicol. The preferred lower limit of Rxy(550) is 265 nm, and the preferred upper limit is 285 nm. The preferred lower limit of Rxz(550) is 125 nm, and the preferred upper limit is 145 nm. Therefore, the biaxial retardation film preferably satisfies 265 nm$\leq$Rxy(550)$\leq$285 nm and 125 nm$\leq$Rxz(550)$\leq$145 nm. The more preferred lower limit of Rxy$\leq$(550) is 270 nm, and the more preferred upper limit is 280 nm. The more preferred lower limit of Rxz(550) is 130 nm, and the more preferred upper limit is 140 nm.

If the biaxial retardation film satisfies equations (11) and (12), the wavelength dispersion property of the retardation Rxy in the in plane direction satisfies the wavelength dispersion property (reverse wavelength dispersion property) necessary for maintenance of orthogonality at the oblique viewing angle of the polarizing elements arranged in Cross-Nicol, thereby effectively preventing the coloration phenomenon at the oblique viewing angle. The preferred lower limit of Rxy(450)/Rxy(550) is 0.78, and the preferred upper limit is 0.86. The preferred lower limit of Rxy(650)/Rxy(550) is 1.14, and the preferred upper limit thereof is 1.22.

The form of the biaxial retardation film may be, for example, a form configured by a single layer, a form configured by a stacked body of two or more retardation elements which $(nx-ny)/(ny-nz)$ is substantially equal to each other, and a form configured by a stacked body of two or more retardation elements which maximum principal refraction index direction in plane is substantially parallel to or substantially orthogonal to each other. If the biaxial retardation film is configured by a single layer, it can be easily and conveniently manufactured, thereby enhancing reliability (durability), and achieving thinning. If the biaxial retardation film is configured by a stacked body, the degree of freedom can be enhanced in film design of selecting the film material and the like compared to when configured by a single layer. Furthermore, in a form in which two or more retardation elements configuring the stacked body are stacked with the optical axis direction substantially parallel to or substantially orthogonal to each other, the influence on the retardation of stacking is sufficiently reduced. Therefore, compared to when simply using the plurality of various retardation elements without considering the arrangement state (arrangement place, stacking direction), the wavelength dispersion property in the oblique viewing angle can be optimized in these forms configured by the stacked body.

The first negative C plate of the present invention satisfies the following equations (13) to (16).

In equations (13) to (16), $Rxy(\lambda)$, $Rxz(\lambda)$ represent the retardation Rxy, Rxz of the retardation film at wavelength $\lambda$nm respectively, and are defined as $Rxy=(nx-ny)\times d$, $Rxz=(nx-nz)\times d$ where nx, ny (nx$\geq$ny) are the principal refraction indexes in the in plane direction, nz is the principal refraction index in the out of plane direction, and d is the thickness in the retardation film.

$$0\ \text{nm} \leq Rxy(550) \leq 10\ \text{nm} \quad (13)$$

$$215\ \text{nm} \leq Rxz(550) \leq 450\ \text{nm} \quad (14)$$

$$1.01 \leq Rxz(450)/Rxz(550) \leq 1.17 \quad (15)$$

$$0.89 \leq Rxz(650)/Rxz(550) \leq 1.00 \quad (16)$$

If the first negative C plate satisfies equation (13), the retardation Rxy(550) in the in plane direction is sufficiently reduced, and can be suitably used to cancel the extra retardation at the oblique viewing angle of the liquid crystal cell in the liquid crystal display of vertical alignment mode. The preferred upper limit of Rxy(550) is 5 nm. Therefore, the first negative C plate preferably satisfies 0 nm$\leq$Rxy(550)$\leq$5 nm. The preferred upper limit of Rxy(550) is 3 nm.

If the first negative C plate satisfies equation (14), the retardation Rxz(550) in the out of plane direction is adjusted to a range suitable for canceling the extra retardation at the oblique viewing angle of the liquid crystal cell in the liquid crystal display of vertical alignment mode.

If the first negative C plate satisfies equations (15) and (16), the wavelength dispersion property of the retardation Rxz in the out of plane direction satisfies the wavelength dispersion property (reverse wavelength dispersion property) necessary for canceling the extra retardation at the oblique viewing angle of the liquid crystal cell in the liquid crystal display of vertical alignment mode, thereby effectively preventing the coloration phenomenon at the oblique viewing angle. The preferred lower limit of Rxz(450)/Rxz(550) is 1.04, and the preferred upper limit is 1.10. The preferred lower limit of Rxz(650)/Rxz(550) is 0.96, and the preferred upper limit thereof is 0.98.

The form of the first negative C plate may be, for example, a form configured by a single layer, a form configured by a stacked body of two or more retardation elements which $(nx-ny)/(ny-nz)$ is substantially equal to each other, a form configured by a stacked body of two or more retardation elements which maximum principal refraction index direction in plane is substantially parallel to or substantially orthogonal to each other, a form configured by a stacked body of two or more retardation elements each satisfying 0 nm≦Rxy(550)≦10 nm, and a form in the above forms where at least one of the two or more retardation elements is a film having a thickness of less than or equal to 20 μm. If the first negative C plate is configured by a single layer, it can be easily and conveniently manufactured, enhancing reliability (durability), and achieving thinning. If the first negative C plate is configured by a stacked body, the degree of freedom can be enhanced in film design of selecting the film material and the like compared to when configured by a single layer. Furthermore, in a form in which two or more retardation elements configuring the stacked body are stacked with the optical axis direction substantially parallel to or substantially orthogonal to each other, the influence on the retardation of stacking is sufficiently reduced. Therefore, compared to when simply using the plurality of various retardation elements without considering the arrangement state (arrangement place, stacking direction), the wavelength dispersion property in the oblique viewing angle can be optimized in these forms configured by the stacked body. Furthermore, in the form configured by a stacked body of two or more retardation elements each satisfying 0 nm≦Rxy(550)≦10 nm, two or more retardation elements configuring the stacked body each have the retardation Rxy(550) in the in plane direction sufficiently reduced, and thus is more suitably used in canceling the extra retardation at the oblique viewing angle of the liquid crystal cell in the liquid crystal display of the vertical alignment mode. In the form where at least one of the retardation elements is a film having a thickness of less than or equal to 20 μm, the influence on the retardation by the stacking of the retardation elements is sufficiently reduced, and thus is further suitably used in canceling the extra retardation at the oblique viewing angle of the liquid crystal cell in the liquid crystal display of the vertical alignment mode.

The film having a thickness of less than or equal to 20 μm is more preferably formed by coating.

A stacked body in which the positive C plate and the first negative C plate are stacked without a film exhibiting birefringence interposed therebetween (hereinafter referred to as "first stacked retardation film") or a stacked body having a retardation property substantially the same as the first stacked retardation film and including at least two films exhibiting birefringence are stacked (hereinafter referred to as "second stacked retardation film") are respectively used in combination with the positive A plate (preferably, a positive A plate of the present invention) in the liquid crystal display of vertical alignment mode, so that maintenance of orthogonality at the oblique viewing angle of the polarizing elements arranged at Cross-Nicol and cancellation of the extra retardation at the oblique viewing angle of the liquid crystal cell are performed. In the present specification, that stacked without a film exhibiting birefringence interposed includes, in addition to when stacked without interposing a film and when stacked with a film (isotropic film) that does not exhibit birefringence interposed, when stacked with a film exhibiting birefringence interposed but substantially obtaining the desired effects. The retardation property refers the effective retardation and the wavelength dependency measured at a predetermined angle (oblique viewing angle) greater than 0° from the normal line direction of the retardation film.

The form of the first stacked retardation film may be, for example, a form in which at least one of the positive C plate and the first negative C plate configuring the first stacked retardation film is configured by the stacked body of two or more retardation elements each satisfying 0 nm≦Rxy(550)≦10 nm, and a form in which at least one of the two or more retardation elements is a film having a thickness of less than or equal to 20 μm in the above form. Since the two or more retardation elements configuring the stacked body each has the retardation Rxy(550) in the in plane direction sufficiently reduced, it is more suitably used in maintaining orthogonality at the oblique viewing angle of the polarizing elements arranged in Cross-Nicol and in canceling the extra retardation at the oblique viewing angle of the liquid crystal cell in the liquid crystal display of the vertical alignment mode. In the form where at least one of the retardation elements is a film having a thickness of less than or equal to 20 μm, the influence on the retardation by the stacking of the retardation elements is sufficiently reduced, and thus is further suitably used in maintaining orthogonality at the oblique viewing angle of the polarizing elements arranged in Cross-Nicol in the liquid crystal display of the vertical alignment mode and canceling the extra retardation at the oblique viewing angle of the liquid crystal cell of the vertical alignment mode etc.

The film having a thickness of less than or equal to 20 μm is preferably formed by coating.

The form of the second stacked retardation film may be, for example, a form in which at least one film exhibiting birefringence configuring the second stacked retardation film is configured from the stacked body of two or more retardation elements each satisfying 0 nm≦Rxy(550)≦10 nm, and a form in which at least one of the two or more retardation elements is a film having a thickness of less than or equal to 20 μm in the above form. Since the two or more retardation elements configuring the stacked body each has the retardation Rxy(550) in the in plane direction sufficiently reduced, it is more suitably used in maintaining orthogonality at the oblique viewing angle of the polarizing elements arranged in Cross-Nicol in the liquid crystal display of the vertical alignment mode and in canceling the extra retardation at the oblique viewing angle of the liquid crystal cell of the vertical alignment mode. In the form where at least one of the retardation elements is a film having a thickness of less than or equal to 20 μm, the influence on the retardation by the stacking of the retardation elements is sufficiently reduced, and thus is further suitably used in maintenance of orthogonality at the oblique viewing angle of the polarizing elements arranged in Cross-Nicol in the liquid crystal display of the vertical alignment mode and canceling the extra retardation at the oblique viewing angle of the liquid crystal cell of the vertical alignment mode etc.

The film having a thickness of less than or equal to 20 μm is preferably formed by coating.

The second negative C plate of the present invention satisfies the following equations (19) to (22).

In equations (19) to (22), $Rxy(\lambda)$, $Rxz(\lambda)$ represent the retardation Rxy, Rxz of the retardation film at wavelength λ nm respectively, and are defined as $Rxy=(nx-ny)\times d$, $Rxz=(nx-nz)\times d$ where nx, ny (nx≧ny) are the principal refraction indexes in the in plane direction, nz is the principal refraction index in the out of plane direction, and d is the thickness in the retardation film.

$$0 \text{ nm} \leq Rxy(550) \leq 10 \text{ nm} \tag{19}$$

$$108 \text{ nm} \leq Ryz(550) \leq 379 \text{ nm} \tag{20}$$

$$1.04 \leq Rxz(450)/Rxz(550) \tag{21}$$

$$Rxz(650)/Rxz(550) \leq 0.98 \tag{22}$$

If the second negative C plate satisfies equation (19), the retardation Rxy(550) in the in plane direction is sufficiently reduced, and in combination with the positive A plate in the liquid crystal display of vertical alignment mode, the second negative C plate is suitably used in maintaining orthogonality at the oblique viewing angle of the polarizing elements arranged in Cross-Nicol, and is suitably used in canceling the extra retardation at the oblique viewing angle of the liquid crystal cell. The preferred upper limit of Rxy(550) is 5 nm. Therefore, the second negative C plate preferably satisfies 0 nm≦Rxy(550)≦5 nm. The preferred upper limit of Rxy(550) is 3 nm.

If the first negative C plate satisfies equation (20), the retardation Rxz(550) in the out of plane direction is adjusted to a range suitable for maintaining orthogonality at the oblique viewing angle of the polarizing elements arranged in Cross-Nicol and canceling the extra retardation at the oblique viewing angle of the liquid crystal cell in the liquid crystal display of vertical alignment mode.

If the second negative C plate satisfies equations (21) and (22), the wavelength dispersion property of the retardation Rxz in the out of plane direction satisfies the wavelength dispersion property (forward wavelength dispersion property) necessary for canceling the extra retardation at the oblique viewing angle of the liquid crystal cell in the liquid crystal display of vertical alignment mode, thereby effectively preventing the coloration phenomenon at the oblique viewing angle.

The form of the second negative C plate may be, for example, a form configured by a single layer, a form configured by a stacked body of two or more retardation elements satisfying 0 nm≦Rxy(550)≦10 nm, and a form in the above forms where at least one of the two or more retardation elements is a film having a thickness of less than or equal to 20 μm. If the second negative C plate is configured by a single layer, it can be easily and conveniently manufactured, enhancing reliability (durability), and achieving thinning. If the second negative C plate is configured by a stacked body, the degree of freedom can be enhanced in film design of selecting the film material and the like compared to when configured by a single layer. Since the two or more retardation elements configuring the stacked body each has the retardation Rxy(550) in the in plane direction sufficiently reduced, it is more suitably used in maintaining orthogonality at the oblique viewing angle of the polarizing elements arranged in Cross-Nicol and in canceling the extra retardation at the oblique viewing angle of the liquid crystal cell in the liquid crystal display of the vertical alignment mode. In the form where at least one of the retardation elements is a film having a thickness of less than or equal to 20 μm, it is further suitably used in maintaining orthogonality at the oblique viewing angle of the polarizing elements arranged in Cross-Nicol and canceling the extra retardation at the oblique viewing angle of the liquid crystal cell in the liquid crystal display of the vertical alignment mode.

The film having a thickness of less than or equal to 20 μm is preferably formed by coating.

The preferred Embodiment of the polarizing film using the retardation film of the present invention will now be described. The present invention relates to a polarizing film including the positive A plate and the polarizing element, wherein the polarizing film is stacked without interposing a film exhibiting birefringence between the positive A plate and the polarizing element, and the nx direction of the positive A plate and the absorption axis of the polarizing element are arranged in a substantially orthogonal relationship.

The polarizing film using the positive A plate of the present invention (hereinafter referred to as "polarizing film PA") is used in combination with the positive C plate (preferably, positive C plate of the present invention) or the polarizing film (preferably, polarizing film PC of the present invention) including the positive C plate and the polarizing element, thus being effective in performing the maintenance of orthogonality at the oblique viewing angle of the polarizing elements arranged at Cross-Nicol arrangement in the region of wide wavelength of red, blue, green (R, G, B) in the liquid crystal display. And the positive A plate and the polarizing element are stacked without interposing a film exhibiting birefringence such as the supporting layer (e.g., protective film of TAC film etc.) for protecting polarizing element between the positive A plate and the polarizing element thereby allowing amore efficient retardation compensation. Furthermore, since the nx direction of the positive A plate of the present invention and the absorption axis of the polarizing element are arranged at a substantially orthogonal relationship, the retardation change is not applied to the linear polarized light passed through the polarizing element and entered from the perpendicular direction.

The present invention relates to a polarizing film including the positive C plate and the polarizing element, wherein the polarizing film is stacked without interposing a film exhibiting birefringence between the positive C plate and the polarizing element.

The polarizing film using the positive C plate of the present invention (hereinafter referred to as "polarizing film PC") is used in combination with the positive A plate (preferably, positive A plate of the present invention) or the polarizing film (preferably, polarizing film PA of the present invention) including the positive A plate and the polarizing element, thus being effective in performing the maintenance of orthogonality at the oblique viewing angle of the polarizing elements arranged at Cross-Nicol arrangement in the region of wide wavelength of red, blue, green (R, G, B) in the liquid crystal display. And the positive C plate and the polarizing element are stacked without interposing a film exhibiting birefringence between the positive C plate and the polarizing element thereby allowing a more efficient retardation compensation. Furthermore, since the positive C plate of the present invention is substantially isotropic optically in the in plane direction, the retardation change is not applied to the linear polarized light passed through the polarizing element and entered from the perpendicular direction.

The present invention relates to a polarizing film including the biaxial retardation film and the polarizing element, wherein the polarizing film is stacked without interposing a film exhibiting birefringence between the biaxial retardation film and the polarizing element, and the nx direction of the biaxial retardation film and the absorption axis of the polarizing element are arranged in a substantially orthogonal or a substantially parallel relationship.

The polarizing film using the biaxial retardation film of the present invention (hereinafter referred to as "polarizing film BI") is used alone in the liquid crystal display, thus being effective in performing the maintenance of orthogonality at the oblique viewing angle of the polarizing elements arranged at Cross-Nicol arrangement in the region of wide wavelength of red, blue, green (R, G, B). And the biaxial retardation film and the polarizing element are stacked without interposing a film exhibiting birefringence between the biaxial retardation film and the polarizing element thereby allowing a more efficient retardation compensation. Furthermore, since the nx direction of the biaxial retardation film and the absorption axis of the polarizing element are arranged in a substantially orthogonal or a substantially parallel arrangement, the retardation change is not applied to the linear polarized light passed through the polarizing element and entered from the perpendicular direction.

The present invention relates to a polarizing film including a first stacked retardation film and the polarizing element, wherein the polarizing film is stacked without interposing a film exhibiting birefringence between the first stacked retardation film and the polarizing element.

The polarizing film using the first stacked retardation film of the present invention (hereinafter referred to as "polarizing film LA1") is used in combination with the positive A plate (preferably, positive A plate of the present invention), or the polarizing film (preferably, polarizing film PA of the present invention) including the positive A plate and the polarizing element, thus being effective in performing the maintenance of orthogonality at the oblique viewing angle of the polarizing elements arranged at Cross-Nicol arrangement and cancellation of the extra retardation at the oblique viewing angle of the liquid crystal cell in the region of wide wavelength of red, blue, green (R, G, B) in the liquid crystal display of vertical alignment mode. And the first stacked retardation film and the polarizing element are stacked without interposing a film exhibiting birefringence such as the supporting layer (e.g., protective film of TAC film etc.) for protecting polarizing element between the first stacked retardation film and the polarizing element thereby allowing a more efficient retardation compensation.

The present invention relates to a polarizing film including a second stacked retardation film and a polarizing element, wherein the polarizing film is stacked without interposing a film exhibiting birefringence between the second stacked retardation film and the polarizing element.

The polarizing film using the second stacked retardation film of the present invention (hereinafter referred to as "polarizing film LA2") is used in combination with the positive A plate (preferably, positive A plate of the present invention), or the polarizing film (preferably, polarizing film PA of the present invention) including the positive A plate and the polarizing element, thus being effective in performing the maintenance of orthogonality at the oblique viewing angle of the polarizing elements arranged at Cross-Nicol arrangement and cancellation of the extra retardation at the oblique viewing angle of the liquid crystal cell in the region of wide wavelength of red, blue, green (R, G, B) in the liquid crystal display of vertical alignment mode. And the second stacked retardation film and the polarizing element are stacked without interposing a film exhibiting birefringence such as the supporting layer (e.g., protective film of TAC film etc.) for protecting polarizing element between the second stacked retardation film and the polarizing element thereby allowing a more efficient retardation compensation.

The present invention relates to a polarizing film including a second negative C plate and a polarizing element, wherein the polarizing film is stacked without interposing a film exhibiting birefringence between the second negative C plate and the polarizing element.

The polarizing film using the second negative C plate of the present invention (hereinafter referred to as "polarizing film NC2") is used in combination with the positive A plate (preferably, positive A plate of the present invention), or the polarizing film (preferably, polarizing film PA of the present invention) including the positive A plate and the polarizing element, thus being effective in performing the maintenance of orthogonality at the oblique viewing angle of the polarizing elements arranged at Cross-Nicol arrangement and cancellation of the extra retardation at the oblique viewing angle of the liquid crystal cell in the region of wide wavelength of red, blue, green (R, G, B) in the liquid crystal display of vertical alignment mode. And the second negative C plate and the polarizing element are stacked without interposing a film exhibiting birefringence such as the supporting layer (e.g., protective film of TAC film etc.) for protecting polarizing element between the second negative C plate and the polarizing element thereby allowing a more efficient retardation compensation.

The preferred Embodiment of the liquid crystal display using the polarizing film of the present invention will now be described. The present invention relates to a liquid crystal display including a liquid crystal cell, and a first polarizing film and a second polarizing film in a Cross-Nicol relationship with each other at both sides of the liquid crystal cell, wherein the first polarizing film is a polarizing film PA, the second polarizing film is a polarizing film PC, and the first polarizing film and the second polarizing film have the side of the positive A plate and the positive C plate on the liquid crystal cell side.

According to the liquid crystal display in which the polarizing film PA is arranged on one side of the liquid crystal cell, and the polarizing film PC is arranged on the other side, the maintenance of orthogonality at the oblique viewing angle of the polarizing elements in Cross-Nicol arrangement is performed in a region of wide wavelength of red, blue green (R, G, B), and thus the coloration phenomenon at the oblique viewing angle is prevented, wider viewing angle is achieved, and high display quality is obtained.

In the present invention, the first polarizing film and the second polarizing film may be directly contacted to or may not be directly contacted to the liquid crystal cell.

The present invention relates to a liquid crystal display including a liquid crystal cell, and first polarizing film and second polarizing film in a Cross-Nicol relationship with each other at both sides of the liquid crystal cell, wherein the first polarizing film is a polarizing film PA and has the side of the positive A plate on the liquid crystal cell side, and the liquid crystal display has the positive C plate stacked without interposing a film exhibiting birefringence on the liquid crystal cell side of the first polarizing film.

According to the liquid crystal display in which the positive A plate of the present invention and the positive C plate of the present invention are arranged on the liquid crystal cell side than the polarizing element on one side of the liquid crystal cell, the maintenance of orthogonality at the oblique viewing angle of the polarizing elements in Cross-Nicol arrangement is performed in a region of wide wavelength of red, blue green (R, G, B), and thus the coloration phenomenon at the oblique viewing angle is prevented, wider viewing angle is achieved, and high display quality is obtained.

In this aspect, the positive C plate of the present invention is substantially isotropic optically in the in plane direction, and thus the retardation change is not applied to the linear polarized light passed through the polarizing element and entered from the perpendicular direction. In this aspect, it is preferable that the second polarizing film includes a polarizing element and the liquid crystal display does not include a film exhibiting birefringence between the polarizing element of the second polarizing film and the liquid crystal cell.

The present invention relates to a liquid crystal display including a liquid crystal cell, and a first polarizing film and a second polarizing film in a Cross-Nicol relationship with each other at both sides of the liquid crystal cell, wherein the first polarizing film is a polarizing film PC and has the side of the positive C plate on the liquid crystal cell side, and the liquid crystal display has the positive A plate stacked with the nx direction thereof and the absorption axis of the polarizing element configuring the first polarizing film in a substantially parallel relationship without interposing a film exhibiting birefringence on the liquid crystal cell side of the first polarizing film.

According to the liquid crystal display in which the positive C plate of the present invention and the positive A plate of the present invention are arranged on the liquid crystal cell side than the polarizing element on one side of the liquid crystal cell, the maintenance of orthogonality at the oblique viewing angle of the polarizing elements in Cross-Nicol arrangement is performed in a region of wide wavelength of red, blue green (R, G, B), and thus the coloration phenomenon at the oblique viewing angle is prevented, wider viewing angle is achieved, and high display quality is obtained. Furthermore, since the positive A plate of the present invention is arranged with the nx direction and the absorption axis of the polarizing element in a substantially orthogonal relationship, the retardation change is not applied to the linear polarized light passed through the polarizing element and entered from the perpendicular direction.

The present invention relates to a liquid crystal display including a liquid crystal cell, and a first polarizing film and a second polarizing film in a Cross-Nicol relationship with each other at both sides of the liquid crystal cell, wherein the first polarizing film is a polarizing film BI and has the side of the biaxial retardation film on the liquid crystal cell side.

According to the liquid crystal display in which the biaxial retardation film of the present invention is arranged on the liquid crystal cell side than the polarizing element, the maintenance of orthogonality at the oblique viewing angle of the polarizing elements in Cross-Nicol arrangement is performed in a region of wide wavelength of red, blue green (R, G, B), and thus the coloration phenomenon at the oblique viewing angle is effectively prevented, wider viewing angle is achieved, and high display quality is obtained.

The liquid crystal display preferably performs the display of black with the majority of liquid crystal molecules at the liquid crystal cell aligned substantially perpendicular to the substrate and the in plane retardation at substantially zero.

In the liquid crystal display of the present invention of the vertical alignment mode (VA mode), the positive A plate of the present invention and the positive C plate of the present invention or the biaxial retardation film of the present invention is arranged on the liquid crystal cell side than the polarizing element, thus the maintenance of orthogonality at the oblique viewing angle of the polarizing elements arranged at Cross-Nicol, which was a problem in the conventional liquid crystal display of VA mode, is performed in a region of wide wavelength of red, blue, and green (R, G, B), and thus the coloration phenomenon at the oblique viewing angle is effectively prevented, wider viewing angle is achieved, and particularly-high display quality is obtained. Furthermore, high contrast ratio is obtained, similar to the conventional liquid crystal display of VA mode.

In the present specification, substantially perpendicular includes, in addition to being completely perpendicular, an error span in which the desired effect can be substantially obtained, and substantially zero includes, in addition to being zero, an error span in which the desired effect can be substantially obtained.

The liquid crystal display preferably has a uniaxial retardation film in a relationship adjacent to the liquid crystal cell without a film exhibiting birefringence, and the uniaxial retardation film satisfying the following equations (23) and (24), and that has an optical axis out of plane and where extraordinary ray refraction index<ordinary ray refraction index. In equations (23) and (24), $Rxy(\lambda)$, $Rxz(\lambda)$ represent the retardation Rxy, Rxz of the retardation film at wavelength $\lambda$nm respectively, and are defined as $Rxy=(nx-ny)\times d$, $Rxz=(nx-nz)\times d$ where nx, ny ($nx \geqq ny$) are the principal refraction indexes in the in plane direction, nz is the principal refraction index in the out of plane direction, and d is the thickness in the retardation film. Furthermore, in equation (24), $Rlc(\lambda)$ represents the retardation Rlc of the liquid crystal cell at wavelength $\lambda$nm, and is defined as $Rlc=(ne-no)\times d'$ where ne is the extraordinary ray refraction index of the liquid crystal cell, no is the ordinary ray refraction index, and d' is the thickness.

$$0 \text{ nm} \leqq Rxy(550) \leqq 10 \text{ nm} \quad (23)$$

$$0 \text{ nm} \leqq Rlc(550) - Rxz(550) \leqq 35 \text{ nm} \quad (24)$$

If the uniaxial retardation film that satisfies the equations (23) and (24), and that has an optical axis out of plane and where extraordinary ray refraction index<ordinary ray refraction index (hereinafter also referred to as "third negative C plate") satisfies equation (23), the retardation Rxy(550) in the in plane direction is sufficiently reduced, and is suitably used in performing the viewing angle compensation of the liquid crystal cell in the liquid crystal display of VA mode. The preferred upper limit of Rxy(550) is 5 nm.

If the third negative C plate satisfies equation (24), the retardation Rxz(550) in the out of plane direction is adjusted to a suitable range for performing the viewing angle compensation at the oblique viewing angle of the liquid crystal cell in the liquid crystal display of VA mode. The preferred lower limit of Rlc(550)−Rxz(550) is 10 nm, and the preferred upper limit is 30 nm.

According to the liquid crystal display in which the third negative C plate is arranged in a relationship of being adjacent to the liquid crystal cell without a film exhibiting birefringence, the viewing angle compensation at the oblique viewing angle of the liquid crystal cell in the liquid crystal display of VA mode is effectively performed.

The preferred form of the third negative C plate may be a form configured by a stacked body of two or more retardation elements having the optical axis out of plane. Compared to when configured by a single layer, when the third negative C plate is configured by a stacked body, the degree of freedom of film design such as selection of film material can be enhanced.

The third negative C plate preferably satisfies $Rxz(450) \geqq Rxz(550) \geqq Rxz(650)$. If the retardation Rxz in the out of plane direction in the third negative C plate has forward wavelength dispersion property, the viewing angle compensation at the oblique viewing angle of the liquid crystal cell in the liquid crystal display of VA mode can be effectively performed, and the coloration phenomenon at the oblique viewing angle can be effectively prevented.

The third negative C plate preferably satisfies $0 \text{ nm} \leqq Rlc(450) - Rxz(450) \leqq 35 \text{ nm}$ and $0 \text{ nm} \leqq Rlc(650) - Rxz(650) \leqq 35 \text{ nm}$. As a result, the viewing angle compensation at the oblique viewing angle of the liquid crystal cell in the liquid crystal display of VA mode can be performed in a range of wide wavelength of red, blue, green (R, G, B), the coloration phenomenon at the oblique viewing angle is further effectively prevented. The more preferable lower limit of Rlc(450)−Rxz(450) is 10 nm, and the more preferable upper limit is 30 nm. The more preferably lower limit of Rlc(650)−Rxz(650) is 10 nm, and the more preferable upper limit is 30 nm.

The liquid crystal display is preferably that which performs display of black with the majority of liquid crystal molecules in the liquid crystal cell aligned substantially parallel to the substrate and substantially orthogonal to the absorption axis of the first polarizing film, and that in which a film exhibiting birefringence is not present between the second polarizing film and the liquid crystal cell.

Since the positive A plate of the present invention and the positive C plate of the present invention or the biaxial retardation film of the present invention is arranged on the liquid crystal cell side than the polarizing element in the liquid crystal display of the present invention of in plane switch mode (IPS mode), the maintenance of orthogonality at the oblique viewing angle of the polarizing element arranged in Cross-Nicol, which was a problem in the conventional liquid crystal display of IPS mode, is performed in a region of wide wavelength of red, blue, green (R, G, B), and thus the coloration phenomenon at the oblique viewing angle is effectively prevented, wider viewing angle is achieved, and particularly-high display quality is obtained.

In such aspect of the IPS mode, it is preferable that the second polarizing film includes a polarizing element and the liquid crystal display does not include a film exhibiting birefringence between the polarizing element of the second polarizing film and the liquid crystal cell.

The present invention relates to a liquid crystal display including a liquid crystal cell for performing display of black with majority of liquid crystal molecules aligned substantially perpendicular to the substrate and with the in plane retardation substantially zero, and a first polarizing film and a second polarizing film in a Cross-Nicol relationship with each other at both sides of the liquid crystal cell, where the first polarizing film is a polarizing film PA, the second polarizing film is a polarizing film LA1, polarizing film LA2 or polarizing film NC2, and the polarizing films respectively have the side of the retardation film on the liquid crystal cell side.

According to the liquid crystal display of VA mode in which the polarizing film PA of the present invention is arranged on one side of the liquid crystal cell, and the polarizing film LA1 of the present invention, the polarizing film LA2 of the present invention, or the polarizing film NC2 of the present invention is arranged on the other side, the maintenance of orthogonality at the oblique viewing angle of the polarizing elements arranged in Cross-Nicol and cancellation of the extra retardation at the oblique viewing angle of the liquid crystal cell are performed in a region of wide wavelength of red, blue green (R, G, B) since the first stacked retardation film, the second stacked retardation film, or the second negative C plate of the present invention is arranged on the liquid crystal cell side than the polarizing element, and thus the coloration phenomenon at the oblique viewing angle is effectively prevented, wider viewing angle is achieved, and high display quality is obtained. Furthermore, high contrast ratio is obtained, similar to the conventional liquid crystal display of VA mode, in the liquid crystal display of the present invention of VA mode.

In the present invention, the first polarizing film and the second polarizing film may be directly contacted to or may not be directly contacted to the liquid crystal cell.

The present invention relates to a liquid crystal display including a liquid crystal cell for performing display of black with majority of liquid crystal molecules aligned substantially perpendicular to the substrate and with the in plane retardation substantially zero, and a first polarizing film and a second polarizing film in a Cross-Nicol relationship with each other at both sides of the liquid crystal cell, wherein the first polarizing film is a polarizing film PA and has the side of the positive A plate on the liquid crystal cell side, and the liquid crystal display is a liquid crystal display in which the first stacked retardation film, the second stacked retardation film, or the second negative C plate is stacked without interposing a film exhibiting birefringence on the liquid crystal cell side of the first polarizing film.

According to the liquid crystal display of VA mode in which the positive A plate of the present invention and the fist stacked retardation film of the present invention, the second stacked retardation film of the present invention, or the second negative C plate of the present invention are arranged on the liquid crystal cell side of the polarizing elements, the maintenance of orthogonality at the oblique viewing angle of the polarizing elements arranged in Cross-Nicol and cancellation of the extra retardation at the oblique viewing angle of the liquid crystal cell are performed in a region of wide wavelength of red, blue green (R, G, B), and thus the coloration phenomenon at the oblique viewing angle is effectively prevented, wider viewing angle is achieved, and high display quality is obtained. Furthermore, high contrast ratio is obtained, similar to the conventional liquid crystal display of VA mode, in the liquid crystal display of the present invention of the vertical alignment mode (VA mode).

The present invention relates to a liquid crystal display including a liquid crystal cell for performing display of black with majority of liquid crystal molecules aligned substantially perpendicular to the substrate and with the in plane retardation substantially zero, and a first polarizing film and a second polarizing film in a Cross-Nicol relationship with each other at both sides of the liquid crystal cell, wherein the first polarizing film is a polarizing film PA, the second polarizing film satisfies the following equations (25) and (26) and includes a uniaxial retardation film having optical axis out of plane and where extraordinary ray refraction index<ordinary ray refraction index and polarizing element, and the polarizing films are each stacked without interposing a film exhibiting birefringence between the retardation film and the polarizing element, the side of the retardation film being positioned on the liquid crystal cell side. In equations (25) and (26), $Rxy(\lambda)$, $Rxz(\lambda)$ represent the retardation Rxy, Rxz of the retardation film at wavelength λnm respectively, and are defined as $Rxy=(nx-ny)\times d$, $Rxz=(nx-nz)\times d$ where nx, ny ($nx \geq ny$) are the principal refraction indexes in the in plane direction, nz is the principal refraction index in the out of plane direction, and d is the thickness in the retardation film. Furthermore, in equation (26), $Rlc(\lambda)$ represents the retardation Rlc of the liquid crystal cell at wavelength % nm, and is defined as $Rlc=(ne-no)\times d'$ where ne is the extraordinary ray refraction index of the liquid crystal cell, no is the ordinary ray refraction index, and d' is the thickness.

$$0 \text{ nm} \leq Rxy(550) \leq 10 \text{ nm} \tag{25}$$

$$71 \text{ nm} \leq Rlc(550)-Rxz(550) \leq 142 \text{ nm} \tag{26}$$

If the uniaxial retardation film that satisfies equations (25) and (26), and that has an optical axis out of plane and where extraordinary ray refraction index<ordinary ray refraction index (hereinafter also referred to as "fourth negative C plate") satisfies equation (25), the retardation Rxy(550) in the in plane direction is sufficiently reduced, and is suitably used in performing the viewing angle compensation of the liquid crystal cell in the liquid crystal display of VA mode. The preferred upper limit of Rxy(550) is 3 nm.

If the fourth negative C plate satisfies equation (26), the retardation Rxz(550) in the out of plane direction is adjusted to a suitable range for performing the viewing angle compensation at the viewing angle of the liquid crystal cell in the liquid crystal display of VA mode. The preferred lower limit of Rlc(550)−Rxz(550) is 80 nm, and the preferred upper limit is 110 nm.

According to the liquid crystal display of the VA mode in which the positive A plate of the present invention is arranged on one side of the liquid crystal cell, and the fourth negative C plate is arranged on the other side, the maintenance of orthogonality at the oblique viewing angle of the polarizing elements arranged in Cross-Nicol and cancellation of the extra retardation at the oblique viewing angle of the liquid crystal cell are performed in a region of wide wavelength of red, blue green (R, G, B), and thus the coloration phenomenon at the oblique viewing angle is effectively prevented, wider viewing angle is achieved, and high display quality is obtained. Furthermore, high contrast ratio is obtained, similar to the conventional liquid crystal display of VA mode, in the liquid crystal display of the present invention of the VA mode.

In the present invention, the first polarizing film and the second polarizing film may be directly contacted to or may not be directly contacted to the liquid crystal cell.

The present invention relates to a liquid crystal display including a liquid crystal cell for performing display of black with majority of liquid crystal molecules aligned substantially perpendicular to the substrate and with the in plane retardation substantially zero, and a first polarizing film and a second polarizing film in a Cross-Nicol relationship with each other at both sides of the liquid crystal cell, wherein the first polarizing film is a polarizing film PA and has the side of the positive A plate on the liquid crystal cell side, and the liquid crystal display is a liquid crystal display in which the fourth negative C plate is stacked without interposing a film exhibiting birefringence on the liquid crystal cell side of the first polarizing film.

According to the liquid crystal display of VA mode in which the positive A plate of the present invention and the fourth negative C plate of the present invention are arranged on one side of the liquid crystal cell, the maintenance of orthogonality at the oblique viewing angle of the polarizing elements arranged in Cross-Nicol is performed in a region of wide wavelength of red, blue green (R, G, B) by using the positive A plate of the present invention in combination with the positive C plate (positive C plate of present invention is preferable), and cancellation of the extra retardation at the oblique viewing angle of the liquid crystal cell is performed in a region of wide wavelength of red, blue green (R, G, B) by using the fourth negative C plate of the present invention, and thus the coloration phenomenon at the oblique viewing angle is effectively prevented, wider viewing angle is achieved, and high display quality is obtained. Furthermore, high contrast ratio is obtained, similar to the conventional liquid crystal display of VA mode, in the liquid crystal display of the present invention of the vertical alignment mode (VA mode).

The fourth negative C plate preferably satisfies the following equation (27). In equation (27), $Rxz(\lambda)$ represents the retardation Rxz of the retardation film at wavelength $\lambda$nm, and is defined as $Rxz=(nx-nz) \times d$ where nx, ny ($nx \geq ny$) are the principal refraction indexes in the in plane direction, nz is the principal refraction index in the out of plane direction, and d is the thickness in the retardation film. Furthermore, $Rlc(\lambda)$ represents the retardation Rlc of the liquid crystal cell at wavelength $\lambda$nm, and is defined as $Rlc=(ne-no) \times d'$ where ne is the extraordinary ray refraction index, no is the ordinary ray refraction index, and d' is the thickness in the liquid crystal cell.

$$\{Rlc(450)-Rxz(450)\} \leq \{Rlc(550)-Rxz(550)\} \leq \{Rlc(650)-Rxz(650)\} \quad (27)$$

If the fourth negative C plate satisfies equation (27), the wavelength dispersion property of the retardation Rxz in the out of plane direction satisfies the wavelength dispersion property (forward wavelength dispersion property) necessary for performing cancellation of the extra retardation at the oblique viewing angle of the liquid crystal cell in the liquid crystal display of vertical alignment mode, and effectively prevents the coloration phenomenon at the oblique viewing angle.

The fourth negative C plate preferably satisfies equations (28) and (29). The $Rxz(\lambda)$ in equations (28) and (29) represents the retardation Rxz of the retardation film at wavelength $\lambda$nm, and is defined as $Rxz=(nx-nz) \times d$ where nx, ny ($nx \geq ny$) are the principal refraction indexes in the in plane direction, nz is the principal refraction index in the out of plane direction, and d is the thickness in the retardation film. Furthermore, $Rlc(\lambda)$ represents the retardation Rlc of the liquid crystal cell at wavelength $\lambda$nm, and is defined as $Rlc=(ne-no) \times d'$ where ne is the extraordinary ray refraction index, no is the ordinary ray refraction index, and d' is the thickness in the liquid crystal cell.

$$0.75 \leq \{Rlc(450)-Rxz(450)\}/\{Rlc(550)-Rxz(550)\} \leq 0.97 \quad (28)$$

$$1.03 \leq \{Rlc(650)-Rxz(650)\}/\{Rlc(550)-Rxz(550)\} \leq 1.25 \quad (29)$$

If the fourth negative C plate satisfies the equations (28) and (29), the wavelength dispersion property of the retardation Rxz in the out of plane direction satisfies the wavelength dispersion property (forward wavelength dispersion property) necessary for performing cancellation of the extra retardation at the oblique viewing angle of the liquid crystal cell in the liquid crystal display of vertical alignment mode, and effectively prevents the coloration phenomenon at the oblique viewing angle. The more preferred lower limit of $\{Rlc(450)-Rxz(450)\}/\{Rlc(550)-Rxz(550)\}$ is 0.78, and the more preferably upper limit 0.86. The more preferred lower limit of $\{Rlc(650)-Rxz(650)\}/\{Rlc(550)-Rxz(550)\}$ is 1.14, and the more preferably upper limit 1.22.

The present invention relates to a liquid crystal display including a liquid crystal cell, and polarizing films being in a Cross-Nicol relationship with each other at both sides of the liquid crystal cell, where at least one polarizing film includes a retardation film having reverse wavelength dispersion property, and the liquid crystal display includes a retardation film having the wavelength dispersion property substantially the same as the liquid crystal layer configuring the liquid crystal cell. According to the liquid crystal display of the present invention, the maintenance of orthogonality at the oblique viewing angle of the polarizing elements arranged in Cross-Nicol is performed in the region of wide wavelength of red, blue, green (R, G, B) by the retardation film having the wavelength dispersion property arranged at the polarizing film, and the cancellation of the extra retardation at the oblique viewing angle of the liquid crystal cell is performed in the region of wide wavelength of red, blue, green (R, G, B) by the retardation film having the reverse wavelength dispersion property substantially the same as the liquid crystal layer configuring the liquid crystal cell, whereby the liquid crystal display of vertical alignment mode (VA mode) etc. that effectively prevents the coloration phenomenon at the oblique viewing angle, achieves wider viewing angle and has particularly-high display quality is provided. Furthermore, in addition to a form in which the extra retardation at the oblique viewing angle of the liquid crystal cell is completely canceled by the retardation film having the wavelength dispersion property substantially the same as the liquid crystal layer, as described above, a form in which, in the VA mode, only some of the extra retardation at the oblique viewing angle of the liquid crystal cell is canceled by the negative C plate (retardation film having wavelength dispersion property substantially the same as the liquid crystal layer, for example, second negative C plate of the present invention) having forward wavelength dispersion property larger than that in the liquid crystal cell that is a positive C plate having forward wavelength dispersion property (the changing rate of the retardation for wavelength change is larger) may be provided. In this case, some of the extra retardation at the oblique viewing angle of the liquid crystal cell which is the positive C plate remains, but such retardation shows reverse wavelength dispersion property. The maintenance of orthogonality at the oblique viewing angle of the polarizing elements arranged in Cross-Nicol is performed by combining this positive C plate having reverse wavelength dispersion property and the positive A plate having reverse wavelength dispersion property.

In the present specification, the reverse wavelength dispersion property refers to the wavelength property that satisfies the relationship (retardation at wavelength 450 nm)≦(retardation at wavelength 550 nm)≦(retardation at wavelength 650 nm), the forward wavelength dispersion property refers to the wavelength property that satisfies the relationship (retardation at wavelength 450 nm)≧(retardation at wavelength 550 nm)≧(retardation at wavelength 650 nm), and flat wavelength dispersion property refers to the wavelength property that satisfies the relationship (retardation at wavelength 450 nm)≅(retardation at wavelength 550 nm)≅(retardation at wavelength 650 nm). Furthermore, the wavelength dispersion property substantially the same as the liquid crystal layer configuring the liquid crystal cell refers to the reverse wavelength dispersion property if the wavelength dispersion property of the liquid crystal layer is the reverse wavelength dispersion property, refers to the forward wavelength dispersion property if the wavelength dispersion property of the liquid crystal layer is the forward wavelength dispersion property, and refers to the flat wavelength dispersion property if the wavelength dispersion property of the liquid crystal layer is the flat wavelength dispersion property. In the liquid crystal cell of VA mode, the retardation film having the wavelength dispersion property substantially the same as the liquid crystal layer configuring the liquid crystal cell is preferably the retardation film having forward wavelength dispersion property, and preferably satisfies 0 nm≦Rlc(450)−Rxz(450)≦35 nm, 0 nm≦Rlc(550)−Rxz(550)≦35 nm, and 0 nm≦Rlc(650)−Rxz(650)≦35 nm.

The material of the retardation film having reverse wavelength dispersion property includes modified polycarbonate and the like. With regards to the retardation film having reverse wavelength dispersion property, that in which the retardation becomes greater as the wavelength becomes longer in the visible light wavelength region (380 to 780 nm) is preferred. The material of the retardation film having forward wavelength dispersion property includes polycarbonate, polysulfone, polymethyl methacrylate, and the like. The material of the retardation film having flat wavelength dispersion property includes norbornene resin and the like.

The preferred aspect of the liquid crystal display of the present invention includes an aspect in which at least one of the retardation films having reverse wavelength dispersion property or having wavelength dispersion property substantially the same as the liquid crystal layer is configured by a stacked body of two or more retardation elements. The degree of freedom in film design such as selection of the film material and the like can be enhanced compared to when configuring with a single layer by configuring the retardation film as a stacked body of two or more retardation elements. Furthermore, by being formed by a stacked body, the optimization of the wavelength dispersion property at the oblique viewing angle can be realized as opposed to when simply using a plurality of various retardation elements without considering the arranging form (arranging location).

The preferred aspect of the liquid crystal display of the present invention includes an aspect in which the retardation film having reverse wavelength dispersion property is made of at least one selected from a group consisting of a uniaxial retardation film (positive A plate) having optical axis in plane and where extraordinary ray refraction index>ordinary ray refraction index, a uniaxial retardation film (positive C plate) having optical axis out of plane and where extraordinary ray refraction index>ordinary ray refraction index, and a biaxial retardation film, and the retardation film having wavelength dispersion property substantially the same as the liquid crystal is a uniaxial retardation film (negative C plate) having optical axis out of plane and where extraordinary ray refraction index<ordinary ray refraction index. In such liquid crystal display of the present invention, any of the positive A plate of the present invention, the positive C plate of the present invention, the biaxial retardation film of the present invention, the polarizing film PA of the present invention, the polarizing film PC of the present invention, the polarizing film BI of the present invention, the first negative C plate of the present invention, the second negative C plate of the present invention, the third negative C plate of the present invention, the fourth negative C plate of the present invention, the polarizing film NC1 of the present invention, the polarizing film NC2, the polarizing film including the third negative C plate and the polarizing element, and the polarizing film including the fourth negative C plate and the polarizing element can be applied.

The present invention relates to a liquid crystal display including a liquid crystal cell, and polarizing films being in a in a Cross-Nicol relationship with each other at both sides of the liquid crystal cell, where one polarizing film includes a retardation film having reverse wavelength dispersion property, and one polarizing film does not include a supporting layer (protective film) exhibiting birefringence on the liquid crystal cell side of the polarizing element. According to such liquid crystal display of the present invention, the maintenance of orthogonality at the oblique viewing angle of the polarizing elements arranged in Cross-Nicol is performed in the region of wide wavelength of red, blue, green (R, G, B) by the retardation film having the reverse wavelength dispersion property arranged at the polarizing film, whereby the liquid crystal display of in plane switching mode (IPS mode) etc. that effectively prevents the coloration phenomenon at the oblique viewing angle, achieves wider viewing angle and has particularly-high display quality is provided. Furthermore, since the retardation film can be designed in such liquid crystal display of the present invention without taking into consideration the retardation and the wavelength dispersion property of the supporting layer (protective film) for protecting polarizing elements consisting of triacetyl cellulose and the like, it is useful in performing maintenance of orthogonality at the oblique viewing angle of the polarizing elements arranged in Cross-Nicol in a region of wide wavelength.

The preferred aspect of the liquid crystal display of the present invention includes an aspect in which the retardation film having reverse wavelength dispersion property is configured by a stacked body of two or more retardation elements. The degree of freedom in film design such as selection of the film material and the like can be enhanced compared to when configuring with a single layer by configuring the retardation film as a stacked body of two or more retardation elements. Furthermore, by being formed by a stacked body, the optimization of the wavelength dispersion property at the oblique viewing angle can be realized as opposed to when simply using a plurality of various retardation elements without considering the arranging form (arranging location).

The preferred aspect of the liquid crystal display of the present invention includes an aspect in which the retardation film having reverse wavelength dispersion property is made of at least one selected from a group consisting of a uniaxial retardation film (positive A plate) having optical axis in plane and where extraordinary ray refraction index>ordinary ray refraction index, a uniaxial retardation film (positive C plate) having optical axis out of plane and where extraordinary ray refraction index>ordinary ray refraction index, and a biaxial retardation film. In such liquid crystal display of the present invention, any of the positive A plate of the present invention, the positive C plate of the present invention, the biaxial retardation film of the present invention, the polarizing film PA of the present invention, the polarizing film PC of the present invention, and the polarizing film BI of the present invention can be applied.

The preferred aspect of the liquid crystal display of the present invention includes an aspect in which at least one of the alignment dividing means forming two or more alignment directions of the liquid crystal molecules in time of display of halftone and white or a color separation means for performing color display is arranged, and the liquid crystal display has a contrast ratio measured from the normal line direction of greater than or equal to 800. According to such aspect, the effects of the present invention are more effectively exhibited.

In the present specification, the contrast ratio is defined as the ratio of transmissivity in time of display of white with respect to transmissivity in time of display of black (transmissivity in time of display of white/transmissivity in time of display of black), where each transmissivity is measured by performing light reception at the view angle of 2° using a dispersion light source having a half band width of output angle–luminance property at the arbitrary azimuthal angle direction of greater than or equal to 40°.

The rib shaped projection, for example, is suitably used as the alignment dividing means. The color filter of pigment dispersion type, for example, is suitably used as the color separation means.

The preferred aspect of the liquid crystal display of the present invention includes an aspect in which the photoelastic coefficient of the retardation film is less than or equal to $20 \times 10^{-8}$ cm$^2$/N. According to such aspect, the change in retardation, optical axis etc. associated with deformation and the like of the retardation film due to radiated heat from the backlight can be suppressed, and thus the effects of the present invention are further effectively exhibited.

The more preferred upper limit of the photoelastic coefficient is $10 \times 10^{-8}$ cm$^2$/N, and the further preferably upper limit is $5 \times 10^{-8}$ cm$^2$/N.

The present invention also relates to a method of designing the retardation in the in plane direction and the out of plane direction of the retardation film, where the method of designing the retardation film references the sign and the absolute value of the effective retardation measured from the angle inclined by a predetermined angle greater than 0° from the normal line direction of the retardation film and the liquid crystal cell as the design parameter. According to such method of designing the retardation film, designing is performed taking into consideration the maintenance of orthogonality at the oblique viewing angle of the polarizing elements arranged in Cross-Nicol, cancellation of the extra retardation at the oblique viewing angle of the liquid crystal cell etc., and thus is useful in terms of effectively preventing the light leakage at the oblique viewing angle and achieving wider viewing angle.

In the method of designing the retardation film of the present invention, the sign and the absolute value of the effective retardation preferably uses the values at 450 nm, 550 nm, and 650 nm. It is thus particularly useful in terms of effectively preventing the coloration phenomenon at the oblique viewing angle and achieving wider viewing angle.

The angle inclined by a predetermined angle greater than 0° is not particularly limited but, 40° and 60° are suitable.

EFFECT OF THE INVENTION

According to the retardation film of the present invention, the maintenance of orthogonality at the oblique viewing angle of the polarizing elements of Cross-Nicol arrangement is performed in a region of wide wavelength of red, blue, and green, and the light leakage and the coloration phenomenon at the oblique viewing angle are effectively prevented in the liquid crystal display of vertical alignment mode (VA mode), in plane switching mode (IPS mode) etc. The liquid crystal display using such retardation film achieves wider viewing angle, obtains high display quality, and is particularly suitable in large television.

BEST MODE FOR CARRYING OUT THE INVENTION

The contents of the present invention will now be specifically described based on simulation results and the like. "LCD Master (manufactured by SHINTEC, Inc.)", which is a commercially available liquid crystal simulator, is used for the simulation. The optical calculation algorithm is a 2×2 Johns matrix method.

Various methods (generally referred to also as display mode) exist for the liquid crystal display, but that in which a liquid crystal cell is arranged between a pair of polarizing elements in the Cross-Nicol relationship with each other is most common. In such liquid crystal display, display of black is substantially performed by Cross-Nicol arrangement of the polarizing element by achieving a state in which the liquid crystal molecules are aligned substantially perpendicular to the substrate so that the liquid crystal cells do not have retardation, or a state in which the liquid crystal molecules are in plane rotated so that even if the liquid crystal cells have retardation, the optical axis thereof is substantially parallel or substantially perpendicular to the polarizing axis (transmissive axis or absorption axis) of the polarizing element so that the retardation is not exhibited etc. is effective in terms of realizing high contrast ratio, and most of the VA mode and the IPS mode adopt such method.

<Regarding Maintenance Of Orthogonality Of Polarizing Elements>

In order to understand the basic viewing angle property of the liquid crystal display, the viewing angle property of the most basic system that does not include liquid crystal cells, that is, of the system in which two polarizing elements are arranged in the Cross-Nicol relationship will now be considered. In the present specification, the polarizing element is essentially configured from the minimum element necessary to obtain the desired linear polarization from the random polarization, and is distinctly differentiated from the film stacked with the supporting layer (protective film), a so-called normal polarizing film in an aim of enhancing reliability on both sides of the minimum element. The use of terms will now be described by way of specific examples. Presently, the most common polarizing element is a polarizing membrane obtained by adsorbing stain solution containing iodine complex or dye having dichroism to the polyvinyl alcohol film (PVA film), and extending the same in a constant direction, and the most common polarizing film is a film having a three layer configuration obtained by adhering a transparent film such as triacetyl cellulose film (TAC film) for protecting polarizing membrane on both sides of the polarizing membrane.

FIG. 1 is a view showing in a frame format the relative arrangement relationship of the absorption axes for the system in which two polarizing elements are arranged in the Cross-Nicol relationship, where (a) is when observed from the front, and (b) is when observed from an oblique viewing angle. The direction of the white arrow in FIG. 1(a) represents the observing direction (direction of tilting the viewing angle) of FIG. 1(b). FIGS. 2(a) and 2(b) show the result of calculating the change in transmissivity and chromaticity, respectively, when observed with the viewing angle tilted in the 45° direction in the system shown in FIG. 1. The calculation of transmissivity is performed in the entire region of the visible wavelength of 380 to 780 nm, and the Y value obtained by performing visibility correction is used as the transmissivity. The calculation of chromaticity is performed with a method similar to the calculation of transmissivity, and the xy chromaticity of XYZ calorimetric system (CIE1931 standard colorimetric system) is used. In the present specification, transmissivity represents the Y value obtained by performing visibility correction unless particularly stated. In the present specification, the direction of tilting the viewing angle represents the direction of bisecting the absorption axes of the two polarizing elements such as 45° direction when the absorption axes of the two polarizing elements are 0°, 90°, respectively, and 90° direction when the absorption axes is 45°, 135°, unless particularly stated.

As shown in FIG. 2(a), the transmissivity is suppressed low to substantially 0.01% at the front view, but increases as the more the viewing angle is tilted, and is 1.2% at viewing angle of 60°. As shown in FIG. 2(b), the chromaticity point greatly changes the more the viewing angle is tilted.

As described above, the transmissivity increases and the chromaticity point changes the more the viewing angle is tilted. This phenomenon can be explained as below.

The absorption axes of two polarizing elements arranged in the Cross-Nicol relationship form an angle of 90° (orthogonality) when seen from the front, as shown in FIG. 1(a), but when the viewing angle is tilted in the direction of bisecting the relevant angle, as shown in FIG. 1(b), the angle formed by the absorption axes of the two polarizing elements start to deviate from 90°. Thus, in the oblique viewing angle, some of the linear polarization that passes through the polarizing element (generally referred to as polarizer) on the light source side is not absorbed at the polarizing element (generally referred to as analyzer) on the observer's side and transmits therethrough, and as a result, light leakage occurs.

FIG. 3 is an explanatory view expressing the light leakage phenomenon in the oblique viewing angle on the Poincare sphere. Point P in FIG. 3 represents the polarizing state of immediately after transmitting the polarizer at the front view, and point E (overlapping point P) represents the polarizing state in which the analyzer can most effectively absorb. P' represents the polarizing state of immediately after transmitting the polarizer in the oblique viewing angle, and point E' represents the polarizing state in which the analyzer can most effectively absorb in the oblique viewing angle.

The detailed description in handling the polarizing state on the Poincare sphere will be omitted, but the concept of using the Poincare sphere is widely known in the field of crystal optics and the like as a method effective in tracking the polarizing state that changes through the retardation element (see e.g., "Crystal Optics" written by Hiroshi Takasaki, Published by Morikita Publishing Co., 1975, p. 146-163). In the Poincare sphere, the clockwise polarized light is shown on the upper hemisphere, the counterclockwise polarized light is shown on the lower hemisphere, a linear polarized light is shown on the equator, and right circularly polarized light and left circularly polarized light respectively on the upper and lower poles. The two polarizing states of symmetric relationship with respect to the center of the sphere have the same absolute value of ellipticity angle and have opposite polarities, and thus form a pair of orthogonal polarized light. The effect of the retardation film on the Poincare sphere is to convert the point representing the polarizing state immediately before passing the retardation film into the point rotatably moved by an angle determined by $(2\Pi) \times$(retardation)/$(\lambda)$ (units in rad) with the slow axis on the Poincare sphere.

Continuing the description with reference to FIG. 3, the polarizing state of immediately after passing the polarizer and the polarizing state in which the analyzer most effectively absorb coincide at the front view, whereas the polarizing state of immediately after transmitting the polarizer moves to P' and the polarizing state in which the analyzer most effectively absorb moves to E' in the oblique viewing angle, and thus do not coincide. Therefore, in order to eliminate the light leakage at the oblique viewing angle, the polarizing state P' of the light after passing the polarizer must be converted into the polarizing state E' before passing the analyzer using the retardation film.

The means for converting the polarizing state P' into the polarizing state E', that is, the types and number of retardation film have various options. For example, a method of combining the positive A plate and the positive C plate (see e.g., J. Chen et al., "Optimum Film Compensation Modes for TN and VA LCDs (SID Symp. Digest)" United States, 1998, p. 315), a method using one biaxial retardation film (see e.g., Japanese Laid-Open Patent Publication No. 11-305217).

FIGS. 4 and 5 are explanatory views representing the effect of the retardation film on the Poincare sphere in a system in which the two polarizing elements are arranged in the Cross-Nicol relationship.

In the method of combining the positive A plate and the positive C plate, the polarizing state P' is converted into the polarizing state E' through the polarizing state P", as shown in FIG. 4. In the method using one biaxial retardation film, on the other hand, the polarizing state P' is converted directly into the polarizing state E', as shown in FIG. 5. The arrow from the polarizing state P' to the polarizing state P" in FIG. 4 represents the effect of the positive C plate, and the arrow from the polarizing state P" to the polarizing state E' in FIG. 4 represents the effect of the positive A plate. The arrow from the polarizing state P' to the polarizing state E' in FIG. 5 represents the effect of the biaxial retardation film.

However, in the prior art described above, the polarizing state P' of the light other than the designed wavelength (normally 550 nm) is not converted into the polarizing state E', and is converted into the polarizing state shifted from the polarizing state E' due to the wavelength dispersion (wavelength property) of the retardation of the positive A plate, the positive C plate, or the biaxial retardation film. As a result, light leakage of the wavelength other than the certain designed wavelength occurs, and coloration phenomenon occurs at the oblique viewing angle.

In order to solve such problem, the retardation of the retardation film is suitably designed in the entire region of the visible wavelength.

Considering the Poincare sphere shown in FIGS. 4 and 5, the change (length of arrow in the figure, more specifically, rotation angle thereof) in the polarizing state by the retardation of the retardation film is determined by $(2\Pi) \times (R)/(\lambda)$ where R (nm) is the retardation of the retardation film, and $\lambda$(nm) is the wavelength of the light, and thus, $(2\Pi) \times (R)/(\lambda)$ must be made constant irrespective of the wavelength $\lambda$ over the entire region of the visible wavelength to suitably design the retardation of the retardation film at the entire region of the visible wavelength. That is, (retardation) $\propto (\lambda)$ Such retardation film can be realized by using materials where greater retardation appears the longer the wavelength, or a so-called material of reverse wavelength dispersion and the like, for example, polymer material etc. including cellulose acetate having a specific degree of acetylation may be used (see e.g., Japanese Laid-Open Patent Publication No. 2000-137116).

A case of using a combination of the positive A plate and the positive C plate will now be considered.

FIGS. 6(a) and 6(b) are views showing the result of calculating the change in transmissivity and chromaticity when observed at the viewing angle tilted to an oblique direction with respect to a system in which the conventional single wavelength designed positive A plate and the positive C plate are arranged between two polarizing elements arranged in the Cross-Nicol relationship. The retardation film of single wavelength design according to FIG. 6 is designed at 550 nm, and the retardation thereof is assumed to be constant irrespective of the wavelength. This is equivalent to case in which a general norbornene resin is used for the material of the retardation film.

The retardation condition of the conventional positive A plate, as reported by J. Chen et al., is most suitable near the in plane retardation Rxy=137.5 nm defined by Rxy=(nx-ny)×d in the single wavelength design of 550 nm where nx, ny (nx>ny) are the principal refraction index in the in plane direction of the retardation film, nz is the principal refraction index in the out of plane direction, and the d is the thickness; and the retardation condition of the conventional positive C plate is most suitable near retardation in the thickness direction Rxz=−80 nm defined by Rxz=(nx−nz)×d in the single wavelength design of 550 nm where nx, ny (nx≧ny) are the principal refraction index in the in plane direction of the retardation film, nz is the principal refraction index in the out of plane direction, and d is the thickness; but in the calculation of FIG. 6, calculation is performed with the positive A plate set at Rxy=139 nm, the positive C plate set at Rxz=−89 nm.

FIGS. 7(a) and 7(b) are views showing the result of calculating the change in transmissivity and chromaticity when observed at the viewing angle tilted to an oblique direction with respect to a system in which the retardation film designed for the entire region of the visible wavelength of the present invention is arranged in place of the retardation film designed for single wavelength of the prior art in the system of FIG. 6. In the calculation of FIG. 7, calculation is performed by setting the retardation condition of each wavelength so that the positive A plate is Rxy($\lambda$)/$\lambda$=139/550=constant, positive C plate is Rxz($\lambda$)/$\lambda$=−89/550=constant in the entire region of the visible wavelength.

As apparent from comparing FIGS. 2(a), 6(a), and 7(a), the light leakage in the oblique viewing angle can be suppressed small by using one positive A plate and one positive C plate, as described above. The transmissivity at the oblique viewing angle of 60° was 1.2% when the retardation film is not arranged, but is significantly smaller or 0.03% when the retardation film designed for single wavelength of the prior art is used, and is further smaller or 0.01% when the retardation film designed for the entire region of the visible wavelength of the present invention is used.

Assuming the chromaticity point at the oblique viewing angle of 60° is (x60, y60), and the chromaticity point of the front view is (x0, y0), the distance $\Delta$Exy between the chromaticity point at the oblique viewing angle of 60° and the chromaticity point of the front view is calculated by the following equation (30).

$$\Delta Exy = \{(x60-x0)^2 + (y60-y0)^2\}^{1/2} \quad (30)$$

Comparing FIGS. 6(b) and 7(b) with respect to the chromaticity distance calculated by equation (30), $\Delta$Exy=0.174 when the retardation film designed for single wavelength of the prior art is used, whereas $\Delta$Exy=0.001, or extremely small, when the retardation film designed for the entire region of the visible wavelength of the present invention is used, and the same hue as the front view was seen at the oblique viewing angle. This indicates that when the retardation film designed for the entire region of the visible wavelength of the present invention is used, substantially the same hue is seen even when observed at the oblique viewing angle as when observed from the front, and thus coloring is small with respect to change in viewing angle.

A case of using one biaxial retardation film will now be described.

FIG. 8 is a view representing the result of calculating the change in transmissivity and chromaticity of when observed with the viewing angle tilted in the oblique direction in a system in which the conventional biaxial retardation film designed for single wavelength is arranged between two polarizing elements arranged in the Cross-Nicol relationship. The retardation film of single wavelength design according to FIG. 8 is designed at 550 nm, and the retardation is assumed as constant and not dependent on no the wavelength. This corresponds to a case of using the general norbornene resin as the material of retardation film.

With regards to the retardation condition in the single wavelength design of 550 nm of the conventional biaxial retardation film, the calculation in FIG. 8 is performed with the in plane retardation Rxy as 275 nm, which is ½ of the designed wavelength 550 nm, the Nz coefficient defined by Nz=(nx−nz)/(nx−ny) as 0.5, that is, the retardation Rxz in the thickness direction as 137.5 nm, which is ¼ of the designed wavelength 550 nm, as disclosed in Japanese Laid-Open Patent Publication No. 11-305217 and the like where nx, ny (nx>ny) are the principal refraction index in the in plane direction of the retardation film, nz is the principal refraction index of out of plane direction, and d is the thickness.

FIG. 9 is a view showing the result of calculating the change in transmissivity and chromaticity of when observed with the viewing angle tilted in the oblique direction in a system in which the retardation film designed for the entire region of the visible wavelength of the present invention is arranged in place of the conventional retardation film designed for single wavelength in the system of FIG. 8. In the calculation of FIG. 9, calculation is performed with the retardation Rxy($\lambda$) and Rxz($\lambda$) in each wavelength set so that Rxy($\lambda$)/$\lambda$=½=constant, Rxz($\lambda$)/$\lambda$=¼=constant in the entire region of the visible wavelength.

As apparent from the comparison of FIGS. 2(a), 8(a), and 9(a), the light leakage at the oblique viewing angle is suppressed small by using one biaxiliaty retardation film as described above. The light leakage was 1.2% when the retardation film was not arranged, whereas it was significantly smaller or 0.03% when the conventional retardation film designed for single wavelength was used, and was further smaller or 0.01% when the retardation film designed for the entire region of the visible wavelength of the present invention was used.

If FIGS. 8(b) and 9(b) are compared with regards to the chromaticity distance ΔExy, ΔExy was 0.152 when the conventional retardation film designed for single wavelength was used. However, when the retardation film designed for the entire region of the visible wavelength of the present invention was used ΔExy was 0.004, which was very small, and the same hue as the front view at the oblique viewing angle was shown. This indicates that in use of the retardation film designed for the entire region of the visible wavelength of the present invention substantially the same hue is seen as in observation from the front view, even in observation at the oblique viewing angle, and thus the coloring with respect to change in viewing angle is small.

The suitable retardation condition of each retardation film is as described above, where the transmissivity at the oblique viewing angle of 60° becomes less than or equal to 0.12%, and thus is suppressed to less than or equal to 1/10 of 1.2% of when the phase film is not arranged if Rxy(550)=118 to 160 nm for the positive A plate and Rxz(550)=−107 to −71 nm for the positive C plate when the positive A plate and the positive C plate are used in combination, or if Rxy(550)=220 to 330 nm, Rxy(550)=110 to 165 nm when one biaxiliaty retardation film is used, whereby the effects of the present invention are sufficiently achieved.

<Regarding Cancellation of Retardation of Liquid Crystal Cell>

The viewing angle property of the most basic system not including the liquid crystal cells, that is, the system in which two polarizing elements are arranged in Cross-Nicol relationship has been described up to now, but case of including liquid crystal cells between two polarizing elements will now be considered. With regards to the display mode of performing display of black with the liquid crystal molecules substantially parallel to the transmissive axis of one of the polarizing elements, that is, the display mode for performing display of black with the liquid crystal molecules substantially parallel to the transmissive axis of one of the polarizing elements as in the IPS mode, the liquid crystal cells have an apparent retardation when observed from the oblique viewing angle but since the apparent slow axis (or fast axis) is constantly parallel to the transmissive axis of one of the polarizing elements, the retardation is not applied to the incident linear polarized light, and thus is not different from the most basic system that does not include liquid crystal cells when considering the retardation of the liquid crystal cell. Therefore, a case of including liquid crystal cells for performing the display of black with most of the liquid crystal molecules aligned substantially perpendicular to the substrate and the in plane retardation being substantially zero, as in the VA mode, will now be considered. In such case, the liquid crystal cells have apparent retardation at the oblique viewing angle, and the apparent slow axis (or fast axis) is not parallel to the transmissive axis of the polarizing element, and thus the apparent retardation becomes the cause of light leakage at the oblique viewing angle. The present invention is also applicable to other liquid crystal modes other than the VA mode, but the VA mode will be explained by way of a preferred example. A method of canceling the retardation of the liquid crystal cell using a uniaxial retardation film will be explained below, but film exhibiting birefringence to be hereinafter descried etc. is not necessary for the display mode for performing display of black with the liquid crystal molecules substantially parallel to the transmissive axis of one of the polarizing elements as in the IPS mode.

When observed the liquid crystal cells in which most of the liquid crystal molecules are aligned substantially perpendicular to the substrate from the front view as in the VA mode, the retardation of the liquid crystal cell is substantially zero and the display of black is obtained with the Cross-Nicol polarizing element, but when observed from the oblique viewing angle, the liquid crystal cells have apparent retardation, and thus light leakage occurs. Considering a simple case, the retardation of the vertical alignment crystal cell of when the extraordinary ray refraction index ne=1.6, ordinary ray refraction light no=1.5, and thickness d=3 μm is zero in the front view, but is calculated as about +110 nm in the oblique viewing angle of 60°. The sign of the apparent retardation of the liquid crystal cell of when observed from the oblique viewing angle is defined with positive and negative of (p wave refraction index)−(s wave refraction index). Therefore, the negative C plate having an out of plane optical axis and which positive and negative of the birefringence (ne−no) is opposite with the liquid crystal cell needs to be stacked on the liquid crystal cell to cancel the apparent retardation of the liquid crystal cell produced at the oblique viewing angle. For example, a method (see e.g., Japanese Patent No. 3330574) is known of canceling the apparent retardation of the liquid crystal cell by using the negative C plate having the retardation in the thickness direction which positive and negative of the birefringence (ne−no) is opposite and the absolute value is substantially the same as the retardation Rlc in the thickness direction of the liquid crystal cell defined by Rlc=(ne−no)×d, where ne is the extraordinary ray refraction index of the liquid crystal cell, no is the ordinary ray refraction light, and d is the thickness.

In order to cancel the apparent retardation in the oblique viewing angle of the vertical alignment liquid crystal cell of ne=1.6, no=1.5, d=3 μm, and Rlc=300 nm, the negative C plate of nz=ne=1.5, nx=ny=no=1.6, d=3 μm, and Rxz=300 nm is used. The apparent retardation of when observed at the oblique viewing angle of 40°, for example, the above negative C plate is calculated to be −59 nm, and is substantially the same in absolute value with the +55 nm for the liquid crystal cell. At the oblique viewing angle of 60°, the apparent retardation of the negative C plate and the liquid crystal cell is calculated as +110 nm, −117 nm, respectively, and is calculated as +15 nm, −15 nm, respectively, at the oblique viewing angle of 20°, and thus the apparent retardation of the liquid crystal cell is canceled by the apparent retardation of the negative C plate at all oblique viewing angles.

Furthermore, in order to cancel the apparent retardation of the liquid crystal cell more accurately, the absolute value of Rxz of the negative C plate is preferably set slightly smaller than Rlc. For example, when observed the negative C plate of ne=1.6, no=1.5, d=2.82 μm, Rxz=282 nm at the oblique viewing angle of 40°, the retardation is calculated as about −55 nm. When stacking such negative C plate and the above described liquid crystal cell and observing the same at the oblique viewing angle of 40°, the retardation is canceled and becomes substantially zero as a stacked body since the retardation of the liquid crystal cell is +55 nm, and that of the negative C plate is −55 nm. Therefore, by setting the refraction indexes ne, no and the thickness d of the negative C plate so that the absolute value of the retardation becomes the same at the oblique viewing angle 40°, the positive and negative of the apparent retardation of the liquid crystal cell and the apparent retardation of the negative C plate are constantly opposite to each other and the absolute values thereof are substantially the same at the oblique viewing angle other than 40°, and thus the apparent retardation of the liquid crystal cell can be canceled at all oblique viewing angles. For example, the apparent retardation of the negative C plate and the liquid crystal cell become +110 m, and −110 nm, respectively, at the oblique viewing angle of 60°, and become +15 m, and −15 nm, respectively at the oblique viewing angle of 20°.

With regards to the negative C plate of nz=ne 1.5, nx=ny=no=1.6, d=2.65 μm, Rxz=265 nm, the apparent retardation thereof is calculated as −51 nm at the oblique viewing angle of 40°, as −103 nm at the oblique viewing angle of 60°, and −14 nm at the oblique viewing angle of 20°, and the apparent retardation of the liquid crystal cell is canceled at all oblique viewing angles to the same extent as the negative C plate of Rxz=300 nm. However, if the Rxz of the negative C plate is greater than 300 nm and smaller than 265 nm, the difference between the apparent retardation at the oblique viewing angle of liquid crystal cell and the apparent retardation at the oblique viewing angle of the negative C plate becomes large, and thus the apparent retardation at the oblique viewing angle of the liquid crystal cell may not be sufficiently canceled. That is, in order for the apparent retardation of the liquid crystal cell at all oblique viewing angles to be canceled by the apparent retardation of the negative C plate, 0 nm≦Rlc−Rxz≦35 nm is preferable.

As described above, with the apparent retardation of the liquid crystal cell canceled at all the oblique viewing angles, it becomes equivalent to the most basic system that does not include the liquid crystal cells, that is, the system in which the two polarizing elements are simply arranged in Cross-Nicol relationship, and the light leakage of the oblique viewing angle can be suppressed by realizing maintenance of the orthogonality of the polarizing element described above using the retardation film.

FIGS. 10 to 13 show the calculation result of the transmissivity at the oblique viewing angle for the system (FIG. 10) in which the two polarizing elements are arranged in Cross-Nicol, the system (FIG. 11) in which the liquid crystal cells are arranged between the polarizing elements, the system (FIG. 12) in which the negative C plate is arranged so as to be adjacent to liquid crystal cells, and the system (FIG. 13) in which the biaxial retardation film where Rxz is constant at ½ the wavelength λ of the light and the Nz coefficient is 0.5 as described above in <regarding maintenance of orthogonality of polarizing element> is arranged so as to be adjacent with the polarizing element to one of the liquid crystal cell side of the polarizing element. The calculation result of the transmissivity shown in FIGS. 10 to 13 is for the monochromatic light of wavelength 550 nm, and is not the Y value obtained by performing visibility correction at the 380 to 780 nm, which is the entire region of the visible wavelength.

As apparent from the fact that the calculation result for the system not including the liquid crystal cell shown in FIG. 10 and the calculation result for the system including the liquid crystal cell and the negative C plate shown in FIG. 12, the apparent retardation of when the liquid crystal cell is observed from the oblique viewing angle can be canceled substantially completely by arranging the negative C plate which positive and negative of birefringence (ne−no) is opposite from the liquid crystal cell and the absolute value of the Rxz is substantially the same as the retardation Rlc in the thickness direction of the liquid crystal cell. Furthermore, as apparent from FIG. 13, the light leakage can be suppressed at all oblique viewing angles by arranging the biaxial retardation film for the purpose of maintaining the orthogonality of the polarizing element.

However, in the above described prior art, since the negative C plate has the retardation condition is suitably designed only at the single wavelength (normally, near 550 nm), and thus the wavelength dispersion (wavelength property) of the retardation of the negative C plate and the wavelength dispersion (wavelength property) of the retardation of the liquid crystal cell differ, whereby the apparent retardation of the liquid crystal cell cannot be completely canceled at wavelengths other than the designed wavelength. As a result, the apparent retardation of the liquid crystal cell remains at the wavelengths other than the designed wavelengths at the oblique viewing angle even if the maintenance of orthogonality of the polarizing element is realized, or the retardation of the retardation film remains after the retardation of the liquid crystal cell is completely canceled if the absolute value of the retardation of the retardation film is greater, whereby the polarizing state after passing through the liquid crystal cell and immediately before passing through the analyzer does not become the linear polarized light, light leakage occurs at the relevant wavelength, and coloration phenomenon occurs.

In order to solve the problem of the prior art, the wavelength property of the negative C plate is optimized in the present invention. Generally, the liquid crystal cells, that is, the liquid crystal molecules producing the birefringence has smaller birefringence (ne−no) (i.e., show forward wavelength dispersion property) the longer the wavelength. For example, if the birefringence (ne−no) of the liquid crystal molecules at the wavelength λnm is expressed at Δn(λ), the range of Δn(450)/Δn(550)=1.20 to 1.01, Δn(650)/Δn(550)=0.99 to 0.80 is generally realized when the liquid crystal material used in the liquid crystal display. Therefore, the absolute value of the apparent retardation when the liquid crystal cell is observed from the oblique viewing angle is smaller the longer the wavelength, and if the absolute value of the apparent retardation of the liquid crystal cell of when observed from the oblique viewing angle of 40° at the wavelength λnm is expressed as Rlc40(λ), the relationship of Rlc40(450) >Rlc40(550)>Rlc40(650) is satisfied.

In terms of suppressing the coloration phenomenon at the oblique viewing angle, the absolute value of the retardation of when observed from the oblique viewing angle the negative C plate arranged to cancel the apparent retardation of when the liquid crystal cell is observed from the oblique viewing angle is preferably smaller the longer the wavelength. For example, when the absolute value of the retardation of the negative C plate of when observed from the oblique viewing angle of 40° at the wavelength λnm is expressed R40(λ), the relationship of R40(450)≧R40(550)≧R40(650) is preferably satisfied. More preferably, R40(450) and Rlc40(450) are substantially equal, and R40(650) and Rlc40(650) are substantially equal, in which case, the apparent retardation of when the liquid crystal cell is observed from the oblique viewing angle is canceled. Furthermore, as described above, the absolute value of Rxz of the negative C plate is preferably set slightly smaller than Rlc, and thus the conditions can be represented as Rxz(450)≧Rxz(550)≧Rxz(650), 0 nm≦Rlc(450)−Rxz(450)≦35 nm, and 0 nm≦Rlc(650)−Rxz(650)≦35 nm when Rlc at wavelength λ is Rlc(λ) and Rxz of the negative C plate at wavelength λ is Rxz(λ).

FIGS. 14 to 18 show the result of calculating the change in transmissivity and chromaticity for a system (FIG. 14) in which two polarizing elements are arranged in Cross-Nicol, a system (FIG. 15) in which the liquid crystal cell is arranged between the polarizing elements, a system (FIG. 16) in which the conventional negative C plate designed for single wavelength is arranged so as to be adjacent to the liquid crystal cells, a system (FIG. 17) in which the negative C plate designed for the entire region of the visible wavelength of the present invention is arranged in place of the conventional negative C plate designed for single wavelength, and a system (FIG. 18) in which the biaxial retardation film of the present invention designed with Rxy constant at ½ the wavelength λ of the light and Nz coefficient as 0.5 for the entire region of the visible wavelength as described in <Regarding maintenance of orthogonality of polarizing element> is arranged so as to be adjacent to the polarizing element on one of the liquid crystal cell side of the polarizing element.

The retardation film designed for the single wavelength according to FIG. 16 is designed at 550 nm and the retardation thereof is assumed to be constant irrespective of the wavelength. This is equivalent to a case in which the general norbornene resin is used for the material of the retardation film. The liquid crystal material configuring the liquid crystal cell may be that where $\Delta n(450)/\Delta n(550)=1.10$, $\Delta n(650)/\Delta n(550)=0.90$.

As apparent from the comparison of FIGS. 14(a), 16(a), and 17(a), the retardation at the oblique viewing angle of the liquid crystal cell is canceled when the conventional negative C plate designed for the single wavelength is used, similar to when the negative C plate designed for the entire region of the visible wavelength of the present invention is used. However, since the chromaticity point (x, y) at the oblique viewing angle of 60° for FIGS. 14(b), 16(b) and 17(b) is (0.317, 0.315), (0.316, 0.311), and (0.317, 0.315), it is apparent that the retardation at the oblique viewing angle of the liquid crystal cell is more completely canceled with the negative C plate designed for the entire region of the visible wavelength of the present invention. Furthermore, the light leakage at the oblique viewing angle can be sufficiently suppressed and coloration is also suppressed to be very small as in $\Delta Exy=0.005$ when the biaxial retardation film suitably designed for the entire region of the visible wavelength of the present invention is used to maintain orthogonality of the polarizing elements arranged in Cross-Nicol.

As described above, in the IPS mode, the maintenance of orthogonality of the polarizing elements arranged in Cross-Nicol is realized by using the combination of the positive A plate and the positive C plate in which retardations are suitably designed at the entire region of the visible wavelength or the biaxial retardation film in which retardations are suitably designed at the entire region of the visible wavelength, so that high display quality with small amount of light leakage and coloration is obtained even at the oblique viewing angle. Furthermore, in the VA mode, in addition to realizing the maintenance of orthogonality of the polarizing elements arranged in Cross-Nicol, high display quality with small amount of light leakage and coloration even at the oblique viewing angle can be obtained by canceling the retardation of the liquid crystal cell through the use of the negative C plate which retardation is suitably designed, more preferably through the use of the negative C plate which retardation is suitably designed at the entire region of the visible wavelength.

However, the stacking order etc. of the retardation film has a number of rules to be met in order to sufficiently obtain the effects of the present invention with the above described configuration.

First, a film exhibiting birefringence that is not necessary for the above described configuration should not exist in excess. Exhibiting (not exhibiting) birefringence normally refers to the refraction index having (not having) anisotropy in the field of crystal optics, but a definite criteria in having (not having) anisotropy is not known. Even if the anisotropy of the refraction index is very small, the retardation film exhibits anisotropy of optical distance, that is, retardation if the thickness of the relevant retardation film is very large.

In the present invention, exhibiting (not exhibiting) birefringence is to differentiate from having (not having) retardation essentially as the retardation film, and thus "exhibit birefringence" refers to a case of when one of the absolute values of each retardation defined by $Rxy=(nx-ny)\times d$, $Rxz=(nx-nz)\times d$, and $Ryz=(ny-nz)\times d$ is greater than 10 nm where nx and ny are the principal refraction indexes in the in plane direction of the retardation film, nz is the principal refraction index in the out of plane direction and d is the thickness; and "not exhibit birefringence" refers to the other cases.

The TAC film normally used for the supporting layer (protective film) etc. of the polarizing element has about $Rxy\cong 5$ nm, about $Rxz\cong 50$ nm (>10 nm), and thus is a film exhibiting birefringence. Therefore, the effects of the present invention may not be sufficiently obtained in a configuration in which the positive A plate and the positive C plate are stacked on the polarizing film including the TAC film as the supporting layer (protective film) of the polarizing element, that is, in a configuration of (polarizing element)/(TAC film)/(positive A plate)/(positive C plate). Preferably, the positive A plate and the positive C plate are stacked without the TAC film therebetween, or a film that does not exhibit birefringence is used as the supporting layer (protective film) of the polarizing element in place of the TAC film.

Next, the negative C plate arranged to cancel the apparent retardation of the liquid crystal cell at the oblique viewing angle must be adjacent to the liquid crystal cell without other retardation films that exhibit birefringence. It should be noted that the film that does not exhibit birefringence may be arranged. In other words, the effects of the present invention can be sufficiently obtained with the configuration of (negative C plate)/(liquid crystal cell), or (negative C plate)/(film not exhibiting birefringence)/(liquid crystal cell). However, the effects of the present invention may not be sufficiently obtained with the configuration of (negative C plate)/(film that exhibits birefringence)/(liquid crystal cell). The negative C plate is not necessary in the IPS mode, as previously described. The direction of the stacking order is also not distinguished. In other words, the configuration of (polarizing element)/(biaxial retardation film)/(liquid crystal cell)/(polarizing element) and the configuration of (polarizing element)/(liquid crystal cell)/(biaxial retardation film)/(polarizing element) are substantially the same. Furthermore, in the above described configuration, the biaxial retardation film and each uniaxial retardation film may be configured as a stacked body of two or more retardation films which Nz is substantially equal to each other. For example, the biaxial retardation film of nx=1.55, ny=1.45, nz=1.5, d=10 μm may be configured as a stacked body of two biaxial retardation films each of nx=1.55, ny=1.45, nz=1.5, d=5 μm. Alternatively, it may be configured as a stacked body of the biaxial retardation film of nx=1.55, ny=1.45, nz=1.5, d=3 μm and the biaxial retardation film of nx=1.55, ny=1.45, nz=1.5, d=7 μm. With respect to the positive C plate and the negative C plate, they may be configured as a stacked body of two or more retardation elements which Nz differ from each other. In this case, the sum of Rxz of each retardation element is assumed to be Rxz of the negative C plate.

The present invention will now be described in more detail with reference to the following Embodiments, but it should be noted that the present invention is not limited to the following Embodiments.

1. Simulation

In Embodiments 1 to 13 and the comparative examples 1 to 4 described below, the liquid crystal display model used for

Embodiment 1

FIG. 19-1 is a perspective view showing in a frame format the configuration of the liquid crystal display of Embodiment 1.

As shown in FIG. 19-1, the liquid crystal display of Embodiment 1 according to the present invention is a VA mode liquid crystal display realized by arranging a polarizing film 100a obtained by stacking in order the positive C plate 20 designed for the entire region of the visible wavelength of the present invention, the polarizing element 50a, and the TAC film 60a on one outer side of the VA mode liquid crystal cell 5, where the liquid crystal 2 having negative dielectric constant anisotropy is sandwiched between two upper and lower substrates 1a, 1b performed with vertical alignment process on the surface so that the side of the positive C plate 20 is positioned on the liquid crystal cell 5 side; arranging the negative C plate 30 designed for the entire region of the visible wavelength of the present invention on the other outer side of the VA mode liquid crystal cell 5; and arranging further on the outer side a polarizing film 100b obtained by stacking in order the positive A plate 10 designed for the entire region of the visible wavelength of the present invention, the polarizing element 50b, and the TAC film 60b so that the side of the positive A plate 10 is positioned on the negative C plate 30 side.

Each optical property of the liquid crystal 2 (VA mode liquid crystal cell 5), the positive A plate 10, the positive C plate 20, the negative C plate 30, the polarizing elements 50a, 50b, and the TAC films 60a, 60b configuring the liquid crystal display of the present Embodiment is shown in table 1 below, and the respective axis setting is as shown in FIG. 19. The optical properties of the polarizing elements 50a, 50b and the TAC films 60a, 60b are common in each embodiment and example below.

Embodiment 2

FIG. 20 is a perspective view showing in a frame format the configuration of the liquid crystal display of Embodiment 2.

As shown in FIG. 20, the liquid crystal display of Embodiment 2 according to the present invention is a VA mode liquid crystal display realized by arranging the negative C plate 30 designed for the entire region of the visible wavelength of the present invention on one outer side of the VA mode liquid crystal cell 5, where the liquid crystal 2 having negative dielectric constant anisotropy is sandwiched between two upper and lower substrates 1a, 1b performed with vertical alignment process on the surface; arranging on the outer side thereof a polarizing film 100a obtained by stacking the polarizing element 50a and the TAC film 60a so that the side of the polarizing element 50a is positioned on the negative C plate 30 side; and arranging a polarizing film 100b obtained by stacking in order the positive C plate 20 designed for the entire region of the visible wavelength of the present invention, the positive A plate 10 designed for the entire region of the visible wavelength of the present invention, the polarizing element 50b, and the TAC film 60b on the other outer side of the VA mode liquid crystal cell 5 so that the side of the positive C plate 20 is positioned on the liquid crystal cell 5 side.

Each optical property of the liquid crystal 2 (VA mode liquid crystal cell 5), the positive A plate 10, the positive C plate 20, and the negative C plate 30 configuring the liquid crystal display of the present Embodiment is shown in table 1 above, and the respective axis setting is as shown in FIG. 20.

Embodiment 3

FIG. 21 is a perspective view showing in a frame format the configuration of the liquid crystal display of Embodiment 3.

As shown in FIG. 21, the liquid crystal display of Embodiment 3 according to the present invention is a VA mode liquid crystal display realized by arranging the negative C plate 30 designed for the entire region of the visible wavelength of the present invention on one outer side of the VA mode liquid crystal cell 5, where the liquid crystal 2 having negative dielectric constant anisotropy is sandwiched between two

TABLE 1

| PRODUCT NAME (THICKNESS) | OPTICAL PROPERTY | | | REMARKS |
|---|---|---|---|---|
| | 450 nm | 550 nm | 650 nm | |
| LIQUID CRYSTAL (3.5 μm) | ne = 1.564<br>no = 1.474 | ne = 1.550<br>no = 1.464 | ne = 1.542<br>no = 1.459 | VA MODE |
| POSITIVE A PLATE (100 μm) | nx = 1.50214<br>ny = 1.50100<br>nz = 1.50100 | nx = 1.50139<br>ny = 1.50000<br>nz = 1.50000 | nx = 1.50064<br>ny = 1.49900<br>nz = 1.49900 | TOTAL WAVELENGTH DESIGN |
| POSITIVE C PLATE (100 μm) | nx = 1.50100<br>ny = 1.50100<br>nz = 1.50173 | nx = 1.50000<br>ny = 1.50000<br>nz = 1.50089 | nx = 1.49900<br>ny = 1.49900<br>nz = 1.50005 | TOTAL WAVELENGTH DESIGN |
| NEGATIVE C PLATE (100 μm) | nx = 1.50100<br>ny = 1.50100<br>nz = 1.49805 | nx = 1.50000<br>ny = 1.50000<br>nz = 1.49712 | nx = 1.49900<br>ny = 1.49900<br>nz = 1.49620 | TOTAL WAVELENGTH DESIGN |
| POLARIZING ELEMENT (20 μm) | ne = no = 1.5<br>ke = 1.48E-2<br>ko = 4.25E-4 | ne = no = 1.5<br>ke = 1.95E-2<br>ko = 3.53E-4 | ne = no = 1.5<br>ke = 2.14E-2<br>ko = 3.79E-4 | e AXIS = ABSORPTION AXIS |
| TAC FILM (80 μm) | nx = 1.48850<br>ny = 1.48850<br>nz = 1.48785 | nx = 1.48750<br>ny = 1.48750<br>nz = 1.48675 | nx = 1.48700<br>ny = 1.48700<br>nz = 1.48620 | |

In table 1, ke and ko respectively represent the imaginary part (extinction coefficient) of the refraction index with respect to the extraordinary ray and the ordinary ray.

upper and lower substrates 1a, 1b performed with vertical alignment process on the surface; arranging on the outer side thereof a polarizing film 100a obtained by stacking the polarizing element 50a and the TAC film 60a so that the side of the polarizing element 50a is positioned on the negative C plate 30 side; and arranging a polarizing film 100b obtained by stacking in order the positive A plate 10 designed for the entire region of the visible wavelength of the present invention, the positive C plate 20 designed for the entire region of the visible wavelength of the present invention, the polarizing element 50b, and the TAC film 60b on the other side of the VA mode liquid crystal cell 5 so that the side of the positive A plate 10 is positioned on the liquid crystal cell 5 side.

Each optical property of the liquid crystal 2 (VA mode liquid crystal cell 5), the positive A plate 10, the positive C plate 20, and the negative C plate 30 configuring the liquid crystal display of the present Embodiment is shown in table 1 above, and the respective axis setting is as shown in FIG. 21.

Embodiment 4

FIG. 22 is a perspective view showing in a frame format the configuration of the liquid crystal display of Embodiment 4.

As shown in FIG. 22, the liquid crystal display of Embodiment 4 according to the present invention is a VA mode liquid crystal display realized by arranging a polarizing film 100a obtained by stacking in order a film not exhibiting birefringence (isotropic film) 70, the polarizing element 50a, and the TAC film 60a on one outer side of the VA mode liquid crystal cell 5, where the liquid crystal 2 having negative dielectric constant anisotropy is sandwiched between two upper and lower substrates 1a, 1b performed with vertical alignment process on the surface so that the side of the isotropic film 70 is positioned on the liquid crystal cell 5 side; arranging the negative C plate 30 designed for the entire region of the visible wavelength of the present invention on the other side of the liquid crystal cell 5; and arranging further on the outer side a polarizing film 100b obtained by stacking in order the positive C plate 20 designed for the entire region of the visible wavelength of the present invention, the positive A plate 10 designed for the entire region of the visible wavelength of the present invention, the polarizing element 50b, and the TAC film 60b so that the side of the positive C plate 20 is positioned on the negative C plate 30 side.

Each optical property of the liquid crystal 2 (VA mode liquid crystal cell 5), the positive A plate 10, the positive C plate 20, and the negative C plate 30 configuring the liquid crystal display of the present Embodiment is shown in table 1 above, the optical property of the isotropic film 70 is shown in table 2 below, and the respective axis setting is as shown in FIG. 22.

TABLE 2

| PRODUCT NAME | OPTICAL PROPERTY | | |
|---|---|---|---|
| (THICKNESS) | 450 nm | 550 nm | 650 nm |
| ISOTROPIC FILM (80 μm) | nx = 1.51000 ny = 1.51000 nz = 1.51000 | nx = 1.51000 ny = 1.51000 nz = 1.51000 | nx = 1.51000 ny = 1.51000 nz = 1.51000 |

Embodiment 5

FIG. 23 is a perspective view showing in a frame format the configuration of the liquid crystal display of Embodiment 5.

As shown in FIG. 23, the liquid crystal display of Embodiment 5 according to the present invention is a VA mode liquid crystal display realized by arranging a polarizing film 100a obtained by stacking in order an isotropic film 70, the polarizing element 50a, and the TAC film 60a on one outer side of the VA mode liquid crystal cell 5, where the liquid crystal 2 having negative dielectric constant anisotropy is sandwiched between two upper and lower substrates 1a, 1b performed with vertical alignment process on the surface so that the side of the isotropic film 70 is positioned on the liquid crystal cell 5 side; arranging the negative C plate 30 designed for the entire region of the visible wavelength of the present invention on the other side of the liquid crystal cell 5; and arranging further on the outer side a polarizing film 100b obtained by stacking in order a positive A plate 10 designed for the entire region of the visible wavelength of the present invention and a positive C plate 20 designed for the entire region of the visible wavelength of the present invention, the polarizing element 50b, and the TAC film 60b so that the side of the positive A plate 10 is positioned on the negative C plate 30 side.

Each optical property of the liquid crystal 2 (VA mode liquid crystal cell 5), the positive A plate 10, the positive C plate 20, and the negative C plate 30 configuring the liquid crystal display of the present Embodiment is shown in table 1 above, the optical property of the isotropic film 70 is shown in table 2 above, and the respective axis setting is as shown in FIG. 23.

Embodiment 6

FIG. 24-1 is a perspective view showing in a frame format the configuration of the liquid crystal display of Embodiment 6.

As shown in FIG. 24-1, the liquid crystal display of Embodiment 6 according to the present invention is a VA mode liquid crystal display realized by arranging the negative C plate 30 designed for the entire region of the visible wavelength of the present invention on one outer side of the VA mode liquid crystal cell 5, where the liquid crystal 2 having negative dielectric constant anisotropy is sandwiched between two upper and lower substrates 1a, 1b performed with vertical alignment process on the surface; arranging on the outer side thereof a polarizing film 10a obtained by stacking the polarizing element 50a and the TAC film 60a so that the side of the polarizing element 50a is positioned on the negative C plate 30 side; and arranging a polarizing film 100b obtained by stacking in order the biaxial retardation film 40 designed for the entire region of the visible wavelength of the present invention, the polarizing element 50b, and the TAC film 60b on the other side of the VA mode liquid crystal cell 5 so that the side of the biaxial retardation film 40 is positioned on the liquid crystal cell 5 side.

Each optical property of the liquid crystal 2 (VA mode liquid crystal cell 5), the negative C plate 30 and the biaxial retardation film 40 configuring the liquid crystal display of the present Embodiment is shown in table 3 below, and the respective axis setting is as shown in FIG. 24-1.

TABLE 3

| PRODUCT NAME | OPTICAL PROPERTY | | | |
|---|---|---|---|---|
| (THICKNESS) | 450 nm | 550 nm | 650 nm | REMARKS |
| LIQUID CRYSTAL | ne = 1.564 | ne = 1.550 | ne = 1.542 | VA |
| (3.5 μm) | no = 1.474 | no = 1.464 | no = 1.459 | MODE |
| BIAXIAL RETARDATION | nx = 1.50100 | nx = 1.50000 | nx = 1.49900 | TOTAL WAVELENGTH |
| FILM | ny = 1.49875 | ny = 1.49725 | ny = 1.49575 | DESIGN |
| (100 μm) | nz = 1.49988 | nz = 1.49863 | nz = 1.49738 | |
| NEGATIVE C PLATE | nx = 1.50100 | nx = 1.50000 | nx = 1.49900 | TOTAL WAVELENGTH |
| (100 μm) | ny = 1.50100 | ny = 1.50000 | ny = 1.49900 | DESIGN |
| | nz = 1.49805 | nz = 1.49712 | nz = 1.49620 | |

Embodiment 7

FIG. 25 is a perspective view showing in a frame format the configuration of the liquid crystal display of Embodiment 7.

As shown in FIG. 25, the liquid crystal display of Embodiment 7 according to the present invention is a VA mode liquid crystal display realized by arranging a polarizing film 100a obtained by stacking in order the isotropic film 70, the polarizing element 50a, and the TAC film 60a on one outer side of the VA mode liquid crystal cell 5, where the liquid crystal 2 having negative dielectric constant anisotropy is sandwiched between two upper and lower substrates 1a, 1b performed with vertical alignment process on the surface so that the side of the isotropic film 70 is positioned on the liquid crystal cell 5 side; arranging the negative C plate 30 designed for the entire region of the visible wavelength of the present invention on the other side of the liquid crystal cell 5; and arranging further on the outer side a polarizing film 100b obtained by stacking in order the biaxial retardation film 40 designed for the entire region of the visible wavelength of the present invention, the polarizing element 50b, and the TAC film 60b so that the side of the biaxial retardation film 40 is positioned on the negative C plate 30 side.

The optical property of the isotropic film 70 of the present Embodiment is shown in table 2 above, each optical property of the liquid crystal 2 (VA mode liquid crystal cell 5), the negative C plate 30 and the biaxial retardation film 40 configuring the liquid crystal display of the present Embodiment is shown in table 3 above, and the respective axis setting is as shown in FIG. 25.

Embodiment 8

FIG. 26 is a perspective view showing in a frame format the configuration of the liquid crystal display of Embodiment 8.

As shown in FIG. 26, the liquid crystal display of Embodiment 8 according to the present invention is a VA mode liquid crystal display realized by arranging a polarizing film 100a obtained by stacking in order the isotropic film 70, the polarizing element 50a, and the TAC film 60a on one outer side of the VA mode liquid crystal cell 5, where the liquid crystal 2 having negative dielectric constant anisotropy is sandwiched between two upper and lower substrates 1a, 1b performed with vertical alignment process on the surface so that the side of the isotropic film 70 is positioned on the liquid crystal cell 5 side; arranging the negative C plate 30 designed for the entire region of the visible wavelength of the present invention on the other side of the liquid crystal cell 5; and arranging further on the outer side a polarizing film 100b obtained by stacking in order the positive A plate 10 designed for the entire region of the visible wavelength of the present invention, the polarizing element 50b, and the TAC film 60b so that the side of the positive A plate 10 is positioned on the negative C plate 30 side.

The optical property of the isotropic film 70 of the present Embodiment is shown in table 2 above, each optical property of the liquid crystal 2 (VA mode liquid crystal cell 5), the positive A plate 10, and the positive C plate 30 configuring the liquid crystal display is shown in table 4 below, and the respective axis setting is as shown in FIG. 26.

TABLE 4

| PRODUCT NAME | OPTICAL PROPERTY | | | |
|---|---|---|---|---|
| (THICKNESS) | 450 nm | 550 nm | 650 nm | REMARKS |
| LIQUID CRYSTAL | ne = 1.564 | ne = 1.550 | ne = 1.542 | VA |
| (3.5 μm) | no = 1.474 | no = 1.464 | no = 1.459 | MODE |
| POSITIVE A PLATE | nx = 1.50214 | nx = 1.50139 | nx = 1.50064 | TOTAL WAVELENGTH |
| (100 μm) | ny = 1.50100 | ny = 1.50000 | ny = 1.49900 | DESIGN |
| | nz = 1.50100 | nz = 1.50000 | nz = 1.49900 | |
| NEGATIVE C PLATE | nx = 1.50100 | nx = 1.50000 | nx = 1.49900 | TOTAL WAVELENGTH |
| (100 μm) | ny = 1.50100 | ny = 1.50000 | ny = 1.49900 | DESIGN |
| | nz = 1.49876 | nz = 1.49799 | nz = 1.49723 | |

The relationship between the retardation of the negative C plate of the present Embodiment when seen from the oblique viewing angle of 40° and the retardation of the positive C plate and the negative C plate of Embodiment 4 when seen from the oblique viewing angle of 40° was as shown in table 5 below.

In other words, the negative C plate of the present Embodiment had the retardation property substantially the same as the stacked body of the positive C plate and the negative C plate of Embodiment 4.

TABLE 5

| PRODUCT NAME | RETARDATION (nm) SEEN FROM OBLIQUE VIEWING ANGLE OF 40° | | |
|---|---|---|---|
| | 450 nm | 550 nm | 650 nm |
| POSITIVE C PLATE OF EMBODIMENT 4 | −14.8 | −18.1 | −21.3 |
| NEGATIVE C PLATE OF EMBODIMENT 4 | 60.1 | 58.7 | 57.2 |
| POSITIVE C PLATE OF EMBODIMENT 4 + NEGATIVE C PLATE OF EMBODIMENT 4 | 45.3 | 40.6 | 35.9 |
| NEGATIVE C PLATE OF EMBODIMENT 8 | 45.6 | 40.9 | 36.1 |

Embodiment 9

FIG. 27 is a perspective view showing in a frame format the configuration of the liquid crystal display of Embodiment 9.

As shown in FIG. 27, the liquid crystal display of Embodiment 9 according to the present invention is a VA mode liquid crystal display realized by arranging the negative C plate 30 designed for the entire region of the visible wavelength of the present invention on one outer side of the VA mode liquid crystal cell 5, where the liquid crystal 2 having negative dielectric constant anisotropy is sandwiched between two upper and lower substrates 1a, 1b performed with vertical alignment process on the surface; arranging on the outer side thereof a polarizing film 100a obtained by stacking in order the polarizing element 50a and the TAC film 60a so that the side of the polarizing element 50a is positioned on the negative C plate 30 side; and arranging a polarizing film 100b obtained by stacking in order the positive A plate 10 designed for the entire region of the visible wavelength of the present invention, the polarizing element 50b, and the TAC film 60b on the other side of the VA mode liquid crystal cell 5 so that the side of the positive A plate 10 is positioned on the liquid crystal cell 5 side.

Each optical property of the liquid crystal 2 (VA mode liquid crystal cell 5), the positive A plate 10, and the negative C plate 30 configuring the liquid crystal display of the present Embodiment is shown in table 4 above, and the respective axis setting is as shown in FIG. 27.

Embodiment 10

FIG. 28 is a perspective view showing in a frame format the configuration of the liquid crystal display of Embodiment 10.

As shown in FIG. 28, the liquid crystal display of Embodiment 10 according to the present invention is a VA mode liquid crystal display realized by arranging a second negative C plate 30B designed for the entire region of the visible wavelength of the present invention and a first negative C plate 30A designed for the entire region of the visible wavelength of the present invention on one outer side of the VA mode liquid crystal cell 5, where the liquid crystal 2 having negative dielectric constant anisotropy is sandwiched between two upper and lower substrates 1a, 1b performed with vertical alignment process on the surface; arranging on the outer side thereof a polarizing film 100a obtained by stacking in order the polarizing element 50a and the TAC film 60a so that the side of the polarizing element 50a is positioned on the first negative C plate 30A side; and arranging a polarizing film 100b obtained by stacking in order the positive A plate 10 designed for the entire region of the visible wavelength of the present invention, the polarizing element 50b, and the TAC film 60b on the other side of the VA mode liquid crystal cell 5 so that the side of the positive A plate 10 is positioned on the liquid crystal cell 5 side.

Each optical property of the liquid crystal 2 (VA mode liquid crystal cell 5), the positive A plate 10, the first negative C plate 30A, and the second negative C plate 30B configuring the liquid crystal display of the present Embodiment is shown in table 6 below, and the respective axis setting is as shown in FIG. 28.

TABLE 6

| PRODUCT NAME (THICKNESS) | OPTICAL PROPERTY | | | REMARKS |
|---|---|---|---|---|
| | 450 nm | 550 nm | 650 nm | |
| LIQUID CRYSTAL (3.5 μm) | ne = 1.564<br>no = 1.474 | ne = 1.550<br>no = 1.464 | ne = 1.542<br>no = 1.459 | VA MODE |
| POSITIVE A PLATE (100 μm) | nx = 1.50214<br>ny = 1.50100<br>nz = 1.50100 | nx = 1.50139<br>ny = 1.50000<br>nz = 1.50000 | nx = 1.50064<br>ny = 1.49900<br>nz = 1.49900 | TOTAL WAVELENGTH DESIGN |
| FIRST NEGATIVE C PLATE (100 μm) | nx = 1.50100<br>ny = 1.50100<br>nz = 1.50050 | nx = 1.50000<br>ny = 1.50000<br>nz = 1.49950 | nx = 1.49900<br>ny = 1.49900<br>nz = 1.49850 | TOTAL WAVELENGTH DESIGN |
| SECOND NEGATIVE C PLATE (2 μm) | nx = 1.61000<br>ny = 1.61000<br>nz = 1.51750 | nx = 1.59000<br>ny = 1.59000<br>nz = 1.51000 | nx = 1.57500<br>ny = 1.57500<br>nz = 1.52200 | TOTAL WAVELENGTH DESIGN |

The relationship between the retardation of the first negative C plate and the second negative C plate of the present Embodiment when seen from the oblique viewing angle of 40° and the retardation of the negative C plate of Embodiment 9 when seen from the oblique viewing angle of 40° was as shown in table 7 below. In other words, the stacked body of the first negative C plate and the second negative C plate of the present Embodiment had the retardation property substantially the same as the negative C plate of Embodiment 9.

TABLE 7

| PRODUCT NAME | RETARDATION (nm) SEEN FROM OBLIQUE VIEWING ANGLE OF 40° | | |
|---|---|---|---|
| | 450 nm | 550 nm | 650 nm |
| FIRST NEGATIVE C PLATE OF EMBODIMENT 10 | 10.2 | 10.2 | 10.2 |
| SECOND NEGATIVE C PLATE OF EMBODIMENT 10 | 35.4 | 30.6 | 26.1 |
| FIRST NEGATIVE C PLATE OF EMBODIMENT 10 + SECOND NEGATIVE C PLATE OF EMBODIMENT 10 | 45.6 | 40.8 | 36.3 |

TABLE 7-continued

| | RETARDATION (nm) SEEN FROM OBLIQUE VIEWING ANGLE OF 40° | | |
|---|---|---|---|
| PRODUCT NAME | 450 nm | 550 nm | 650 nm |
| NEGATIVE C PLATE OF EMBODIMENT 9 | 45.6 | 40.9 | 36.1 |

Embodiment 11

FIG. 29 is a perspective view showing in a frame format the configuration of the liquid crystal display of Embodiment 11.

As shown in FIG. 29, the liquid crystal display of Embodiment 11 according to the present invention is an IPS mode liquid crystal display realized by arranging a polarizing film 100a obtained by stacking in order a positive C plate 20 designed for the entire region of visible wavelength of the present invention, a positive A plate 10 designed for the entire region of visible wavelength of the present invention, the polarizing element 50a, and the TAC film 60a on one outer side of an IPS mode liquid crystal cell 6, where the liquid crystal 3 having positive dielectric constant anisotropy is sandwiched between two upper and lower substrates 1a, 1b performed with parallel alignment process on the surface so that the side of the positive C plate 20 is positioned on the liquid crystal cell 6 side; and arranging a polarizing film 100b obtained by stacking in order the isotropic film 70, the polarizing element 50b, and the TAC film 60b on the other outer side of the IPS mode liquid crystal cell 6 so that the side of the isotropic film 70 is positioned on the liquid crystal cell 6 side.

The optical property of the liquid crystal 3 (IPS mode liquid crystal cell 6), the positive A plate 10, the positive C plate 20 and the isotropic film 70 configuring the liquid crystal display of the present Embodiment is shown in table 8 below, and the respective axis setting is as shown in FIG. 29.

TABLE 8

| PRODUCT NAME (THICKNESS) | OPTICAL PROPERTY | | | REMARKS |
|---|---|---|---|---|
| | 450 nm | 550 nm | 650 nm | |
| LIQUID CRYSTAL (3.2 μm) | ne = 1.564 no = 1.474 | ne = 1.550 no = 1.464 | ne = 1.542 no = 1.459 | IPS MODE |
| POSITIVE A PLATE (100 μm) | nx = 1.50214 ny = 1.50100 nz = 1.50100 | nx = 1.50139 ny = 1.50000 nz = 1.50000 | nx = 1.50064 ny = 1.49900 nz = 1.49900 | TOTAL WAVELENGTH DESIGN |
| POSITIVE C PLATE (100 μm) | nx = 1.50100 ny = 1.50100 nz = 1.50173 | nx = 1.50000 ny = 1.50000 nz = 1.50089 | nx = 1.49900 ny = 1.49900 nz = 1.50005 | TOTAL WAVELENGTH DESIGN |
| ISOTROPIC FILM (80 μm) | nx = 1.51000 ny = 1.51000 nz = 1.51000 | nx = 1.51000 ny = 1.51000 nz = 1.51000 | nx = 1.51000 ny = 1.51000 nz = 1.51000 | |

Embodiment 12

FIG. 30 is a perspective view showing in a frame format the configuration of the liquid crystal display of Embodiment 12.

As shown in FIG. 30, the liquid crystal display of Embodiment 12 according to the present invention is an IPS mode liquid crystal display realized by arranging the polarizing film 100a obtained by stacking in order the positive A plate 10 designed for the entire region of visible wavelength of the present invention, the positive C plate 20 designed for the entire region of visible wavelength of the present invention, the polarizing element 50a, and the TAC film 60a on one outer side of an IPS mode liquid crystal cell 6, where the liquid crystal 3 having positive dielectric constant anisotropy is sandwiched between two upper and lower substrates 1a, 1b performed with parallel alignment process on the surface so that the side of the positive A plate 10 is positioned on the liquid crystal cell 6 side; and arranging the polarizing film 100b obtained by stacking in order the isotropic film 70, the polarizing element 50b, and the TAC film 60b on the other outer side of the IPS mode liquid crystal cell 6 so that the side of the isotropic film 70 is positioned on the liquid crystal cell 6 side.

The optical property of the liquid crystal 3 (IPS mode liquid crystal cell 6), the positive A plate 10, the positive C plate 20 and the isotropic film 70 configuring the liquid crystal display of the present Embodiment is shown in table 8 above, and the respective axis setting is as shown in FIG. 30.

Embodiment 13

FIG. 31-1 is a perspective view showing in a frame format the configuration of the liquid crystal display of Embodiment 13.

As shown in FIG. 31-1, the liquid crystal display of Embodiment 13 according to the present invention is an IPS mode liquid crystal display realized by arranging the polarizing film 100a obtained by stacking in order a biaxial retardation film 40 designed for the entire region of visible wavelength of the present invention, the polarizing element 50a, and the TAC film 60a on one outer side of an IPS mode liquid crystal cell 6, where the liquid crystal 3 having positive dielectric constant anisotropy is sandwiched between two upper and lower substrates 1a, 1b performed with parallel alignment process on the surface so that the side of the biaxial retardation film 40 is positioned on the liquid crystal cell 6 side; and arranging the polarizing film 100b obtained by stacking in order the isotropic film 70, the polarizing element 50b, and the TAC film 60b on the other outer side of the IPS mode liquid crystal cell 6 so that the side of the isotropic film 70 is positioned on the liquid crystal cell 6 side.

Each optical property of the liquid crystal 3 (IPS mode liquid crystal cell 6), the biaxial retardation film 40 and the isotropic film 70 configuring the liquid crystal display of the present Embodiment is shown in table 9 below, and the respective axis setting is as shown in FIG. 31-1.

TABLE 9

| PRODUCT NAME | OPTICAL PROPERTY | | | |
|---|---|---|---|---|
| (THICKNESS) | 450 nm | 550 nm | 650 nm | REMARKS |
| LIQUID CRYSTAL | ne = 1.564 | ne = 1.550 | ne = 1.542 | IPS |
| (3.2 μm) | no = 1.474 | no = 1.464 | no = 1.459 | MODE |
| BIAXIAL RETARDATION | nx = 1.50100 | nx = 1.50000 | nx = 1.49900 | TOTAL WAVELENGTH |
| FILM | ny = 1.49875 | ny = 1.49725 | ny = 1.49575 | DESIGN |
| (100 μm) | nz = 1.49988 | nz = 1.49863 | nz = 1.49738 | |
| ISOTROPIC FILM | nx = 1.51000 | nx = 1.51000 | nx = 1.51000 | |
| (80 μm) | ny = 1.51000 | ny = 1.51000 | ny = 1.51000 | |
| | nz = 1.51000 | nz = 1.51000 | nz = 1.51000 | |

Comparative Example 1

FIG. 19-2 is a perspective showing in a frame format a configuration of a liquid crystal display of comparative example 1 of the prior art.

As shown in FIG. 19-2, the liquid crystal display of comparative example 1 is a liquid crystal display having a configuration similar to Embodiment 1 except for that a conventional positive A plate 10' designed for single wavelength, a conventional positive C plate 20' designed for single wavelength, and a conventional negative C plate 30' designed for single wavelength are used in place of the positive A plate 10 designed for the entire region of the visible wavelength of the present invention, the positive C plate 20 designed for the entire region of the visible wavelength of the present invention, and the negative C plate 30 designed for the entire region of the visible wavelength of the present invention shown in FIG. 19-1.

Each optical property of the liquid crystal 2 (VA mode liquid crystal cell 5), the positive A plate 10', the positive C plate 20', and the negative C plate 30' configuring the liquid crystal display of the present comparative example is shown in table 10 below, and the respective axis setting is as shown in FIG. 19-2.

Comparative Example 2

FIG. 24-2 is a perspective showing in a frame format a configuration of a liquid crystal display of comparative example 2 of the prior art.

As shown in FIG. 24-2, the liquid crystal display of comparative example 2 is a liquid crystal display having a configuration similar to Embodiment 6 except for that a conventional negative C plate 30' designed for single wavelength and a conventional biaxial retardation film 40' designed for single wavelength are used in place of the negative C plate 30 designed for the entire region of the visible wavelength of the present invention and the biaxial retardation film 40 designed for the entire region of the visible wavelength of the present invention shown in FIG. 24-1.

Each optical property of the liquid crystal 2 (VA mode liquid crystal cell 5), the negative C plate 30' and the biaxial retardation film 40' configuring the liquid crystal display of the present comparative example is shown in table 11 below, and the respective axis setting is as shown in FIG. 24-2.

TABLE 10

| PRODUCT NAME | OPTICAL PROPERTY | | | |
|---|---|---|---|---|
| (THICKNESS) | 450 nm | 550 nm | 650 nm | REMARKS |
| LIQUID CRYSTAL | ne = 1.564 | ne = 1.550 | ne = 1.542 | VA |
| (3.5 μm) | no = 1.474 | no = 1.464 | no = 1.459 | MODE |
| POSITIVE A PLATE | nx = 1.50239 | nx = 1.50139 | nx = 1.50039 | SINGLE |
| (100 μm) | ny = 1.50100 | ny = 1.50000 | ny = 1.49900 | WAVELENGTH |
| | nz = 1.50100 | nz = 1.50000 | nz = 1.49900 | DESIGN |
| POSITIVE C PLATE | nx = 1.50100 | nx = 1.50000 | nx = 1.49900 | SINGLE |
| (100 μm) | ny = 1.50100 | ny = 1.50000 | ny = 1.49900 | WAVELENGTH |
| | nz = 1.50189 | nz = 1.50089 | nz = 1.49989 | DESIGN |
| NEGATIVE C PLATE | nx = 1.50100 | nx = 1.50000 | nx = 1.49900 | SINGLE |
| (100 μm) | ny = 1.50100 | ny = 1.50000 | ny = 1.49900 | WAVELENGTH |
| | nz = 1.49812 | nz = 1.49712 | nz = 1.49612 | DESIGN |

TABLE 11

| PRODUCT NAME | OPTICAL PROPERTY | | | |
|---|---|---|---|---|
| (THICKNESS) | 450 nm | 550 nm | 650 nm | REMARKS |
| LIQUID CRYSTAL | ne = 1.564 | ne = 1.550 | ne = 1.542 | VA |
| (3.5 μm) | no = 1.474 | no = 1.464 | no = 1.459 | MODE |
| BIAXIAL RETARDATION | nx = 1.50100 | nx = 1.50000 | nx = 1.49900 | SINGLE |
| FILM | ny = 1.49825 | ny = 1.49725 | ny = 1.49625 | WAVELENGTH |
| (100 μm) | nz = 1.49963 | nz = 1.49863 | nz = 1.49763 | DESIGN |
| NEGATIVE C PLATE | nx = 1.50100 | nx = 1.50000 | nx = 1.49900 | SINGLE |
| (100 μm) | ny = 1.50100 | ny = 1.50000 | ny = 1.49900 | WAVELENGTH |
| | nz = 1.49812 | nz = 1.49712 | nz = 1.49612 | DESIGN |

Comparative Example 3

FIG. 32 is a perspective view showing in a frame format the configuration of the liquid crystal display of comparative example 3 of the prior art.

As shown in FIG. 32, the liquid crystal display of comparative example 3 is a VA mode liquid crystal display realized by arranging the conventional negative C plate 30' designed for single wavelength on the outer side of the VA mode liquid crystal cell 5, where the liquid crystal 2 having negative dielectric constant anisotropy is sandwiched between two upper and lower substrates 1a, 1b performed with vertical alignment process on the surface; arranging on one outer side thereof a polarizing film 100a obtained by stacking in order the TAC film 60, the polarizing element 50a and the TAC film 60a; and arranging a polarizing film 100b obtained by stacking in order the conventional positive A plate 10' designed for single wavelength, the TAC film 60b, the polarizing element 50b and the TAC film 60b on the other outer side of the VA mode liquid crystal cell 5 so that the side of the positive A plate 10' is positioned on the liquid crystal cell 5 side.

Each optical property of the liquid crystal 2 (VA mode liquid crystal cell 5), the positive A plate 10', the negative C plate 30' and the TAC films 60a, 60b configuring the liquid crystal display of the present comparative example is shown in table 12 below, and the respective axis setting is as shown in FIG. 32.

Comparative Example 4

FIG. 31-2 is a perspective showing in a frame format a configuration of a liquid crystal display of comparative example 4 of the prior art.

As shown in FIG. 31-2, the liquid crystal display of comparative example 4 is a liquid crystal display having a configuration similar to Embodiment 13 except for that a conventional biaxial retardation film 40' designed for single wavelength is used in place of the biaxial retardation film 40 designed for the entire region of the visible wavelength of the present invention shown in FIG. 31-1.

Each optical property of the liquid crystal 3 (IPS mode liquid crystal cell 6), the biaxial retardation film 40' and the isotropic film 70 configuring the liquid crystal display of the present comparative example is shown in table 13 below, and the respective axis setting is as shown in FIG. 31-2.

TABLE 12

| PRODUCT NAME | OPTICAL PROPERTY | | | |
|---|---|---|---|---|
| (THICKNESS) | 450 nm | 550 nm | 650 nm | REMARKS |
| LIQUID CRYSTAL | ne = 1.564 | ne = 1.550 | ne = 1.542 | VA |
| (3.5 μm) | no = 1.474 | no = 1.464 | no = 1.459 | MODE |
| POSITIVE A PLATE | nx = 1.50186 | nx = 1.50086 | nx = 1.49986 | SINGLE |
| (100 μm) | ny = 1.50100 | ny = 1.50000 | ny = 1.49900 | WAVELENGTH |
| | nz = 1.50100 | nz = 1.50000 | nz = 1.49900 | DESIGN |
| NEGATIVE C PLATE | nx = 1.50100 | nx = 1.50000 | nx = 1.49900 | SINGLE |
| (100 μm) | ny = 1.50100 | ny = 1.50000 | ny = 1.49900 | WAVELENGTH |
| | nz = 1.49979 | nz = 1.49879 | nz = 1.49779 | DESIGN |

TABLE 13

| PRODUCT NAME (THICKNESS) | OPTICAL PROPERTY | | | REMARKS |
|---|---|---|---|---|
| | 450 nm | 550 nm | 650 nm | |
| LIQUID CRYSTAL (3.2 μm) | ne = 1.564 no = 1.474 | ne = 1.550 no = 1.464 | ne = 1.542 no = 1.459 | IPS MODE |
| BIAXIAL RETARDATION FILM (100 μm) | nx = 1.50100 ny = 1.49825 nz = 1.49963 | nx = 1.50000 ny = 1.49725 nz = 1.49863 | nx = 1.49900 ny = 1.49625 nz = 1.49763 | SINGLE WAVELENGTH DESIGN |
| ISOTROPIC FILM (80 μm) | nx = 1.51000 ny = 1.51000 nz = 1.51000 | nx = 1.51000 ny = 1.51000 nz = 1.51000 | nx = 1.51000 ny = 1.51000 nz = 1.51000 | |

<Simulation Evaluation of Display Property>

The display of black was performed for the liquid crystal display of each example, and the transmissivity at the oblique viewing angle of 60°, and the distance ΔExy between the chromaticity point at the oblique viewing angle of 60° and the chromaticity point at the front view were examined, which results are shown in table 14 below.

TABLE 14

| | OBLIQUE VIEWING ANGLE PROPERTY OF 60° | | LIQUID CRYSTAL MODE |
|---|---|---|---|
| | TRANSMISSIVITY (%) | Δ Exy | |
| EMBODIMENT 1 | 0.01 | 0.008 | VA |
| EMBODIMENT 2 | 0.01 | 0.008 | VA |
| EMBODIMENT 3 | 0.01 | 0.001 | VA |
| EMBODIMENT 4 | 0.01 | 0.008 | VA |
| EMBODIMENT 5 | 0.01 | 0.008 | VA |
| EMBODIMENT 6 | 0.01 | 0.001 | VA |
| EMBODIMENT 7 | 0.01 | 0.001 | VA |
| EMBODIMENT 8 | 0.01 | 0.009 | VA |
| EMBODIMENT 9 | 0.01 | 0.009 | VA |
| EMBODIMENT 10 | 0.01 | 0.011 | VA |
| EMBODIMENT 11 | 0.01 | 0.024 | IPS |
| EMBODIMENT 12 | 0.01 | 0.026 | IPS |
| EMBODIMENT 13 | 0.01 | 0.029 | IPS |
| COMPARATIVE EXAMPLE 1 | 0.04 | 0.182 | VA |
| COMPARATIVE EXAMPLE 2 | 0.02 | 0.125 | VA |
| COMPARATIVE EXAMPLE 3 | 0.05 | 0.178 | VA |
| COMPARATIVE EXAMPLE 4 | 0.03 | 0.141 | IPS |

As apparent from table 14, the transmissivity at the oblique viewing angle was lower, ΔExy was very small, and the viewing angle property improved in the liquid crystal display of Embodiments 1 to 13 according to the present invention compared to the liquid crystal display of comparative examples 1 to 4 of the prior art in time of display of black. In particular, reduction in ΔExy, that is, improvement in coloration phenomenon was significant.

2. Manufacturing of Liquid Crystal Display, and Evaluation of Display Property of the Same
<Manufacturing of Liquid Crystal Display>

The liquid crystal display was actually manufactured in the following Embodiments 14 to 16 and comparative example 5.

Embodiment 14

The liquid crystal display having a configuration similar to Embodiment 9 was experimentally manufactured in the present Embodiment.

Specifically, the positive A plate 10 was manufactured from resin which absolute value of photoelastic coefficient is $10 \times 10^{-8}$ cm$^2$/N, and had optical property (reverse wavelength dispersion property) of Rxy(550)=Rxz(650)=140 nm, Rxy(450)/Rxy(550)=0.84, Rxy(650)/Rxy(550)=1.11, as shown in table 4 above.

The negative C plate 30 was manufactured from resin which absolute value of photoelastic coefficient is $5 \times 10^{-8}$ cm$^2$/N, and had optical property (forward wavelength dispersion property) of Rxy(550)=2 nm, Rxz(550)=200 nm, Rxy(450)/Rxy(550)=1.06, Rxy(650)/Rxy(550)=0.95.

Furthermore, that including a rib shaped protrusion (alignment dividing means) which alignment direction of the liquid crystal molecules in time of intermediate tone display and in time of display of white is 4, and a pigment dispersion color filter (color separation means) for performing color display, and in which contrast ratio measured from the normal line direction is 1140 was manufactured for the VA liquid crystal cell 5.

The contrast ratio is defined by the ratio of the transmissivity in time of display of white with respect to the transmissivity in time of display of black, and each transmissivity was measured by performing light acceptance at the viewing angle of 2° using a diffusion light source which half band width of output angle-luminance property in an arbitrary azimuthal direction is greater than or equal to 40°.

Embodiment 15

The liquid crystal display of the present Embodiment has a configuration similar to the liquid crystal display of Embodiment 14 except for that the contrast ratio measured from the normal line direction of the liquid crystal cell is 730.

Embodiment 16

The liquid crystal display of the present Embodiment has a configuration similar to the liquid crystal display of Embodiment 14 except for that both the positive A plate 10 and the negative C plate 30 are manufactured from resin in which absolute value of photoelastic coefficient is $45 \times 10^{-8}$ cm$^2$/N.

Comparative Example 5

The liquid crystal display of the present comparative example has a configuration similar to the liquid crystal display of Embodiment 14 except for that both the positive A plate 10 and the negative C plate 30 are manufactured from resin having a flat wavelength dispersion property.

Specifically, the positive A plate 10 is manufactured from resin in which absolute value of photoelastic coefficient is $10 \times 10^{-8}$ cm$^2$/N, and has optical property (flat wavelength dispersion property) of Rxy(550)=Rxz(650)=140 nm, Rxy(450)/Rxy(550)=1.00, Rxy(650)/Rxy(550)=1.00, as shown in table 15. Furthermore, the negative C plate 30 is manufactured from resin in which absolute value of photoelastic coefficient is $5 \times 10^{-8}$ cm$^2$/N, and the optical property thereof has optical property (flat wavelength dispersion property) of Rxy(550)=2 nm, Rxz(550)=200 nm, Rxy(450)/Rxy(550)=1.00, Rxy(650)/Rxy(550)=1.00, as shown in table 15 below.

TABLE 15

| PRODUCT NAME | OPTICAL PROPERTY | | | |
|---|---|---|---|---|
| (THICKNESS) | 450 nm | 550 nm | 650 nm | REMARKS |
| LIQUID CRYSTAL (3.5 μm) | ne = 1.564 no = 1.474 | ne = 1.550 no = 1.464 | ne = 1.542 no = 1.459 | VA MODE |
| POSITIVE A PLATE (100 μm) | nx = 1.50139 ny = 1.50000 nz = 1.50000 | nx = 1.50139 ny = 1.50000 nz = 1.50000 | nx = 1.50139 ny = 1.50000 nz = 1.50000 | TOTAL WAVELENGTH DESIGN |
| NEGATIVE C PLATE (100 μm) | nx = 1.50000 ny = 1.50000 nz = 1.49799 | nx = 1.50000 ny = 1.50000 nz = 1.49799 | nx = 1.50000 ny = 1.50000 nz = 1.49799 | TOTAL WAVELENGTH DESIGN |

<Evaluation of Display Property>

The evaluation results of the liquid crystal display manufactured in Embodiments 14 to 16 and comparative example 5 are shown in table 16 below. In evaluation, the backlight of a commercially available LCD television (37 inch AQUOS (trade name) manufactured by Sharp Co.) was used as the light source.

TABLE 16

| | OBLIQUE VIEWING ANGLE PROPERTY OF 60° | | |
|---|---|---|---|
| | TRANSMISSIVITY (%) | Δ Exy | REMARKS |
| EMBODIMENT 14 | 0.02 | 0.014 | |
| EMBODIMENT 15 | 0.03 | 0.077 | |
| EMBODIMENT 16 | 0.02 | 0.014 | SIGNIFICANT UNEVENNESS OCCURRED 60 MINUTES AFTER LIGHTING BACKLIGHT. |
| COMPARAIVE EXAMPLE 5 | 0.11 | 0.121 | |

As apparent from table 16, the transmissivity at the oblique viewing angle was lower, ΔExy was very small, and the viewing angle property improved in the liquid crystal display of Embodiment 14 according to the present invention compared to the liquid crystal display of comparative example 5 when performing display of black. In particular, reduction in ΔExy, that is, improvement in coloration phenomenon was significant. Therefore, the positive A plate 10 preferably exhibits the reverse wavelength dispersion property, and the negative C plate 30 preferably exhibits the forward wavelength dispersion property.

The viewing angle property improved in the liquid crystal display of Embodiment 15 compared to the liquid crystal display of comparative example 5, but the effect thereof is small compared to the liquid crystal display device of Embodiment 14. Therefore, the contrast ratio of the liquid crystal cell is preferably greater than or equal to 730, and more preferably greater than or equal to 1140.

The viewing angle property improved in the liquid crystal display of Embodiment 16 similar to the liquid crystal display of Embodiment 14, but after continuing the evaluation with the backlight lighted, the positive A plate 10 and the negative C plate 30 deformed due to the radiated heat from the backlight, and thus significant unevenness (light leakage) occurred. Therefore, the retardation film preferably has a photoelastic coefficient of less than or equal to $10 \times 10^{-8}$ cm$^2$/N.

The present application claims priority (under 35 U.S.C §119) on Patent Application No. 2004-192107 filed in Japan on Jun. 29, 2004, the entire contents of which are hereby incorporated by reference.

In the present specification, "greater than or equal to" and "less than or equal to" include the relevant numerical value. In other words, "greater than or equal to" means relevant numerical value and greater than or equal to the relevant numerical value.

BRIEF DESCRIPTION OF THE DRAWINGS

FIG. 19-1 is a perspective view showing in a frame format a configuration of a liquid crystal display of Embodiment 1;

FIG. 19-2 is a perspective view showing in a frame format a configuration of a liquid crystal display of a comparative Embodiment 1;

FIG. 24-1 is a perspective view showing in a frame format a configuration of a liquid crystal display of Embodiment 6;

FIG. 24-2 is a perspective view showing in a frame format a configuration of a liquid crystal display of comparative example 2;

FIG. 31-1 is a perspective view showing in a frame format a configuration of a liquid crystal display of Embodiment 13;

FIG. 31-2 is a perspective view showing in a frame format a configuration of a liquid crystal display of comparative example 4.

Figure 1:
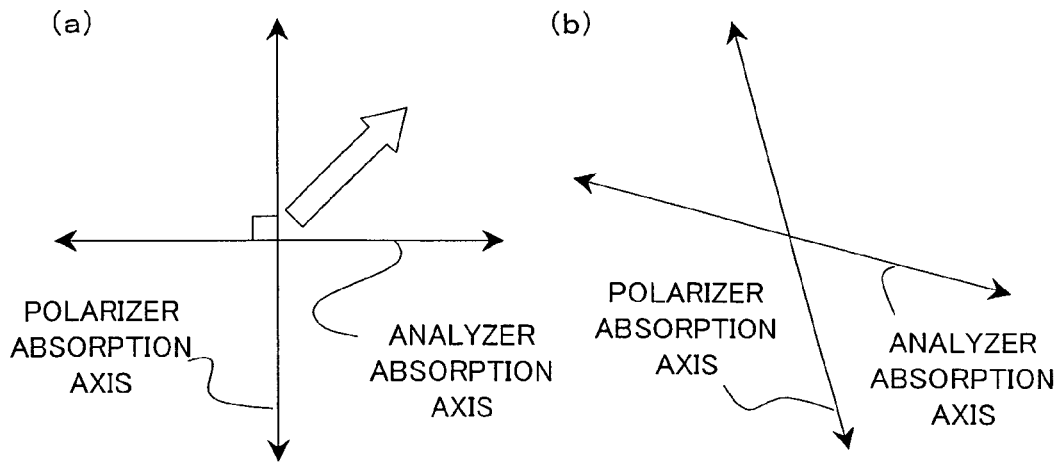
FIG. 1 is a view showing in a frame format the relative arrangement relationship of the absorption axes for the system in which two polarizing elements are arranged in the Cross-Nicol relationship, where (a) is when observed from the front, and (b) is when observed from an oblique viewing angle.
Figure 2:
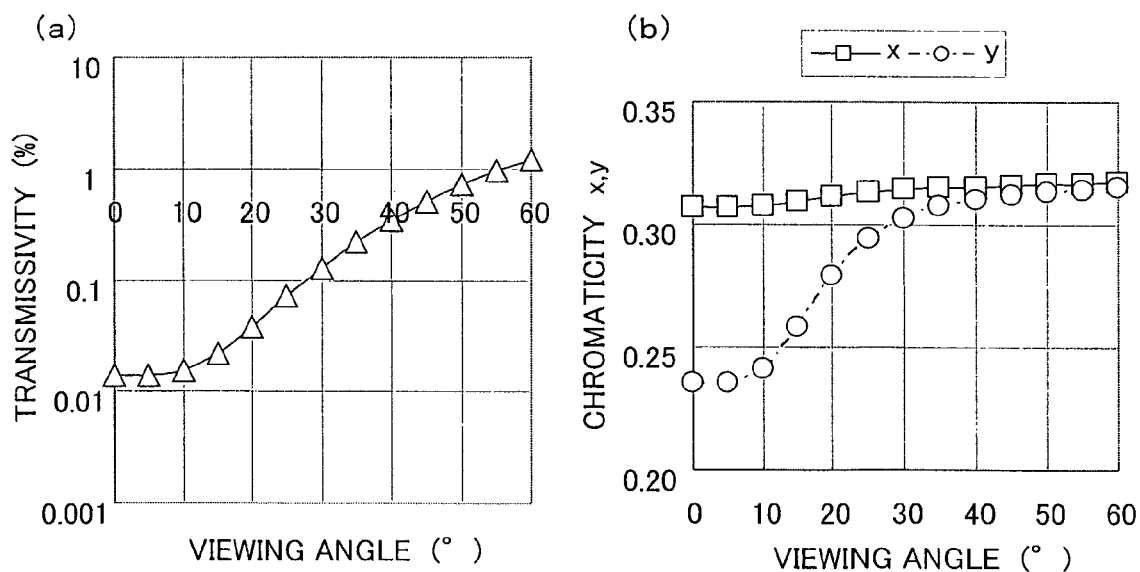
FIG. 2 (a) is a view showing the result of calculating transmissivity of when observed with the viewing angle tilted in the 45° direction for the system in which two polarizing elements are arranged in the Cross-Nicol relationship, and FIG. 2 (b) is a view showing the result of calculating the change in chromaticity in the relevant case.
Figure 3:
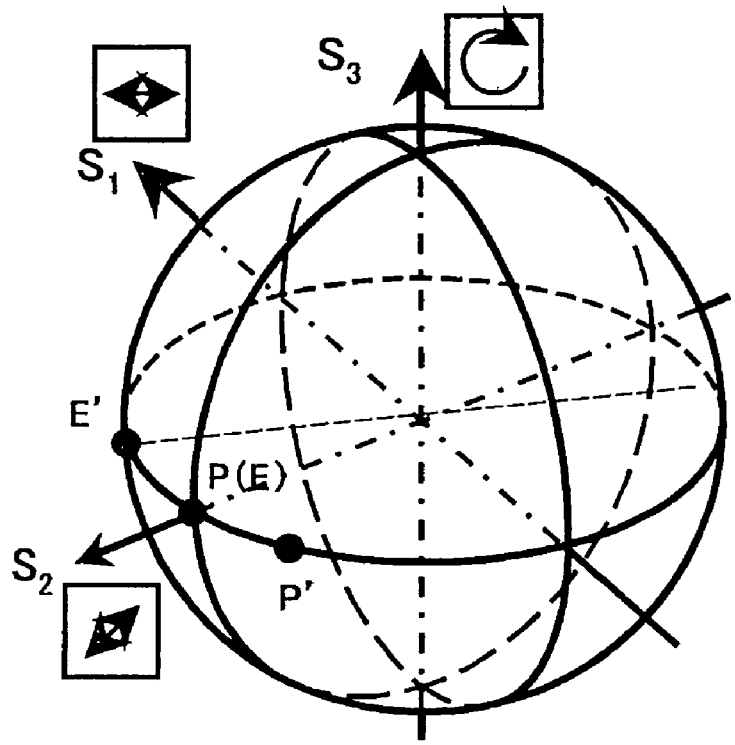
FIG. 3 is a view explaining a phenomenon in which the transmissivity increases and the chromaticity point changes the more the viewing angle is tilted in a system in which two polarizing elements are arranged in the Cross-Nicol relationship.
Figure 4:
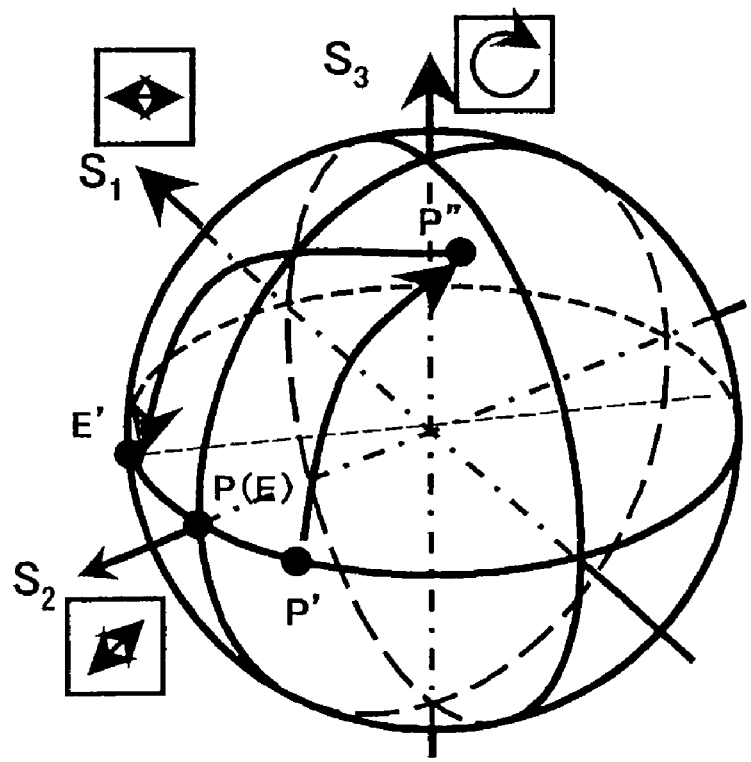
FIG. 4 is a view explaining in frame format the effect of when the positive A plate and the positive C plate are arranged between two polarizing elements in a system in which two polarizing elements arranged in a Cross-Nicol relationship.
Figure 5:
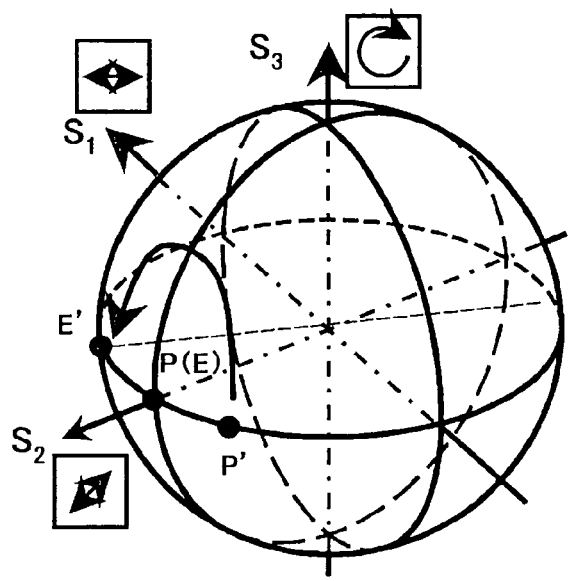
FIG. 5 is a view explaining in frame format the effect of when one biaxial retardation film is arranged between two polarizing elements in a system in which two polarizing elements are arranged in a Cross-Nicol relationship.
Figure 6:
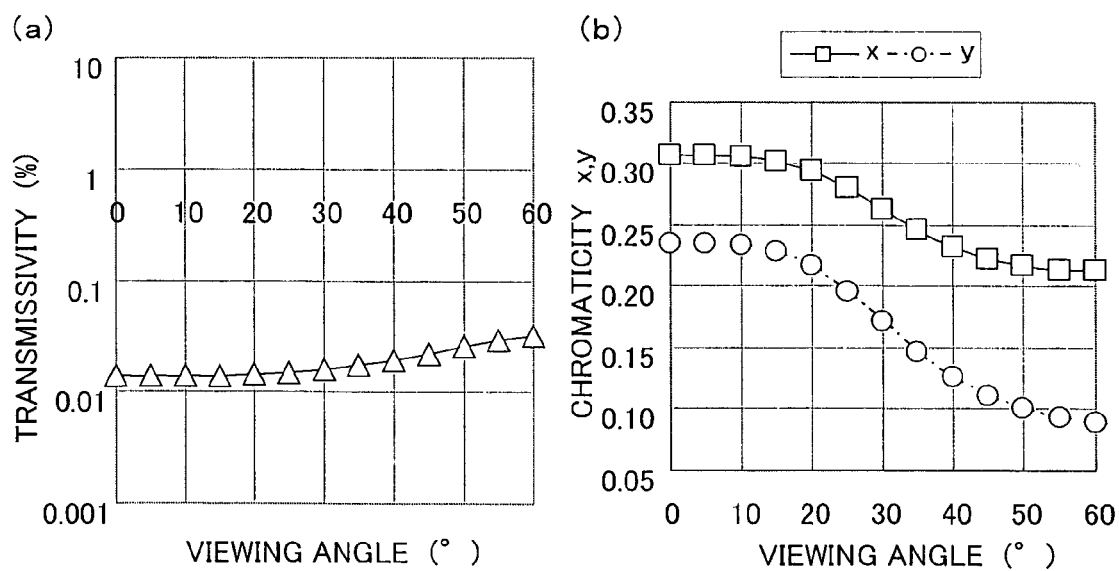
FIG. 6 (a) is a view showing the result of calculating the transmissivity (Y value) of when observed with the viewing angle titled to 45° direction, FIG. 6 (b) is a view showing the result of calculating the change in chromaticity of the relevant case in a system in which the conventional single wavelength designed positive A plate and the positive C plate are arranged between two polarizing elements arranged in the Cross-Nicol relationship.
Figure 7:
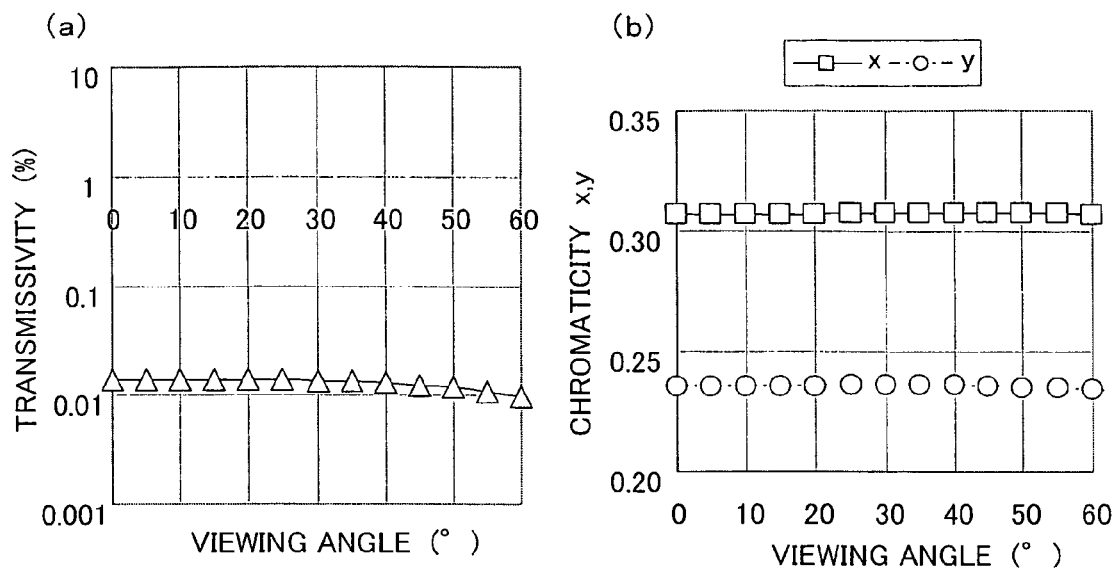
FIG. 7 (a) is a view showing the result of calculating the transmissivity (Y value) of when observed with the viewing angle titled to 45° direction, and FIG. 7 (b) is a view showing the result of calculating the change in chromaticity of a relevant case in a system in which the retardation film designed for the entire region of the visible wavelength of the present invention is arranged in place of the retardation film designed for single wavelength of the prior art in the system of FIG. 6.
Figure 8:
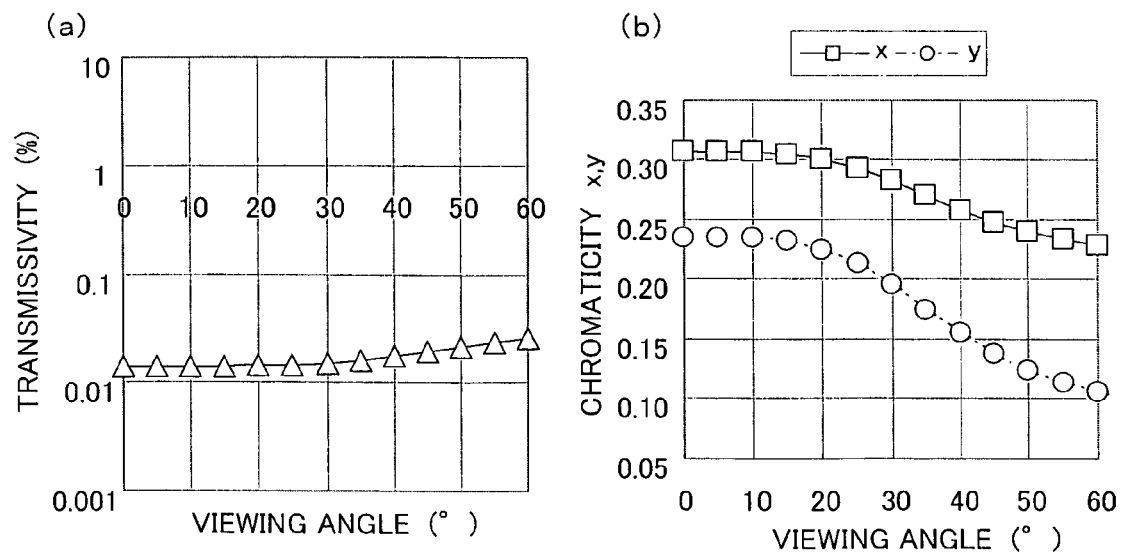
FIG. 8 (a) is a view showing a result of calculating the transmissivity (Y value) of when observed with the viewing angle tilted to the 45° direction, and FIG. 8 (b) is a view showing a result of calculating the change in chromaticity of the relevant case in a system in which the conventional biaxial retardation film designed for the single wavelength is arranged between two polarizing elements arranged in Cross-Nicol relationship.
Figure 9:
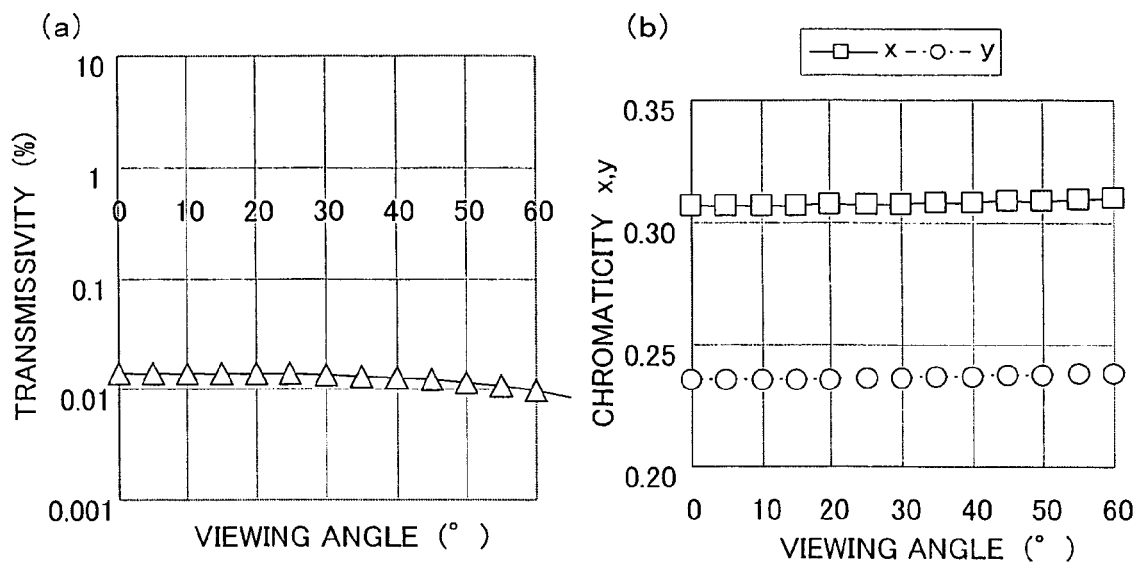
FIG. 9 (a) is a view showing a result of calculating the transmissivity (Y value) of when observed with the viewing angle tilted to the 45° direction, and FIG. 9 (b) is a view showing a result of calculating the change in chromaticity of the relevant case in a system in which the retardation film designed for the entire region of the visible wavelength of the present invention is arranged in place of the conventional retardation film designed for the single wavelength in the system of FIG. 8.
Figure 10:
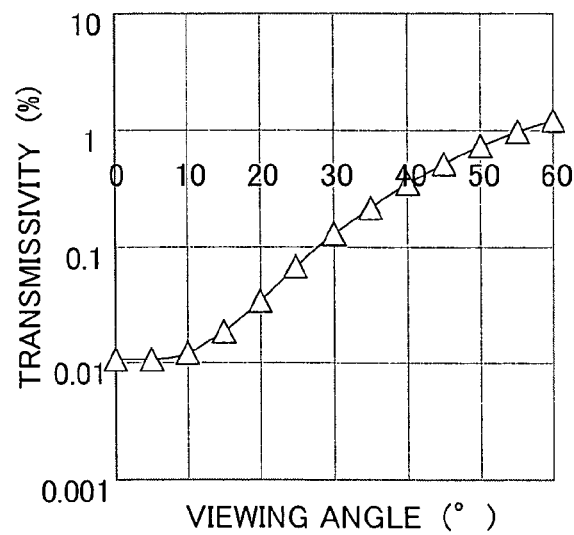
FIG. 10 is a view showing a result of calculating the transmissivity (≠Y value) of when observed with the viewing angle tilted to the 45° direction in a system in which two polarizing elements are arranged in Cross-Nicol.
Figure 11:
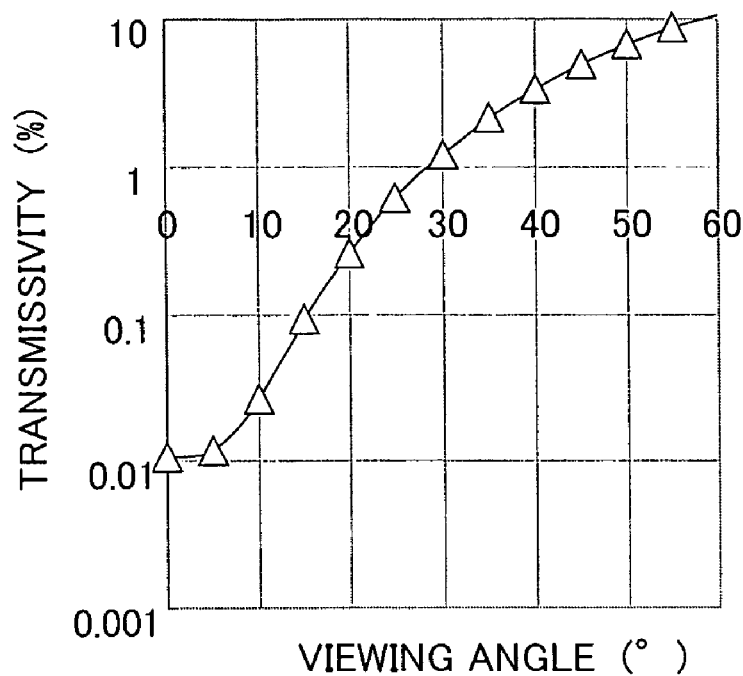
FIG. 11 is a view showing a result of calculating the transmissivity (≠Y value) of when observed with the viewing angle tilted to the 45° direction in a system in which the liquid crystal cell is arranged between the polarizing elements in the system of FIG. 10.
Figure 12:
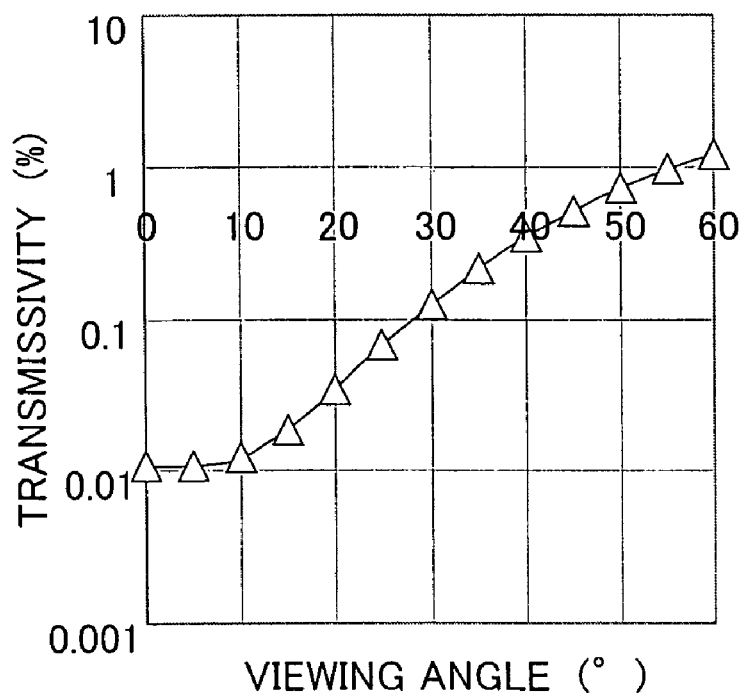
FIG. 12 is a view showing a result of calculating the transmissivity (≠Y value) of when observed with the viewing angle tilted to the 45° direction in a system in which the conventional negative C plate designed for single wavelength is arranged so as to be adjacent to the liquid crystal cell in the system of FIG. 11.
Figure 13:
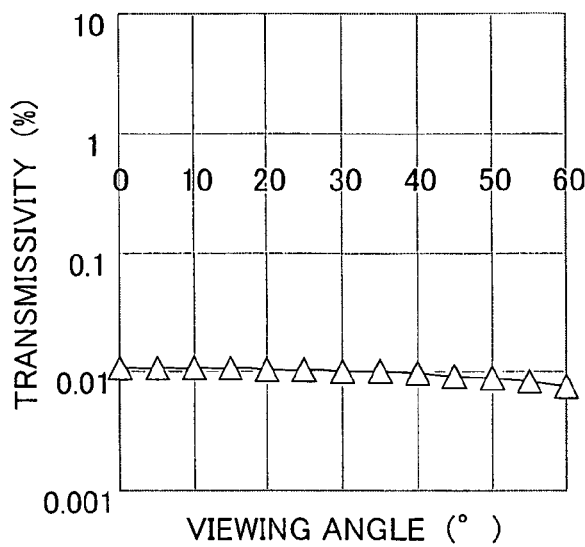
FIG. 13 is a view showing a result of calculating the transmissivity (≠Y value) of when observed with the viewing angle tilted to the 45° direction in a system in which the biaxial retardation film designed for the entire region of the visible wavelength of the present invention is arranged so as to be adjacent to the polarizing element on the liquid crystal cell side of one polarizing element in the system of FIG. 12.
Figure 14:
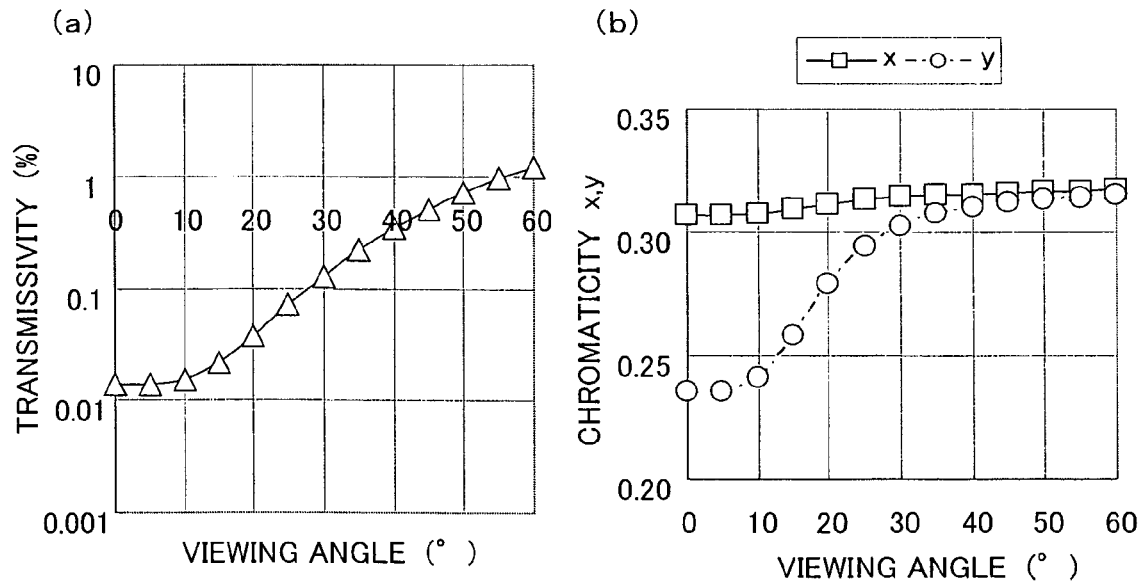
FIG. 14 (a) is a view showing a result of calculating the transmissivity of when observed with the viewing angle tilted to the 45° direction, and FIG. 14 (b) is a view showing a result of calculating the change in chromaticity of the relevant case in a system in which the two polarizing elements are arranged in Cross-Nicol.
Figure 15:
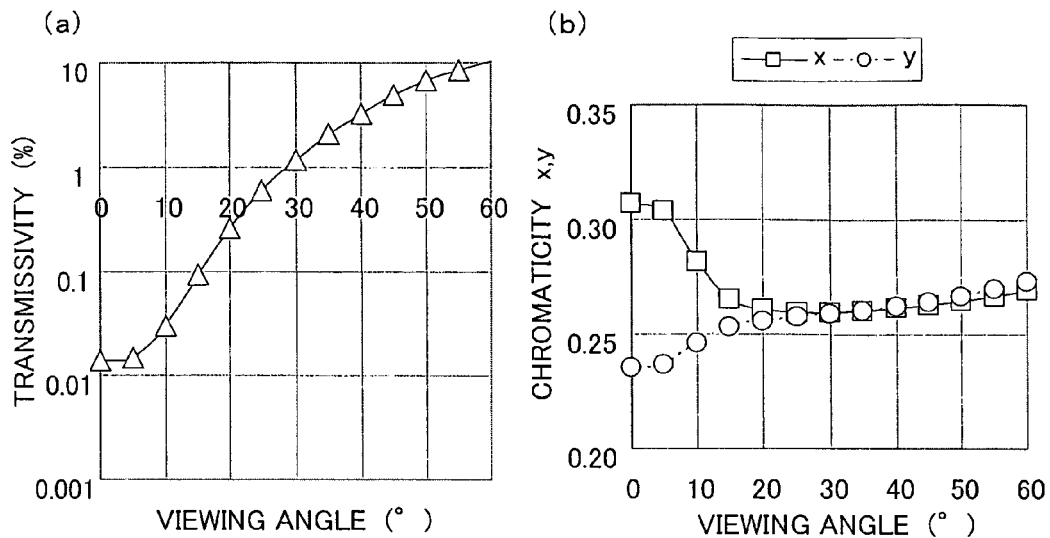
FIG. 15 (a) is a view showing a result of calculating the transmissivity of when observed with the viewing angle tilted to the 45° direction, and FIG. 15 (b) is a view showing a result of calculating the change in chromaticity of the relevant case in a system in which the liquid crystal cell is arranged between the polarizing elements in the system of FIG. 14.
Figure 16:
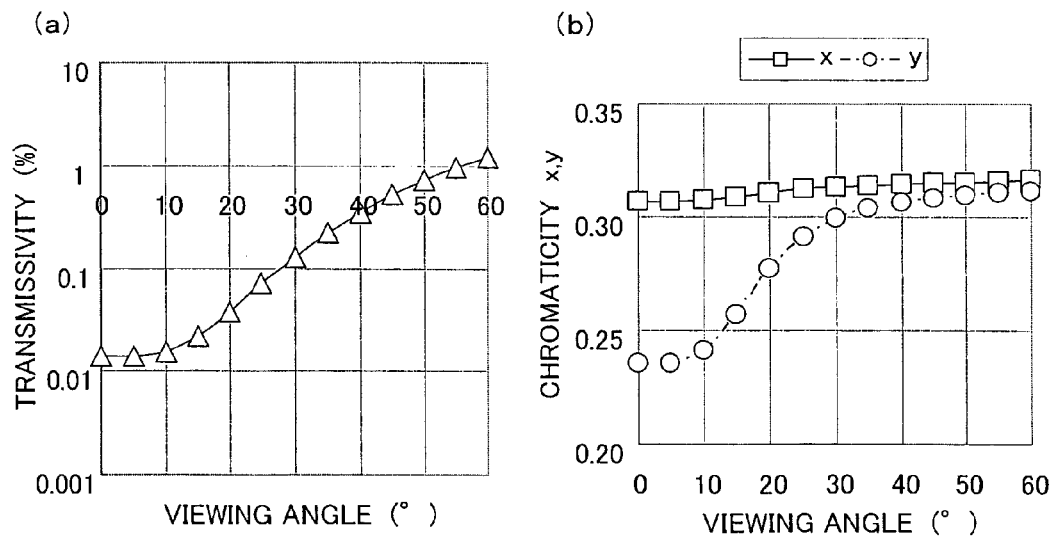
FIG. 16 (a) is a view showing a result of calculating the transmissivity of when observed with the viewing angle tilted to the 45° direction, and FIG. 16 (b) is a view showing a result of calculating the change in chromaticity of the relevant case in a system in which the conventional negative C plate designed for single wavelength is arranged so as to be adjacent to the liquid crystal cell in the system of FIG. 15.
Figure 17:
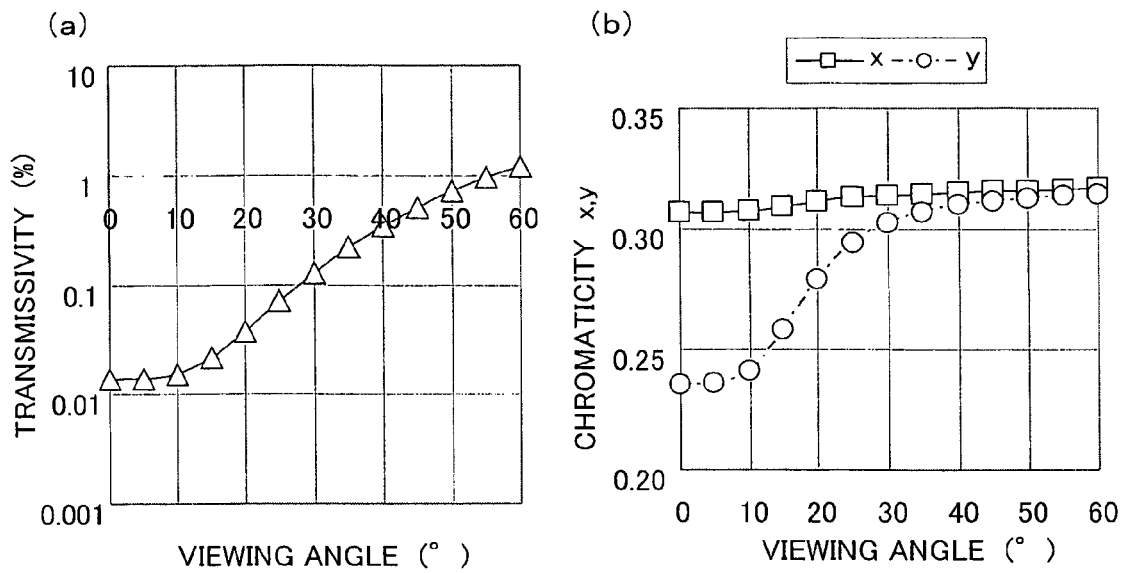
FIG. 17 (a) is a view showing a result of calculating the transmissivity of when observed with the viewing angle tilted to the 45° direction, and FIG. 17 (b) is a view showing a result of calculating the change in chromaticity of the relevant case in a system in which the negative C plate designed for the entire region of the visible wavelength of the present invention is arranged in place of the conventional negative C plate designed for single wavelength in FIG. 16.
Figure 18:
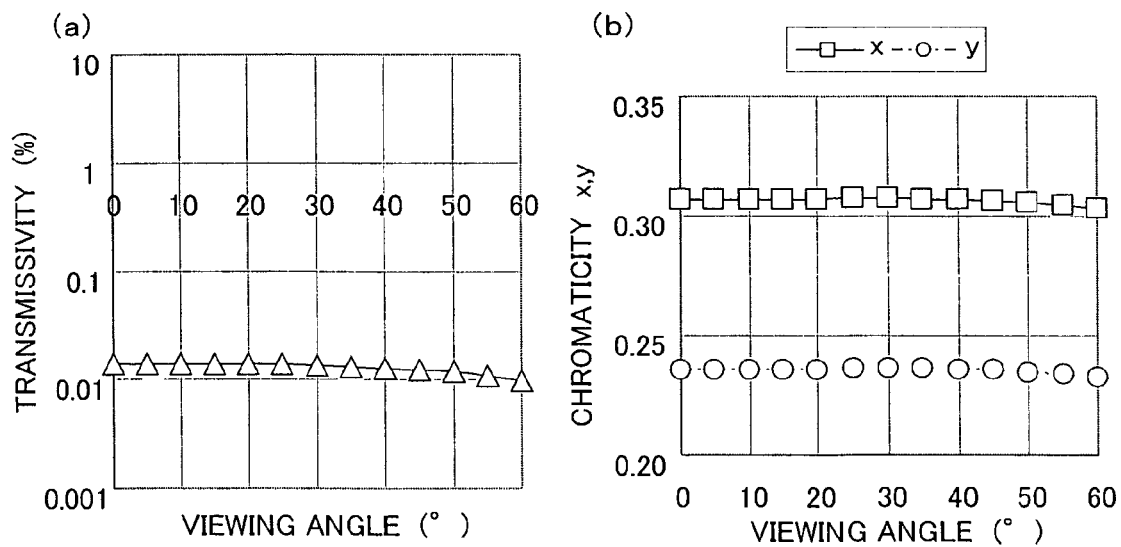
FIG. 18 (a) is a view showing a result of calculating the transmissivity of when observed with the viewing angle tilted to the 45° direction, and FIG. 18 (b) is a view showing a result of calculating the change in chromaticity of the relevant case in a system in which the biaxial retardation film designed for the entire region of the visible wavelength of the present invention is arranged so as to be adjacent to the polarizing element on the liquid crystal cell side of one polarizing element in the system of FIG. 17.
Figures 1, 19:
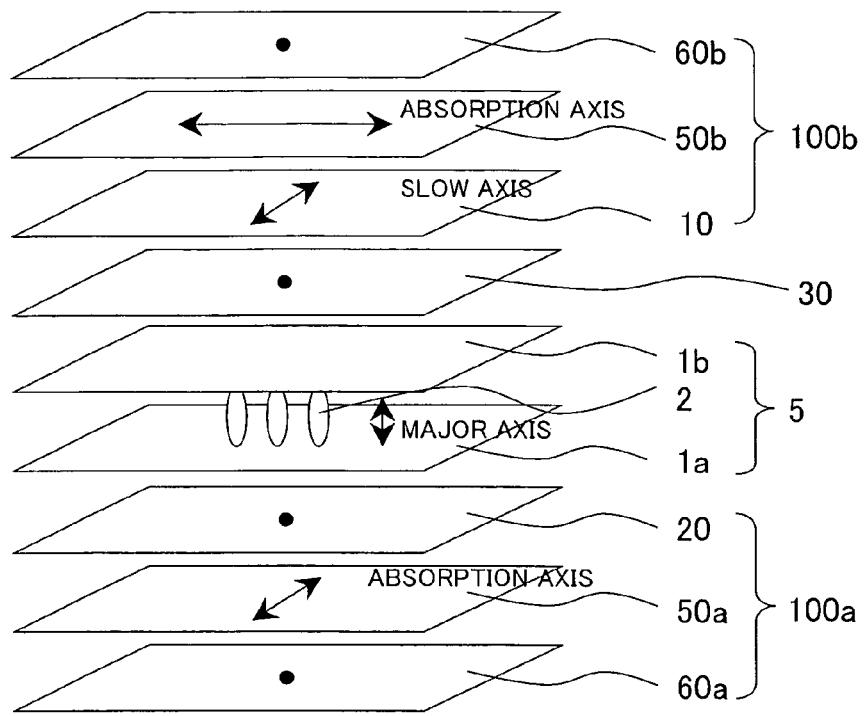
Figures 2, 19:
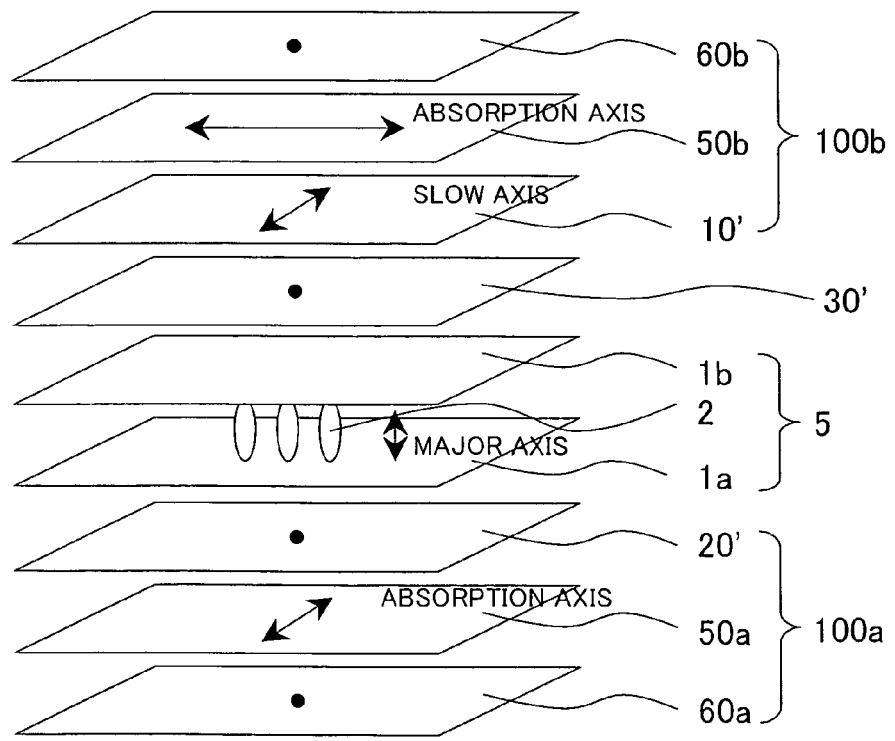
Figure 20:
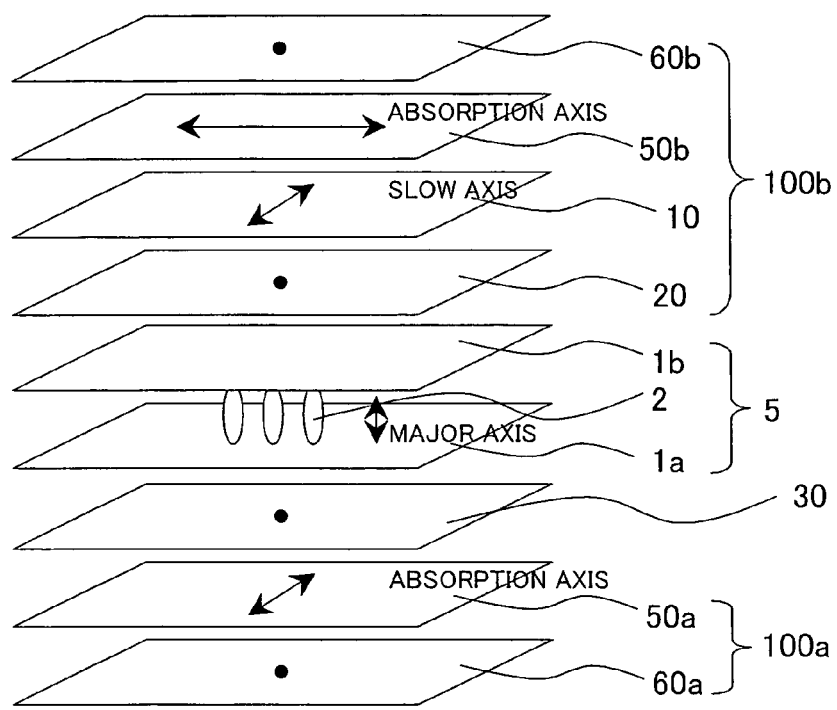
FIG. 20 is a perspective view showing in a frame format a configuration of a liquid crystal display of Embodiment 2.
Figure 21:
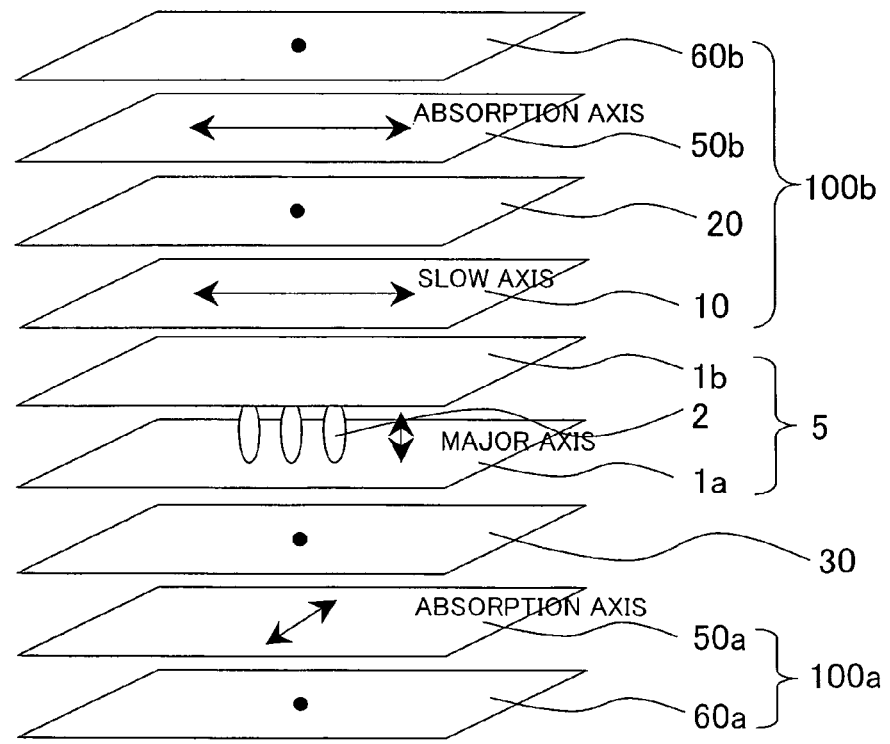
FIG. 21 is a perspective view showing in a frame format a configuration of a liquid crystal display of Embodiment 3.
Figure 22:
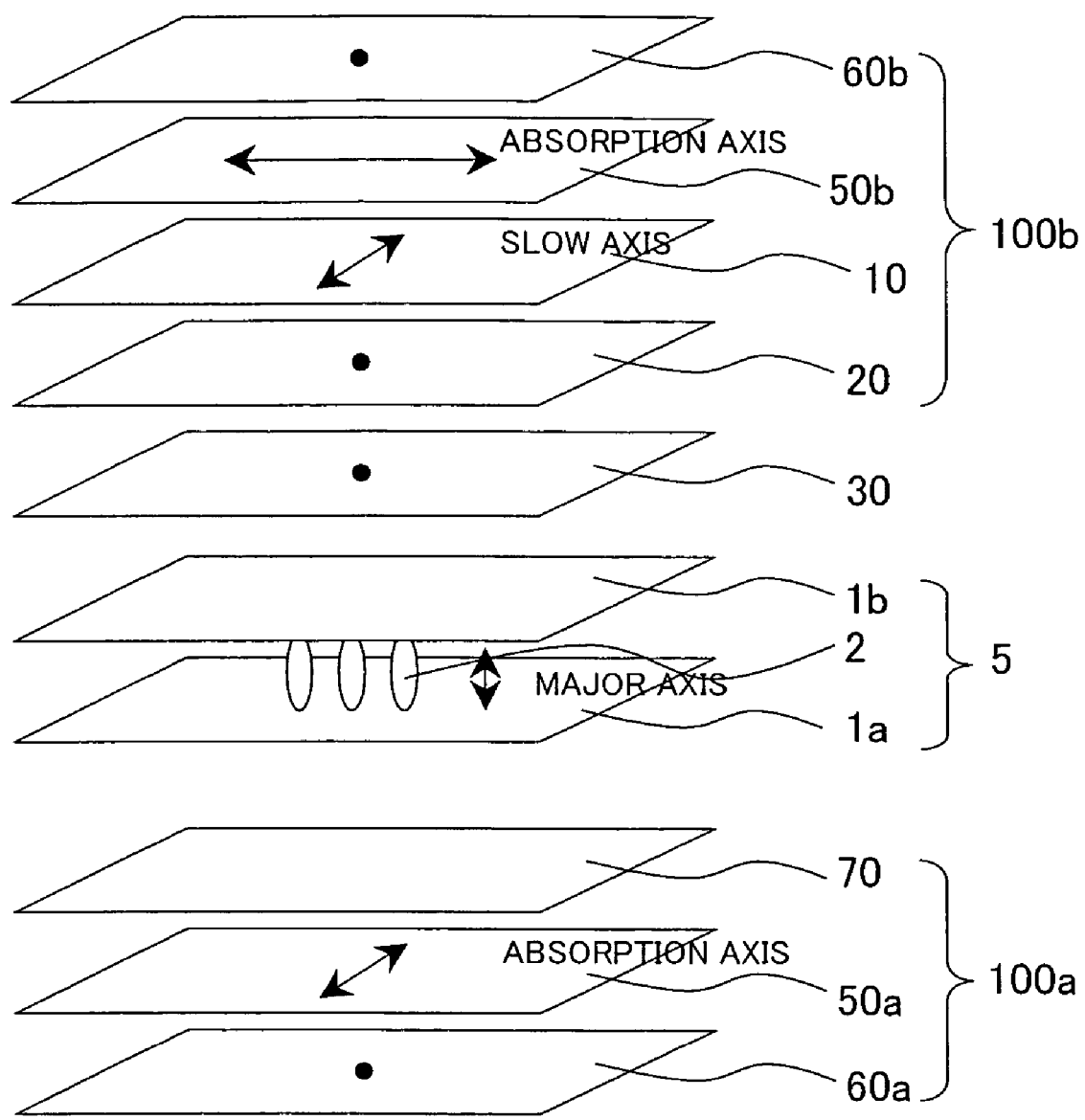
FIG. 22 is a perspective view showing in a frame format a configuration of a liquid crystal display of Embodiment 4.
Figure 23:
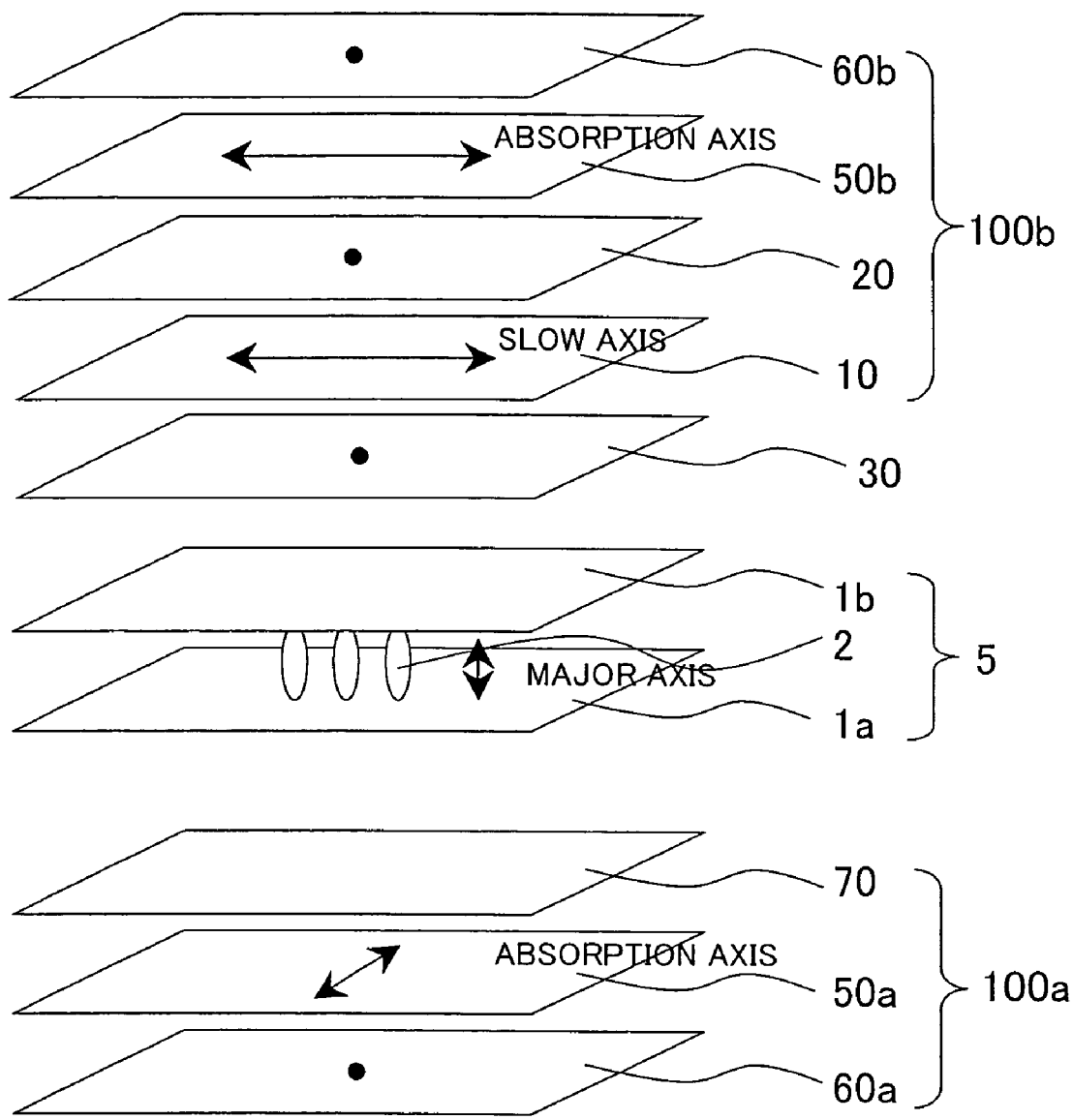
FIG. 23 is a perspective view showing in a frame format a configuration of a liquid crystal display of Embodiment 5.
Figures 1, 24:
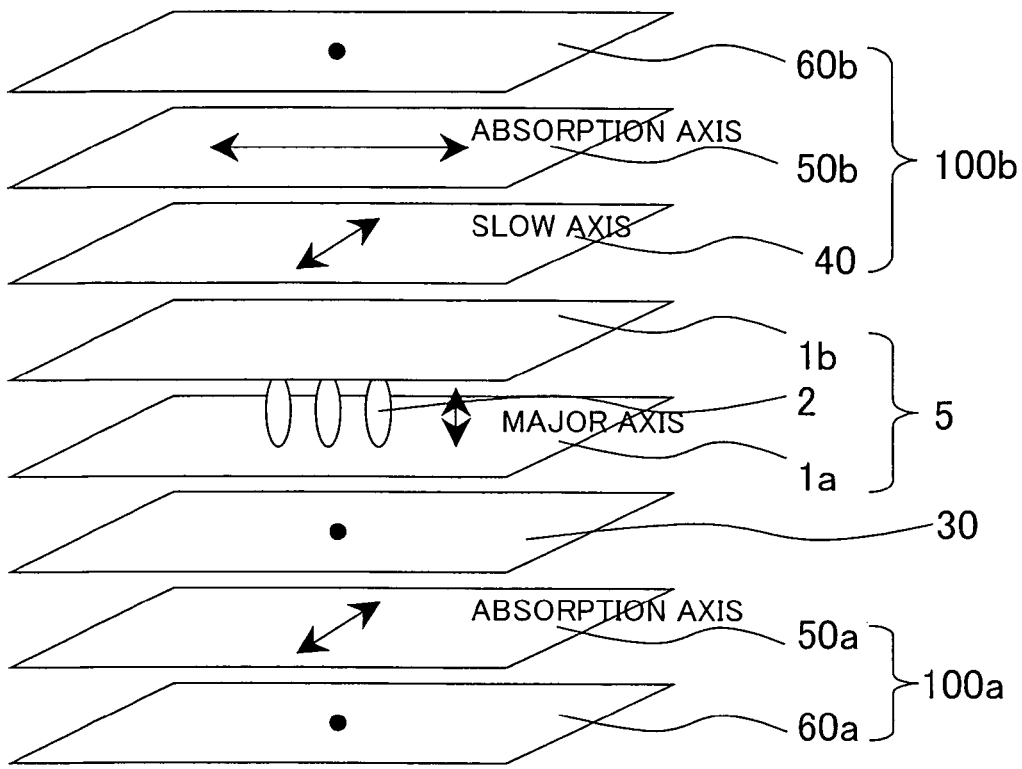
Figures 2, 24:
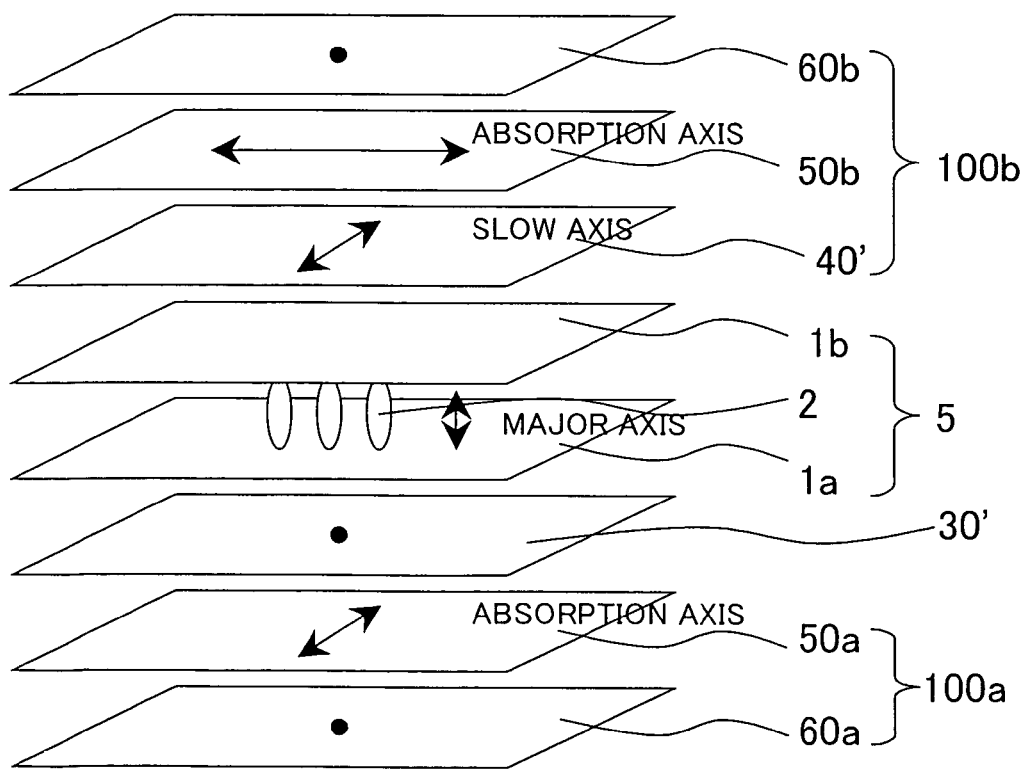
Figure 25:
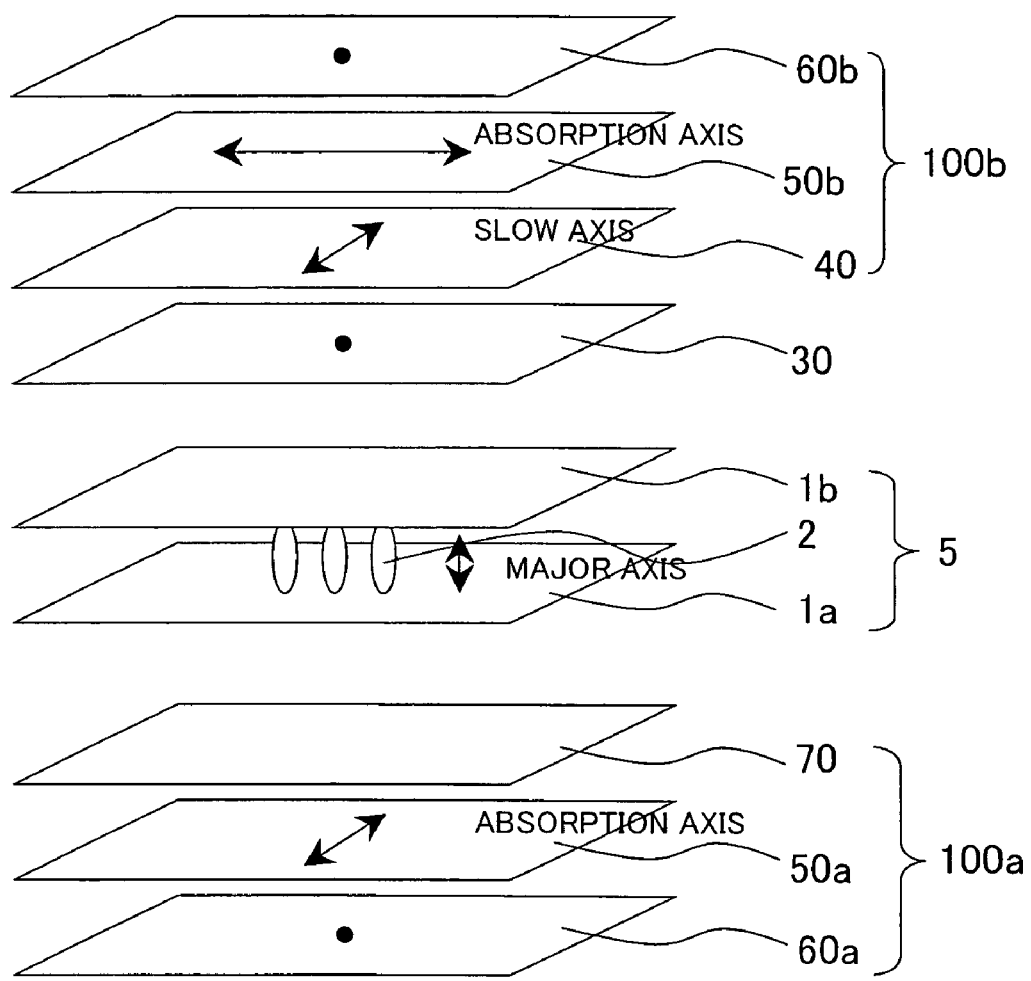
FIG. 25 is a perspective view showing in a frame format a configuration of a liquid crystal display of Embodiment 7.
Figure 26:
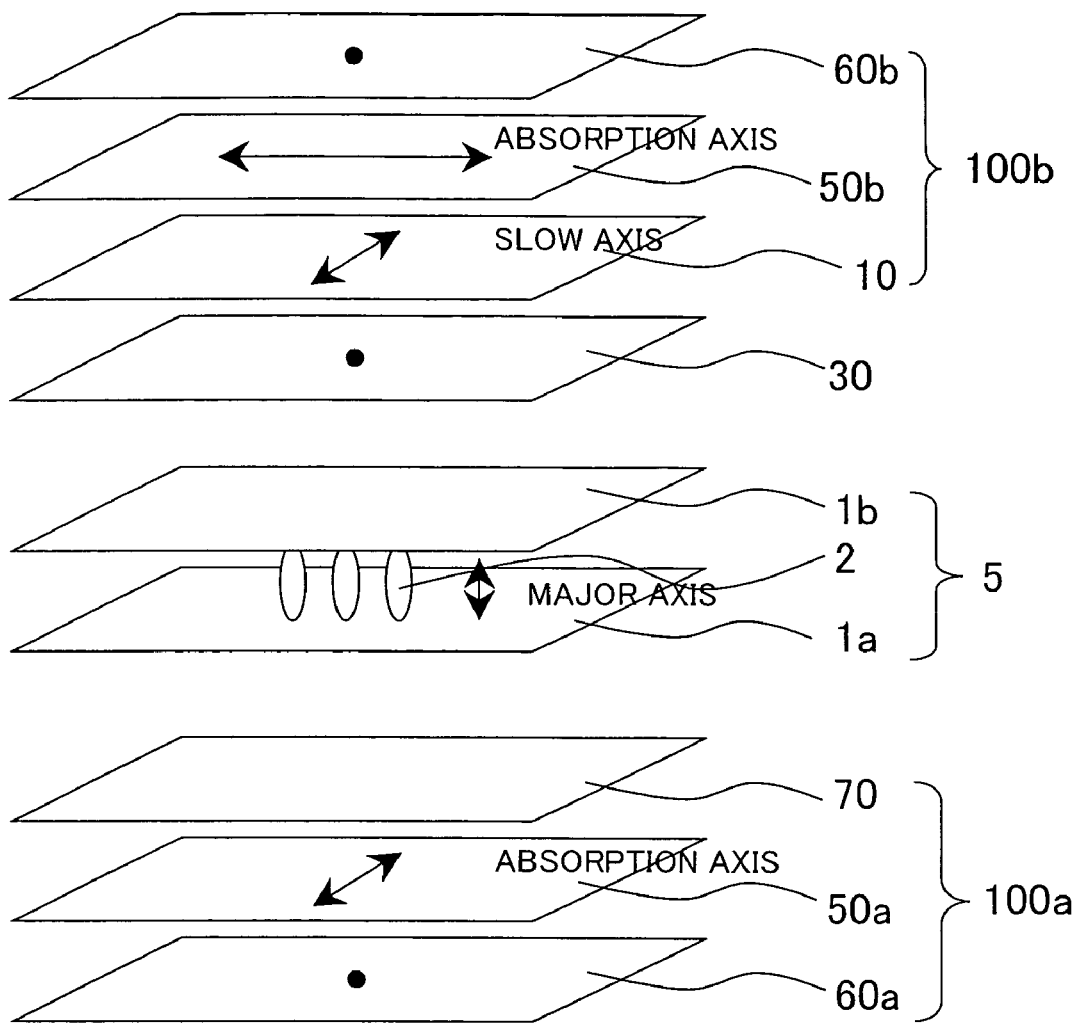
FIG. 26 is a perspective view showing in a frame format a configuration of a liquid crystal display of Embodiment 8.
Figure 27:
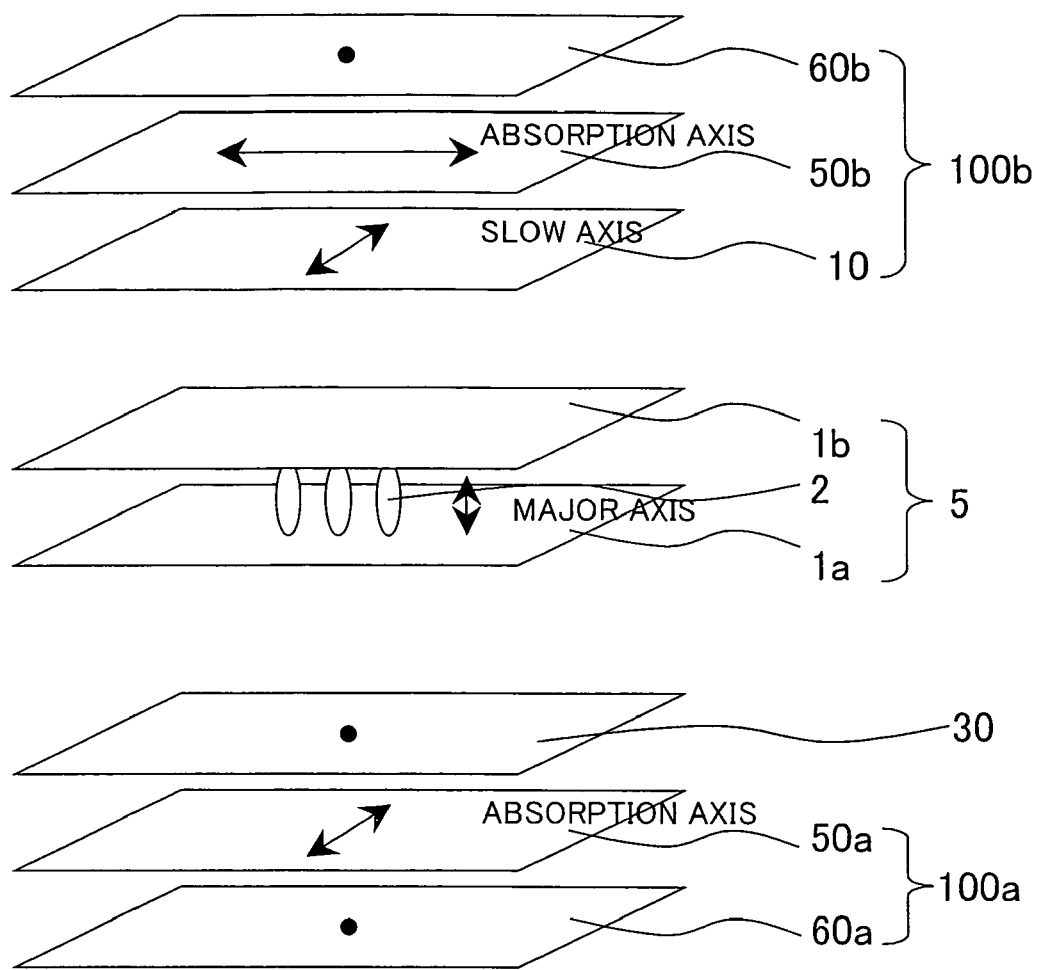
FIG. 27 is a perspective view showing in a frame format a configuration of a liquid crystal display of Embodiment 9.
Figure 28:
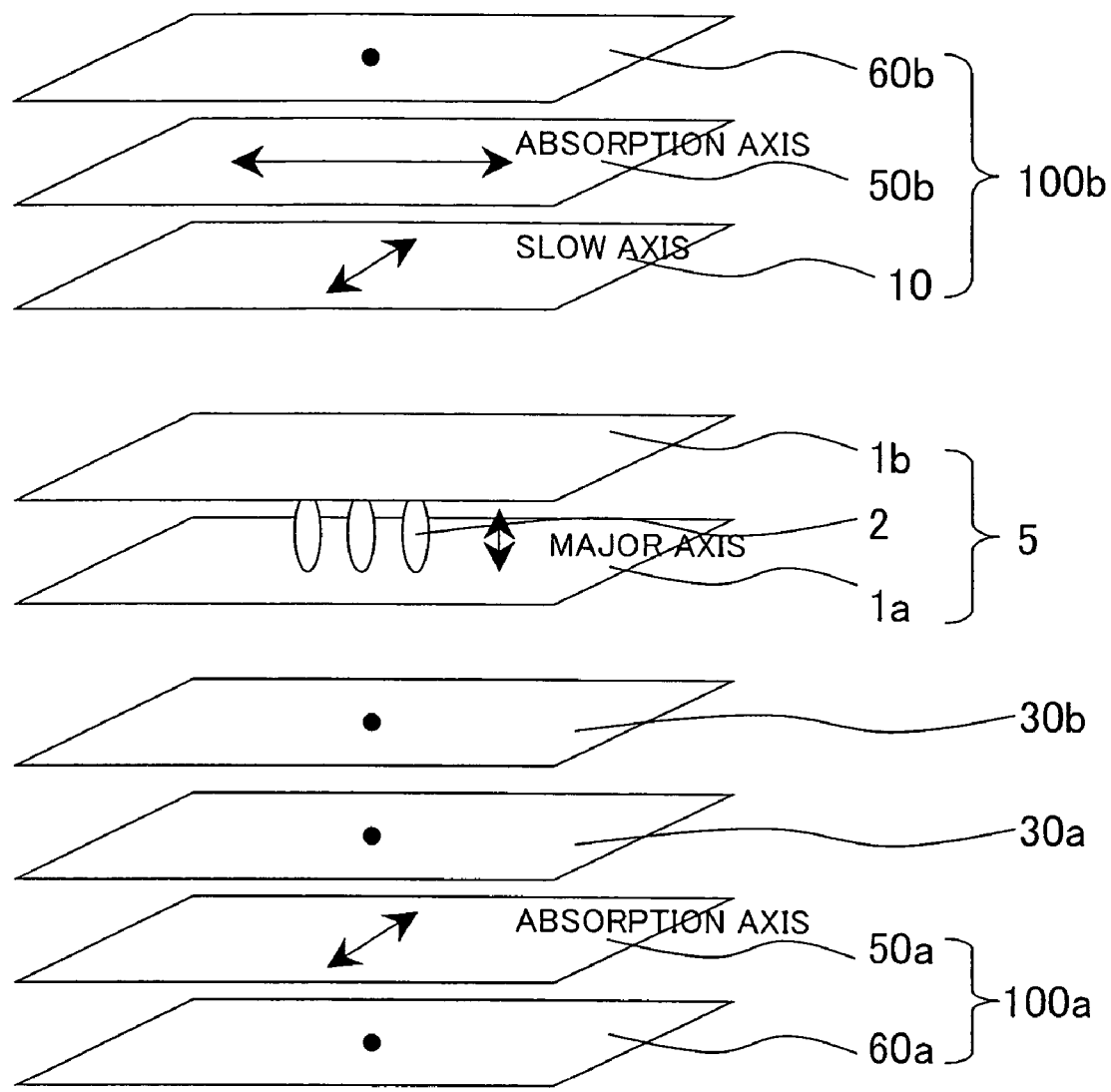
FIG. 28 is a perspective view showing in a frame format a configuration of a liquid crystal display of Embodiment 10.
Figure 29:
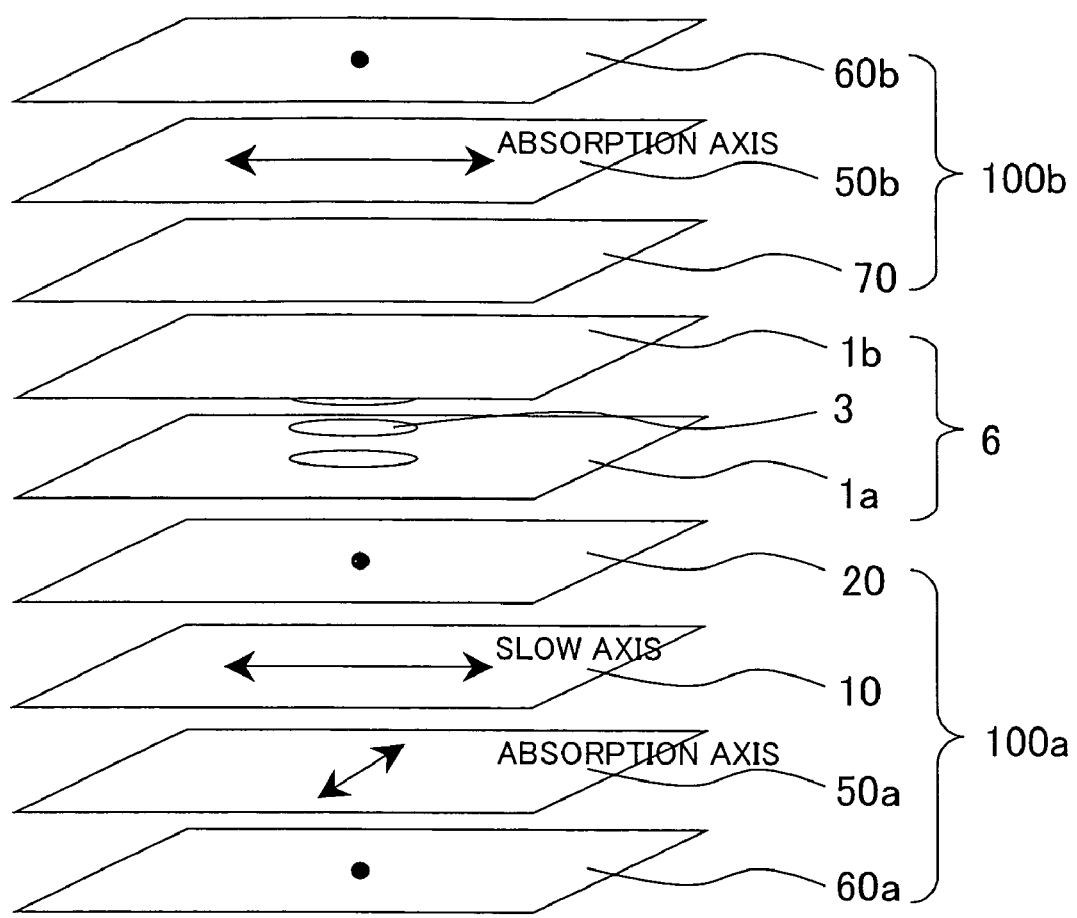
FIG. 29 is a perspective view showing in a frame format a configuration of a liquid crystal display of Embodiment 11.
Figure 30:
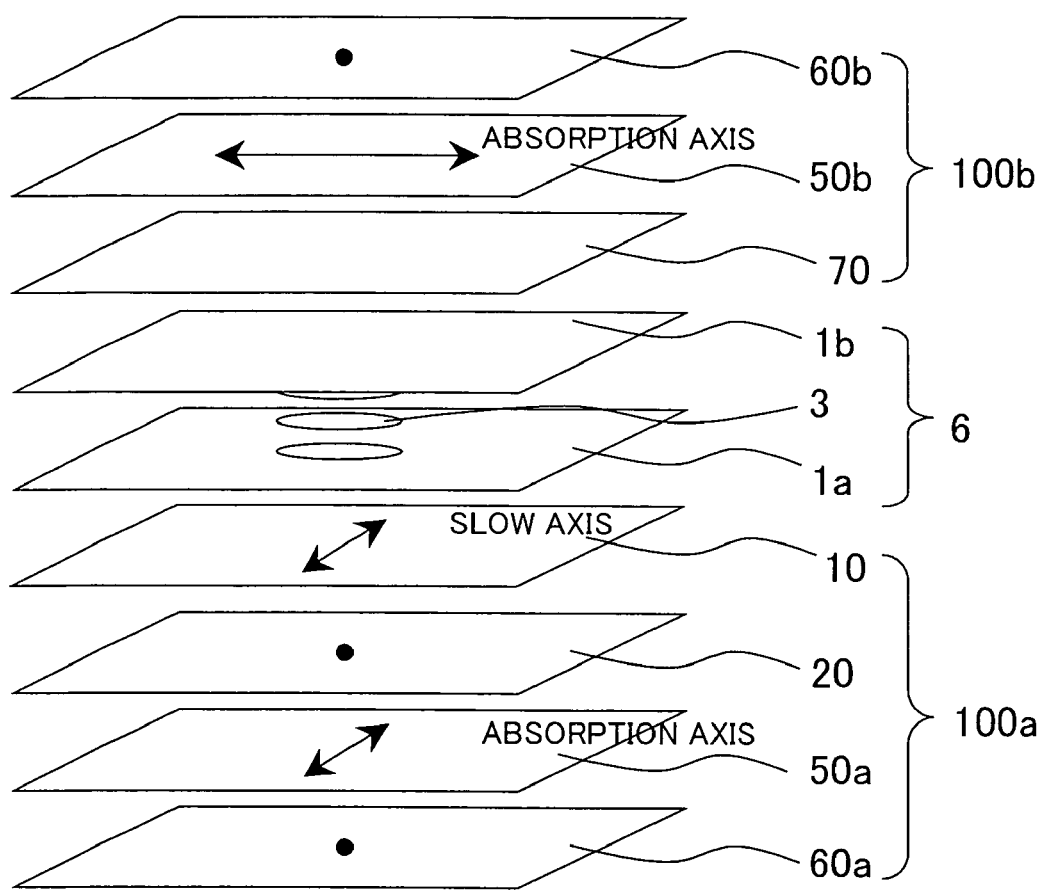
FIG. 30 is a perspective view showing in a frame format a configuration of a liquid crystal display of Embodiment 12.
Figures 1, 31:
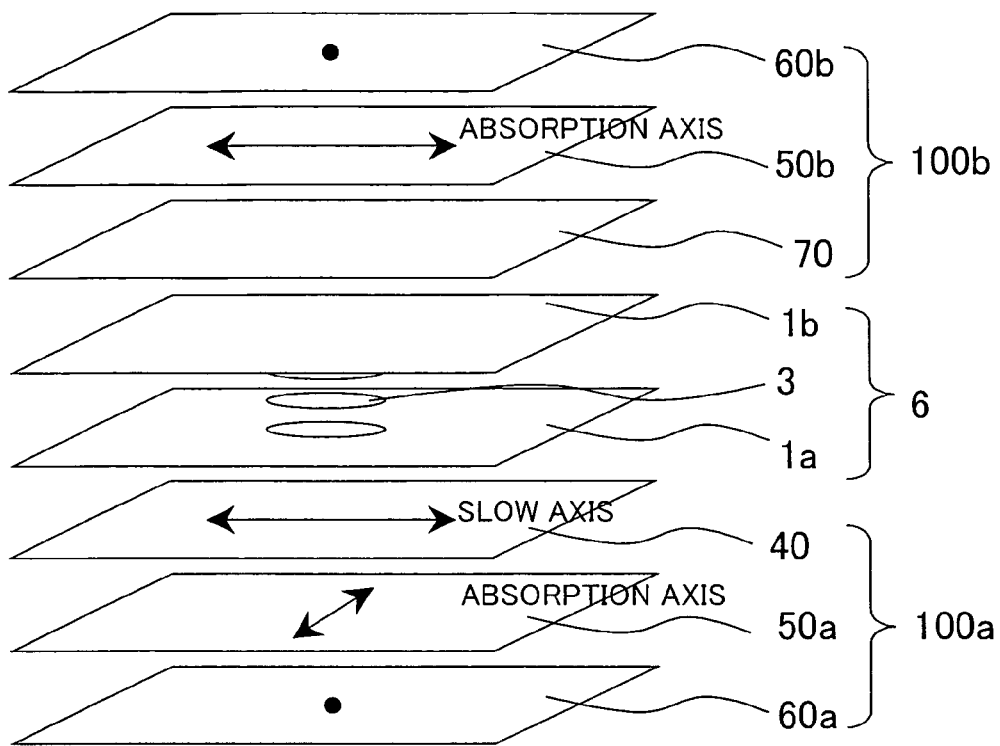
Figures 2, 31:
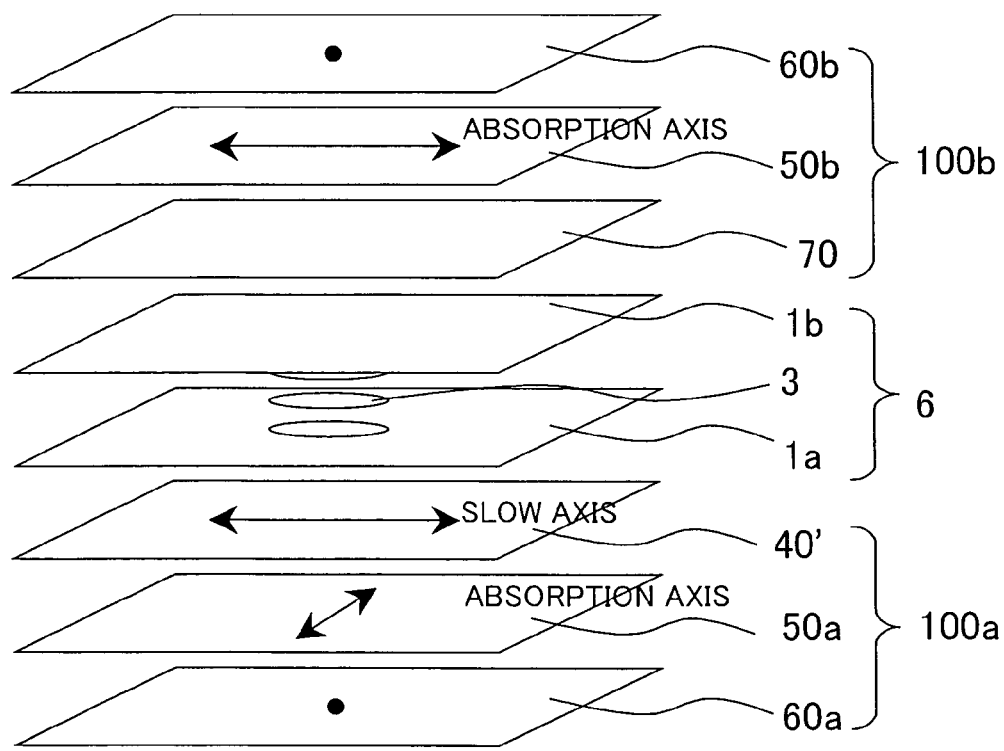
Figure 32:
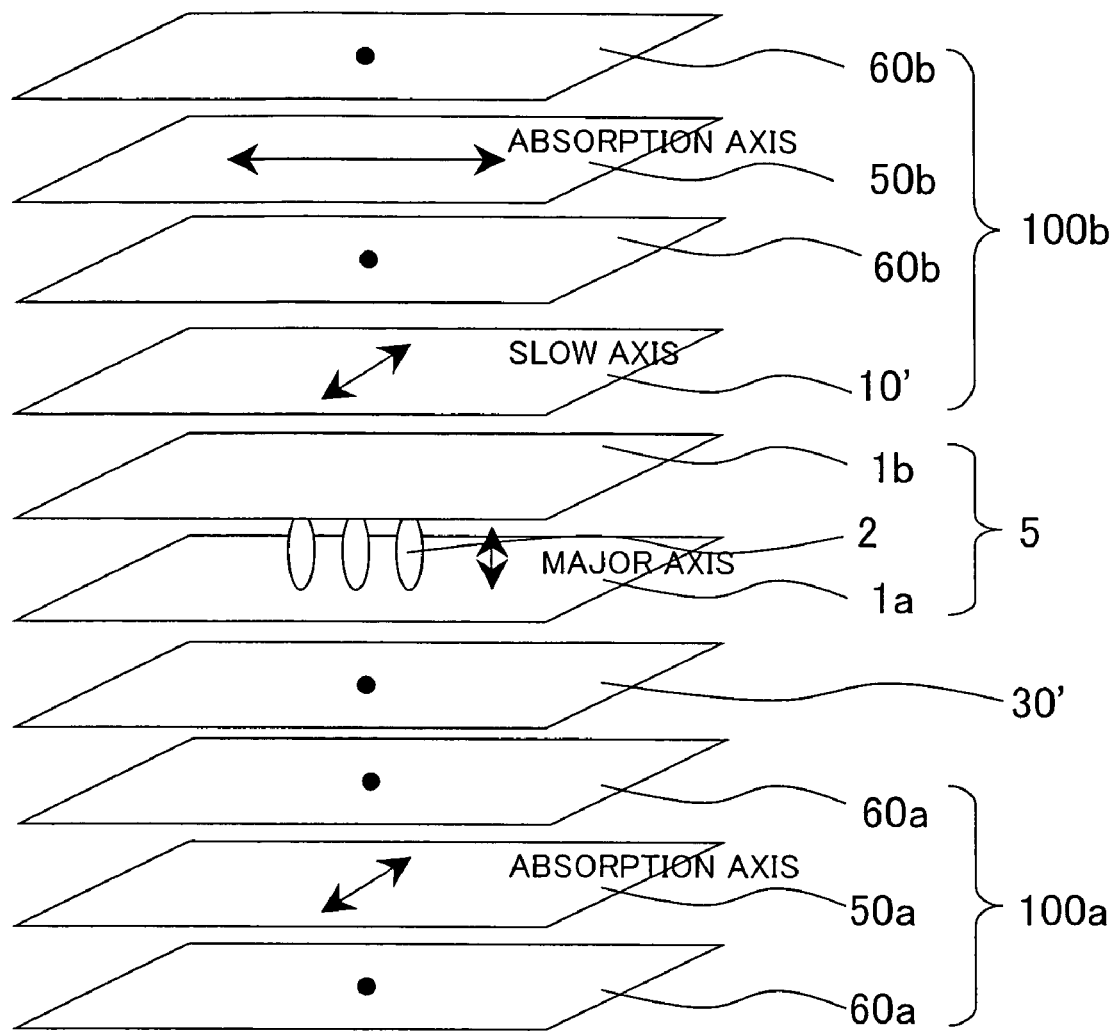
FIG. 32 is a perspective view showing in a frame format a configuration of a liquid crystal display of a comparative example 3.

DESCRIPTION OF SYMBOLS 1a, 1b: Substrate
2: VA mode liquid crystal molecule
3: IPS mode liquid crystal molecule
5: VA mode liquid crystal cell
6: IPS mode liquid crystal cell
10: Positive A plate (designed for entire region of visible wavelength)
10': Positive A plate (designed for single wavelength)
20: Positive C plate (designed for entire region of visible wavelength)
20': Positive C plate (designed for single wavelength)

30: Negative C plate (designed for entire region of visible wavelength)
30a: First negative C plate (designed for entire region of visible wavelength)
30b: Second negative C plate (designed for entire region of visible wavelength)
30': Negative C plate (designed for single wavelength)
40: Biaxial retardation film (designed for entire region of visible wavelength)
40': Biaxial retardation film (designed for single wavelength)
50a, 50b: Polarizing element
60a, 60b: TAC film
70: Film not exhibiting birefringence
100a, 100b: Polarizing film

The invention claimed is:

1. A uniaxial retardation film having an optical axis in plane and where extraordinary ray refraction index>ordinary ray refraction index,
    wherein the retardation film satisfies the following equations (1) to (4):

$$118 \text{ nm} \leq Rxy(550) \leq 160 \text{ nm} \quad (1)$$

$$-10 \text{ nm} \leq Ryz(550) \leq 10 \text{ nm} \quad (2)$$

$$0.75 \leq Rxy(450)/Rxy(550) \leq 0.97 \quad (3)$$

$$1.03 \leq Rxy(650)/Rxy(550) \leq 1.25 \quad (4),$$

in equations (1) to (4), Rxy(λ), Ryz(λ) represent the retardation Rxy, Ryz of the retardation film at wavelength λnm respectively, and are defined as Rxy=(nx−ny)×d, Ryz=(ny−nz)×d where nx, ny (nx>ny) are the principal refraction indexes in the in plane direction, nz is the principal refraction index in the out of plane direction, and d is the thickness in the retardation film.

2. The retardation film according to claim 1, wherein the retardation film satisfies 130 nm≦Rxy(550)≦150 nm.

3. The retardation film according to claim 1, wherein the retardation film is configured by a stacked body of two or more retardation elements in which (nx−ny)/(ny−nz) are substantially equal to each other.

4. The retardation film according to claim 1, wherein the retardation film is configured by a stacked body of two or more retardation elements which maximum principal refraction index direction in plane is substantially parallel to or substantially orthogonal to each other.

5. A polarizing film comprising the retardation film according to claim 1 and a polarizing element, wherein
    the polarizing film is stacked without interposing a film exhibiting birefringence between the retardation film and the polarizing element, and the nx direction of the retardation film and the absorption axis of the polarizing element are arranged in a substantially orthogonal relationship.

6. A liquid crystal display comprising a liquid crystal cell for performing display of black in a state where the majority of liquid crystal molecules align substantially perpendicularly to the substrate and the in plane retardation is substantially zero, and a first polarizing film and a second polarizing film in a Cross-Nicol relationship with each other on both sides of the liquid crystal cell; wherein
    the first polarizing film is the polarizing film according to claim 5;
    the second polarizing film is the polarizing film comprising the retardation film and a polarizing element, wherein the polarizing film is stacked without interposing a film exhibiting birefringence between the retardation film and the polarizing element; and
    the polarizing films are each arranged so that the side of the retardation film is positioned on the liquid crystal cell side.

7. The liquid crystal display according to claim 6, wherein the liquid crystal cell includes at least one of an alignment dividing means forming two or more alignment directions of the liquid crystal molecules in time of display of halftone and white or a color separation means for performing color display; and
    the contrast ratio measured from the normal line direction of the liquid crystal display is greater than or equal to 800.

8. The liquid crystal display according to claim 6, wherein at least one retardation film has photoelastic coefficient of less than or equal to $20 \times 10^{-8}$ cm$^2$/N.

9. A liquid crystal display comprising a liquid crystal cell for performing display of black in a state where the majority of liquid crystal molecules align substantially perpendicularly to the substrate and the in plane retardation is substantially zero, and a first polarizing film and a second polarizing film in a Cross-Nicol relationship with each other on both sides of the liquid crystal cell; wherein
    the first polarizing film is the polarizing film according to claim 5;
    the second polarizing film includes an uniaxial retardation film satisfying the following equations (31) and (32):

$$0 \text{ nm} \leq Rxy(550) \leq 10 \text{ nm} \quad (31)$$

$$71 \text{ nm} \leq Rlc(550) - Rxz(550) \leq 142 \text{ nm} \quad (32),$$

in equations (31) and (32), Rxy(λ), Rxz(λ) represent the retardation Rxy, Rxz of the retardation film at wavelength λnm respectively, and are defined as Rxy=(nx−ny)×d, Rxz=(nx−nz)×d where nx, ny (nx≧ny) are the principal refraction indexes in the in plane direction, nz is the principal refraction index in the out of plane direction, and d is the thickness in the retardation film, and
    in equation (32), Rlc(λ) represents the retardation Rlc of the liquid crystal cell at wavelength λnm, and is defined as Rlc=(ne−no)×d' where ne is the extraordinary ray refraction index, no is the ordinary ray refraction index, and d' is the thickness in the liquid crystal cell, and
    the uniaxial retardation film having an optical axis out of plane and where extraordinary ray refraction index<ordinary ray refraction index and a polarizing element; and
    the polarizing film is stacked without interposing a film exhibiting birefringence between the respective retardation film and the polarizing element, and has the side of the retardation film on the liquid crystal cell side.

10. The liquid crystal display according to claim 9, wherein the uniaxial retardation film satisfies the following equation (33):

$$\{Rlc(450) - Rxz(450)\} \leq \{Rlc(550) - Rxz(550)\} \leq \{Rlc(650) - Rxz(650)\} \quad (33),$$

in equation (33), Rxz(λ) represents the retardation Rxz of the retardation film at wavelength λnm, and is defined as Rxz=(nx−nz)×d where nx, ny (nx≧ny) is the principal refraction indexes in the in plane direction, nz is the principal refraction index in the out of plane direction, and d is the thickness in the retardation film, and
    Rlc(λ) represents the retardation Rlc of the liquid crystal cell at wavelength λnm, and is defined as Rlc=(ne−no)× d' where ne is the extraordinary ray refraction index, no is the ordinary ray refraction index, and d' is the thickness in the liquid crystal cell.

11. The liquid crystal display according to claim 10, wherein the uniaxial retardation film satisfies the following equations (34) and (35):

$$0.75 \leq \{Rlc(450)-Rxz(450)\}/\{Rlc(550)-Rxz(550)\} \leq 0.97 \quad (34)$$

$$1.03 \leq \{Rlc(650)-Rxz(650)\}/\{Rlc(550)-Rxz(550)\} \leq 1.25 \quad (35),$$

in equations (34) and (35), $Rxz(\lambda)$ represents the retardation Rxz of the retardation film at wavelength $\lambda$ nm, and is defined as $Rxz=(nx-nz)\times d$ where nx, ny (nx≧ny) are the principal refraction indexes in the in plane direction, nz is the principal refraction index in the out of plane direction, and d is the thickness in the retardation film, and $Rlc(\lambda)$ represents the retardation Rlc of the liquid crystal cell at wavelength $\lambda$ nm, and is defined as $Rlc=(ne-no)\times d'$ where ne is the extraordinary ray refraction index, no is the ordinary ray refraction index, and d' is the thickness in the liquid crystal cell.

12. The liquid crystal display according to claim 9, wherein the liquid crystal cell includes at least one of an alignment dividing means forming two or more alignment directions of the liquid crystal molecules in time of display of halftone and white or a color separation means for performing color display; and the contrast ratio measured from the normal line direction of the liquid crystal display is greater than or equal to 800.

13. The liquid crystal display according to claim 9, wherein at least one retardation film has photoelastic coefficient of less than or equal to $20\times10^{-8}$ cm$^2$/N.

14. A liquid crystal display comprising a liquid crystal cell for performing display of black in a state where the majority of liquid crystal molecules align substantially perpendicularly to the substrate and the in plane retardation is substantially zero, and a first polarizing film and a second polarizing film in a Cross-Nicol relationship with each other on both sides of the liquid crystal cell; wherein the first polarizing film is the polarizing film according to claim 5 and has the side of the retardation film on the liquid crystal side; and the liquid crystal display has a uniaxial retardation film stacked without a film exhibiting birefringence on the liquid crystal cell side of the first polarizing film, and the uniaxial retardation film satisfying the following equations (36) and (37):

$$0 \text{ nm} \leq Rxy(550) \leq 10 \text{ nm} \quad (36)$$

$$71 \text{ nm} \leq Rlc(550)-Rxz(550) \leq 142 \text{ nm} \quad (37),$$

in equations (36) and (37), $Rxy(\lambda)$, $Rxz(\lambda)$ represent the retardation Rxy, Rxz of the retardation film at wavelength $\lambda$ nm respectively, and are defined as $Rxy=(nx-ny)\times d$, $Rxz=(nx-nz)\times d$ where nx, ny (nx≧ny) are the principal refraction indexes in the in plane direction, nz is the principal refraction index in the out of plane direction, and d is the thickness in the retardation film, and in equation (37), $Rlc(\lambda)$ represents the retardation Rlc of the liquid crystal cell at wavelength $\lambda$ nm, and is defined as $Rlc=(ne-no)\times d'$ where ne is the extraordinary ray refraction index, no is the ordinary ray refraction index, and d' is the thickness in the liquid crystal cell, and the uniaxial retardation film having an optical axis out of plane and where extraordinary ray refraction index<ordinary ray refraction index.

15. The liquid crystal display according to claim 14, wherein the second polarizing film includes a polarizing element; and the liquid crystal display does not include a film exhibiting birefringence between the polarizing element of the second polarizing film and the liquid crystal cell.

16. The liquid crystal display according to claim 14, wherein the uniaxial retardation film satisfies the following equation (38):

$$\{Rlc(450)-Rxz(450)\} \leq \{Rlc(550)-Rxz(550)\} \leq \{Rlc(650)-Rxz(650)\} \quad (38),$$

in equation (38), $Rxz(\lambda)$ represents the retardation Rxz of the retardation film at wavelength $\lambda$ nm, and is defined as $Rxz=(nx-nz)\times d$ where nx, ny (nx≧ny) are the principal refraction indexes in the in plane direction, nz is the principal refraction index in the out of plane direction, and d is the thickness in the retardation film, and $Rlc(\lambda)$ represents the retardation Rlc of the liquid crystal cell at wavelength $\lambda$ nm, and is defined as $Rlc=(ne-no)\times d'$ where ne is the extraordinary ray refraction index, no is the ordinary ray refraction index, and d' is the thickness in the liquid crystal cell.

17. The liquid crystal display according to claim 16, wherein the uniaxial retardation film satisfies the following equations (39) and (40):

$$0.75 \leq \{Rlc(450)-Rxz(450)\}/\{Rlc(550)-Rxz(550)\} \leq 0.97 \quad (39)$$

$$1.03 \leq \{Rlc(650)-Rxz(650)\}/\{Rlc(550)-Rxz(550)\} \leq 1.25 \quad (40),$$

in equations (39) and (40), $Rxz(\lambda)$ represents the retardation Rxz of the retardation film at wavelength $\lambda$ nm, and is defined as $Rxz=(nx-nz)\times d$ where nx, ny (nx≧ny) are the principal refraction indexes in the in plane direction, nz is the principal refraction index in the out of plane direction, and d is the thickness in the retardation film, and $Rlc(\lambda)$ represents the retardation Rlc of the liquid crystal cell at wavelength $\lambda$ nm, and is defined as $Rlc=(ne-no)\times d'$ where ne is the extraordinary ray refraction index, no is the ordinary ray refraction index, and d' is the thickness in the liquid crystal cell.

18. The liquid crystal display according to claim 14, wherein the liquid crystal cell includes at least one of an alignment dividing means forming two or more alignment directions of the liquid crystal molecules in time of display of halftone and white or a color separation means for performing color display; and the contrast ratio measured from the normal line direction of the liquid crystal display is greater than or equal to 800.

19. The liquid crystal display according to claim 14, wherein at least one retardation film has photoelastic coefficient of less than or equal to $20\times10^{-8}$ cm$^2$/N.

20. The retardation film of claim 1, wherein Rxy(450)/Rxy(550) is less than Rxy(650)/Rxy(550).

* * * * *